US010756767B1

(12) United States Patent
Jacobs et al.

(10) Patent No.: US 10,756,767 B1
(45) Date of Patent: Aug. 25, 2020

(54) USER EQUIPMENT FOR WIRELESSLY COMMUNICATING CELLULAR SIGNAL WITH ANOTHER USER EQUIPMENT

(71) Applicant: XCOM Labs, Inc., San Diego, CA (US)

(72) Inventors: Paul Eric Jacobs, La Jolla, CA (US); Peter John Black, La Jolla, CA (US); Matthew Stuart Grob, La Jolla, CA (US); Michael Mingxi Fan, San Diego, CA (US); Tamer Adel Kadous, San Diego, CA (US)

(73) Assignee: XCOM Labs, Inc., San Diego, CA (US)

( * ) Notice: Subject to any disclaimer, the term of this patent is extended or adjusted under 35 U.S.C. 154(b) by 0 days.

(21) Appl. No.: 16/268,325

(22) Filed: Feb. 5, 2019

(51) Int. Cl.
| | |
|---|---|
| H04B 1/00 | (2006.01) |
| H04W 88/06 | (2009.01) |
| H04B 1/3827 | (2015.01) |
| H04W 72/12 | (2009.01) |
| H04W 72/04 | (2009.01) |

(52) U.S. Cl.
CPC ........... *H04B 1/005* (2013.01); *H04B 1/3827* (2013.01); *H04W 72/0453* (2013.01); *H04W 72/1289* (2013.01); *H04W 88/06* (2013.01)

(58) Field of Classification Search
CPC . H04B 1/005; H04B 1/3827; H04W 72/0453; H04W 72/1289; H04W 88/06
USPC ........................................ 455/7, 11.1, 15–17
See application file for complete search history.

(56) References Cited

U.S. PATENT DOCUMENTS

| | | | |
|---|---|---|---|
| 5,414,796 A | 5/1995 | Jacobs | |
| 5,469,115 A | 11/1995 | Peterzell | |
| 5,479,475 A | 12/1995 | Grob | |
| 5,487,175 A | 1/1996 | Bayley | |
| 5,515,177 A | 5/1996 | Propach | |
| 5,517,323 A | 5/1996 | Propach | |
| 5,539,531 A | 7/1996 | Propach | |
| 5,566,000 A | 10/1996 | Propach | |
| D375,740 S | 11/1996 | Mergenthaler | |
| D375,937 S | 11/1996 | Mergenthaler | |
| 5,574,773 A | 11/1996 | Grob | |
| D376,804 S | 12/1996 | Mergenthaler | |

(Continued)

FOREIGN PATENT DOCUMENTS

| | | |
|---|---|---|
| WO | WO 2018/231127 | 12/2018 |

OTHER PUBLICATIONS

3GPP RP-170750, New WID: Further Enhancements to Coordinated Multi-Point (CoMP) Operation for LTE, Mar. 2017.
(Continued)

*Primary Examiner* — Lee Nguyen
(74) *Attorney, Agent, or Firm* — Knobbe, Martens, Olson & Bear, LLP

(57) ABSTRACT

Aspects of this disclosure relate to a user equipment that includes a transceiver that can operate in at least a traffic mode and a virtual network element mode. In the traffic mode, the transceiver can process a received downlink radio frequency signal and transmit an uplink radio frequency signal. The transceiver can couple a receive path to a transmit path in an analog domain in the virtual network element mode. In the virtual network element mode, the transceiver can, for example, perform functions of a network repeater or a network transmit-receive point.

21 Claims, 24 Drawing Sheets

(56) References Cited

U.S. PATENT DOCUMENTS

| | | |
|---|---|---|
| 5,590,406 A | 12/1996 | Bayley |
| 5,600,754 A | 2/1997 | Gardner |
| 5,617,060 A | 4/1997 | Wilson |
| 5,657,420 A | 8/1997 | Jacobs |
| 5,663,807 A | 9/1997 | Propach |
| D386,186 S | 11/1997 | Schnetzer |
| 5,737,708 A | 4/1998 | Grob |
| 5,748,104 A | 5/1998 | Argyroudis |
| 5,757,858 A | 5/1998 | Black |
| 5,761,204 A | 6/1998 | Grob |
| 5,778,338 A | 7/1998 | Jacobs |
| 5,781,856 A | 7/1998 | Jacobs |
| 5,784,406 A | 7/1998 | DeJaco |
| 5,844,885 A | 12/1998 | Grob |
| 5,857,147 A | 1/1999 | Gardner |
| 5,864,763 A | 1/1999 | Leung |
| 5,870,431 A | 2/1999 | Easton |
| 5,881,368 A | 3/1999 | Grob |
| 5,884,196 A | 3/1999 | Lekven |
| D407,701 S | 4/1999 | Chintala |
| 5,898,920 A | 4/1999 | Jacobs |
| D409,561 S | 5/1999 | Chintala |
| 5,903,862 A | 5/1999 | Weaver, Jr. |
| D410,893 S | 6/1999 | Chintala |
| 5,912,882 A | 6/1999 | Yafuso |
| D411,823 S | 7/1999 | Jacobs |
| D412,483 S | 8/1999 | Chintala |
| D413,117 S | 8/1999 | Chintala |
| 5,956,673 A | 9/1999 | Weaver, Jr. |
| 5,956,683 A | 9/1999 | Jacobs |
| 5,960,362 A | 9/1999 | Grob |
| 5,983,099 A | 11/1999 | Yao |
| 5,983,114 A | 11/1999 | Yao |
| 6,006,108 A | 12/1999 | Black |
| D424,573 S | 5/2000 | Maloney |
| 6,101,397 A | 8/2000 | Grob |
| 6,107,878 A | 8/2000 | Black |
| 6,134,440 A | 10/2000 | Black |
| 6,147,964 A | 11/2000 | Black |
| 6,181,201 B1 | 1/2001 | Black |
| 6,205,129 B1 | 3/2001 | Esteves |
| 6,208,858 B1 | 3/2001 | Antonio |
| 6,208,873 B1 | 3/2001 | Black |
| 6,215,779 B1 | 4/2001 | Bender |
| 6,246,885 B1 | 6/2001 | Black |
| 6,285,861 B1 | 9/2001 | Bonaccorso |
| 6,360,093 B1 | 3/2002 | Ross |
| 6,360,100 B1 | 3/2002 | Grob |
| 6,363,102 B1 | 3/2002 | Ling |
| 6,366,779 B1 | 4/2002 | Bender |
| 6,397,070 B1 | 5/2002 | Black |
| 6,426,971 B1 | 7/2002 | Wu |
| 6,434,376 B1 | 8/2002 | Black |
| 6,449,490 B1 | 9/2002 | Chaponniere |
| D468,685 S | 1/2003 | Jacobs |
| 6,535,523 B1 | 3/2003 | Karmi |
| 6,535,918 B1 | 3/2003 | Bender |
| 6,556,549 B1 | 4/2003 | Bender |
| 6,560,211 B2 | 5/2003 | Esteves |
| 6,574,211 B2 | 6/2003 | Padovani |
| 6,594,501 B2 | 7/2003 | Black |
| 6,594,628 B1 | 7/2003 | Jacobs |
| 6,633,552 B1 | 10/2003 | Ling |
| 6,636,568 B2 | 10/2003 | Kadous |
| 6,661,833 B1 | 12/2003 | Black |
| 6,665,272 B1 | 12/2003 | Pankaj |
| 6,678,257 B1 | 1/2004 | Vijayan |
| 6,680,925 B2 | 1/2004 | Wu |
| 6,680,926 B2 | 1/2004 | Bender |
| 6,680,968 B2 | 1/2004 | Black |
| 6,687,510 B2 | 2/2004 | Esteves |
| 6,693,920 B2 | 2/2004 | Montojo |
| 6,694,469 B1 | 2/2004 | Jalali |
| 6,714,526 B2 | 3/2004 | Wei |
| 6,714,780 B1 | 3/2004 | Antonio |
| 6,725,028 B2 | 4/2004 | Bonaccorso |
| 6,738,608 B2 | 5/2004 | Black |
| 6,741,861 B2 | 5/2004 | Bender |
| 6,748,201 B2 | 6/2004 | Black |
| 6,757,520 B2 | 6/2004 | Attar |
| 6,798,736 B1 | 9/2004 | Black |
| 6,801,580 B2 | 10/2004 | Kadous |
| 6,804,210 B2 | 10/2004 | Bender |
| 6,807,161 B2 | 10/2004 | Bender |
| 6,813,478 B2 | 11/2004 | Glazko |
| 6,850,769 B2 | 2/2005 | Grob |
| 6,873,606 B2 | 3/2005 | Agrawal |
| 6,894,994 B1 | 5/2005 | Grob |
| 6,914,965 B1 | 7/2005 | Grob |
| 6,917,799 B2 | 7/2005 | Ross |
| 6,917,821 B2 | 7/2005 | Kadous |
| 6,920,504 B2 | 7/2005 | Bender |
| 6,928,062 B2 | 8/2005 | Krishnan |
| 6,941,133 B2 | 9/2005 | Jacobs |
| 6,965,613 B2 | 11/2005 | Karmi |
| 6,980,514 B2 | 12/2005 | Grob |
| 6,985,516 B1 | 1/2006 | Easton |
| 6,987,778 B2 | 1/2006 | Sindhushayana |
| 7,010,073 B2 | 3/2006 | Black |
| 7,020,073 B2 | 3/2006 | Kadous |
| 7,020,225 B2 | 3/2006 | Sindhushayana |
| 7,039,001 B2 | 5/2006 | Krishnan |
| 7,042,857 B2 | 5/2006 | Krishnan |
| 7,051,268 B1 | 5/2006 | Sindhushayana |
| 7,068,707 B2 | 6/2006 | Bender |
| 7,069,037 B2 | 6/2006 | Lott |
| 7,072,628 B2 | 7/2006 | Agashe |
| 7,079,550 B2 | 7/2006 | Padovani |
| 7,088,701 B1 | 8/2006 | Attar |
| 7,088,957 B2 | 8/2006 | Ling |
| 7,095,790 B2 | 8/2006 | Krishnan |
| 7,103,643 B1 | 9/2006 | Jacobs |
| 7,106,782 B2 | 9/2006 | Howard |
| 7,113,792 B2 | 9/2006 | Glazko |
| 7,123,922 B2 | 10/2006 | Chaponniere |
| 7,127,654 B2 | 10/2006 | Jalali |
| 7,127,655 B2 | 10/2006 | Chandhok |
| 7,130,282 B2 | 10/2006 | Black |
| 7,133,437 B2 | 11/2006 | Black |
| 7,145,940 B2 | 12/2006 | Gore |
| 7,146,174 B2 | 12/2006 | Gardner |
| 7,149,264 B2 | 12/2006 | Black |
| 7,155,246 B2 | 12/2006 | Bhushan |
| 7,158,506 B2 | 1/2007 | Jacobs |
| 7,165,099 B2 | 1/2007 | Sprigg |
| 7,167,684 B2 | 1/2007 | Kadous |
| 7,177,351 B2 | 2/2007 | Kadous |
| 7,177,648 B2 | 2/2007 | Attar |
| 7,181,666 B2 | 2/2007 | Grob |
| 7,184,426 B2 | 2/2007 | Padovani |
| 7,184,713 B2 | 2/2007 | Kadous |
| 7,184,954 B1 | 2/2007 | Jacobs |
| 7,190,951 B2 | 3/2007 | Jacobs |
| 7,194,041 B2 | 3/2007 | Kadous |
| 7,206,580 B2 | 4/2007 | Black |
| 7,206,598 B2 | 4/2007 | Attar |
| 7,209,517 B2 | 4/2007 | Sindhushayana |
| 7,219,145 B2 | 5/2007 | Chmaytelli |
| 7,228,148 B2 | 6/2007 | Esteves |
| 7,233,794 B2 | 6/2007 | Grob |
| 7,236,535 B2 | 6/2007 | Subramaniam |
| 7,239,622 B2 | 7/2007 | Black |
| 7,239,847 B2 | 7/2007 | Attar |
| 7,248,572 B2 | 7/2007 | Bender |
| 7,251,229 B2 | 7/2007 | Montojo |
| 7,263,382 B2 | 8/2007 | Chandhok |
| 7,266,156 B2 | 9/2007 | Montojo |
| 7,289,473 B1 | 10/2007 | Padovani |
| 7,295,857 B2 | 11/2007 | Joshi |
| 7,315,531 B2 | 1/2008 | Black |
| 7,324,836 B2 | 1/2008 | Steenstra |
| 7,369,549 B2 | 5/2008 | Wu |
| 7,376,209 B2 | 5/2008 | Namgoong |
| 7,382,744 B2 | 6/2008 | Bhushan |

(56) References Cited

U.S. PATENT DOCUMENTS

| | | |
|---|---|---|
| 7,411,930 B2 | 8/2008 | Montojo |
| 7,418,046 B2 | 8/2008 | Gore |
| 7,424,290 B2 | 9/2008 | Jacobs |
| 7,428,269 B2 | 9/2008 | Sampath |
| 7,450,943 B2 | 11/2008 | Black |
| 7,457,639 B2 | 11/2008 | Subramaniam |
| D583,782 S | 12/2008 | Jacobs |
| 7,463,576 B2 | 12/2008 | Krishnan |
| 7,472,396 B2 | 12/2008 | Jacobs |
| 7,477,693 B2 | 1/2009 | Subramaniam |
| 7,483,699 B2 | 1/2009 | Karmi |
| 7,499,427 B2 | 3/2009 | Padovani |
| 7,508,748 B2 | 3/2009 | Kadous |
| 7,525,909 B2 | 4/2009 | Fan |
| 7,539,507 B2 | 5/2009 | Grob |
| 7,564,775 B2 | 7/2009 | Jayaraman |
| 7,564,794 B2 | 7/2009 | Montojo |
| 7,564,818 B2 | 7/2009 | Black |
| 7,567,621 B2 | 7/2009 | Sampath |
| 7,580,709 B2 | 8/2009 | Black |
| 7,596,090 B2 | 9/2009 | Black |
| 7,596,098 B2 | 9/2009 | Karmi |
| 7,599,329 B2 | 10/2009 | Karmi |
| 7,606,326 B2 | 10/2009 | Krishnan |
| 7,609,773 B2 | 10/2009 | Bhushan |
| 7,613,978 B2 | 11/2009 | Jalali |
| 7,620,005 B2 | 11/2009 | Wei |
| 7,630,719 B2 | 12/2009 | Bender |
| 7,646,802 B2 | 1/2010 | Black |
| 7,668,125 B2 | 2/2010 | Kadous |
| 7,672,383 B2 | 3/2010 | Namgoong |
| 7,675,886 B2 | 3/2010 | Agrawal |
| 7,684,797 B2 | 3/2010 | Jain |
| 7,693,213 B2 | 4/2010 | Sindhushayana |
| 7,715,356 B2 | 5/2010 | Bender |
| 7,719,991 B2 | 5/2010 | Bhushan |
| 7,729,714 B2 | 6/2010 | Black |
| 7,734,285 B2 | 6/2010 | Chmaytelli |
| 7,738,906 B2 | 6/2010 | Attar |
| 7,742,447 B2 | 6/2010 | Joshi |
| 7,788,092 B2 | 8/2010 | Jacobs |
| 7,796,563 B2 | 9/2010 | Wu |
| 7,817,677 B2 | 10/2010 | Black |
| 7,817,760 B2 | 10/2010 | Black |
| 7,826,441 B2 | 11/2010 | Black |
| 7,830,900 B2 | 11/2010 | Black |
| 7,835,695 B2 | 11/2010 | Ling |
| 7,844,040 B2 | 11/2010 | Sprigg |
| 7,848,282 B2 | 12/2010 | Padovani |
| 7,848,283 B2 | 12/2010 | Padovani |
| 7,848,284 B2 | 12/2010 | Padovani |
| 7,848,285 B2 | 12/2010 | Padovani |
| 7,848,298 B2 | 12/2010 | Attar |
| 7,869,387 B2 | 1/2011 | Black |
| 7,876,265 B2 | 1/2011 | Black |
| 7,877,744 B2 | 1/2011 | Jacobs |
| 7,890,144 B2 | 2/2011 | Subramaniam |
| 7,893,873 B2 | 2/2011 | Black |
| 7,903,615 B2 | 3/2011 | Gorokhov |
| 7,907,121 B2 | 3/2011 | Jacobs |
| 7,924,753 B2 | 4/2011 | Attar |
| 7,929,991 B2 | 4/2011 | Jacobs |
| 7,940,663 B2 | 5/2011 | Kadous |
| 7,940,908 B2 | 5/2011 | Sprigg |
| 7,948,959 B2 | 5/2011 | Wang |
| 7,953,062 B2 | 5/2011 | Sindhushayana |
| 7,961,592 B2 | 6/2011 | Black |
| 7,974,359 B2 | 7/2011 | Gorokhov |
| 7,995,531 B2 | 8/2011 | Padovani |
| 7,995,684 B2 | 8/2011 | Montojo |
| 8,005,042 B2 | 8/2011 | Padovani |
| 8,009,625 B2 | 8/2011 | Padovani |
| 8,010,113 B2 | 8/2011 | Black |
| 8,014,331 B2 | 9/2011 | Sarkar |
| 8,040,942 B2 | 10/2011 | Bhushan |
| 8,041,302 B2 | 10/2011 | Gardner |
| 8,050,198 B2 | 11/2011 | Bhushan |
| 8,060,129 B2 | 11/2011 | Grob |
| 8,073,068 B2 | 12/2011 | Kim |
| 8,077,654 B2 | 12/2011 | Sutivong |
| 8,077,655 B2 | 12/2011 | Padovani |
| 8,077,691 B2 | 12/2011 | Kadous |
| 8,085,678 B2 | 12/2011 | Spindola |
| 8,089,924 B2 | 1/2012 | Padovani |
| 8,094,623 B2 | 1/2012 | Attar |
| 8,094,740 B2 | 1/2012 | Bhushan |
| 8,098,231 B2 | 1/2012 | Jacobs |
| 8,098,767 B2 | 1/2012 | Mirbagheri |
| 8,102,872 B2 | 1/2012 | Spindola |
| 8,107,517 B2 | 1/2012 | Naguib |
| 8,111,663 B2 | 2/2012 | Black |
| 8,116,283 B2 | 2/2012 | Black |
| 8,126,072 B2 | 2/2012 | Namgoong |
| 8,139,672 B2 | 3/2012 | Gore |
| 8,160,596 B2 | 4/2012 | Black |
| 8,165,619 B2 | 4/2012 | Attar |
| 8,175,594 B2 | 5/2012 | Attar |
| 8,189,540 B2 | 5/2012 | Padovani |
| 8,203,961 B2 | 6/2012 | Yavuz |
| 8,204,530 B2 | 6/2012 | Gorokhov |
| 8,213,390 B2 | 7/2012 | Black |
| 8,218,573 B2 | 7/2012 | Bhushan |
| 8,229,423 B2 | 7/2012 | Sarkar |
| 8,249,577 B2 | 8/2012 | Chmaytelli |
| 8,274,948 B2 | 9/2012 | Bender |
| 8,301,598 B2 | 10/2012 | Chandhok |
| 8,306,096 B2 | 11/2012 | Sampath |
| 8,311,027 B2 | 11/2012 | Padovani |
| 8,331,310 B2 | 12/2012 | Wang |
| 8,331,377 B2 | 12/2012 | Attar |
| 8,331,385 B2 | 12/2012 | Black |
| 8,331,892 B2 | 12/2012 | Kadous |
| 8,351,372 B2 | 1/2013 | Padovani |
| 8,351,456 B2 | 1/2013 | Kadous |
| 8,363,697 B2 | 1/2013 | Grob |
| 8,375,261 B2 | 2/2013 | Shi |
| 8,385,433 B2 | 2/2013 | Wang |
| 8,385,465 B2 | 2/2013 | Kadous |
| 8,385,923 B2 | 2/2013 | Attar |
| 8,391,196 B2 | 3/2013 | Gorokhov |
| 8,391,337 B2 | 3/2013 | Black |
| 8,391,413 B2 | 3/2013 | Mantravadi |
| 8,396,152 B2 | 3/2013 | Attar |
| 8,406,774 B2 | 3/2013 | Yavuz |
| 8,411,594 B2 | 4/2013 | Black |
| 8,412,227 B2 | 4/2013 | Edge |
| 8,416,756 B2 | 4/2013 | Bhushan |
| 8,451,740 B2 | 5/2013 | Sampath |
| 8,451,776 B2 | 5/2013 | Dayal |
| 8,452,011 B2 | 5/2013 | Guo |
| 8,457,152 B2 | 6/2013 | Gorokhov |
| 8,462,859 B2 | 6/2013 | Sampath |
| 8,462,950 B2 | 6/2013 | Jacobs |
| 8,472,322 B2 | 6/2013 | Black |
| 8,483,223 B2 | 7/2013 | Black |
| 8,487,478 B2 | 7/2013 | Kirby |
| 8,494,593 B2 | 7/2013 | Black |
| 8,498,192 B2 | 7/2013 | Bhushan |
| 8,514,988 B2 | 8/2013 | Wu |
| 8,537,875 B2 | 9/2013 | Soriaga |
| RE44,577 E | 11/2013 | Yafuso |
| 8,576,760 B2 | 11/2013 | Gorokhov |
| 8,582,621 B2 | 11/2013 | Grob |
| 8,583,137 B2 | 11/2013 | Rezaiifar |
| 8,588,777 B2 | 11/2013 | Grob |
| 8,589,514 B2 | 11/2013 | Duggal |
| 8,594,252 B2 | 11/2013 | Black |
| 8,605,729 B2 | 12/2013 | Dayal |
| 8,605,801 B2 | 12/2013 | Rezaiifar |
| 8,605,880 B2 | 12/2013 | Sprigg |
| 8,611,303 B2 | 12/2013 | Rezaiifar |
| 8,611,305 B2 | 12/2013 | Black |
| 8,611,310 B2 | 12/2013 | Black |
| 8,611,325 B2 | 12/2013 | Black |

(56) References Cited

U.S. PATENT DOCUMENTS

| | | |
|---|---|---|
| 8,611,815 B2 | 12/2013 | Mohammadian |
| 8,619,717 B2 | 12/2013 | Agrawal |
| 8,619,835 B2 | 12/2013 | Grob |
| 8,630,602 B2 | 1/2014 | Attar |
| 8,634,435 B2 | 1/2014 | Kadous |
| 8,634,438 B2 | 1/2014 | Nanda |
| 8,635,645 B2 | 1/2014 | Krishnamoorthi |
| 8,638,758 B2 | 1/2014 | Black |
| 8,639,190 B2 | 1/2014 | Gore |
| 8,639,662 B2 | 1/2014 | Chandhok |
| 8,644,396 B2 | 2/2014 | Lee |
| 8,654,705 B2 | 2/2014 | Wang |
| 8,654,715 B2 | 2/2014 | Wang |
| 8,654,868 B2 | 2/2014 | Jacobs |
| 8,655,400 B2 | 2/2014 | Kadous |
| 8,665,880 B2 | 3/2014 | Yavuz |
| 8,676,209 B2 | 3/2014 | Gorokhov |
| 8,687,648 B2 | 4/2014 | Jacobs |
| 8,700,083 B2 | 4/2014 | Yavuz |
| 8,712,461 B2 | 4/2014 | Yavuz |
| 8,712,848 B2 | 4/2014 | Jacobs |
| 8,724,545 B2 | 5/2014 | Dayal |
| 8,724,555 B2 | 5/2014 | Krishnan |
| 8,732,272 B2 | 5/2014 | Deshpande |
| 8,737,538 B2 | 5/2014 | Grob |
| 8,737,911 B2 | 5/2014 | Black |
| 8,737,981 B2 | 5/2014 | Jacobs |
| 8,743,751 B2 | 6/2014 | Li |
| 8,743,758 B1 | 6/2014 | Bhargava et al. |
| 8,743,909 B2 | 6/2014 | Black |
| 8,744,018 B2 | 6/2014 | Chen |
| 8,755,350 B2 | 6/2014 | Grob |
| 8,760,994 B2 | 6/2014 | Wang |
| 8,767,885 B2 | 7/2014 | Sampath |
| 8,773,308 B2 | 7/2014 | Black |
| 8,810,194 B2 | 8/2014 | Kirby |
| 8,818,274 B2 | 8/2014 | Grob |
| D712,881 S | 9/2014 | Shaanan |
| 8,824,979 B2 | 9/2014 | Yavuz |
| 8,825,860 B2 | 9/2014 | Linsky |
| 8,830,934 B2 | 9/2014 | Banister |
| 8,831,156 B2 | 9/2014 | Liang |
| 8,839,079 B2 | 9/2014 | Chen |
| 8,842,693 B2 | 9/2014 | Agrawal |
| 8,848,607 B2 | 9/2014 | Wang |
| 8,854,944 B2 | 10/2014 | Jou |
| 8,855,001 B2 | 10/2014 | Gorokhov |
| 8,867,456 B2 | 10/2014 | Yavuz |
| 8,868,118 B2 | 10/2014 | Rezaiifar |
| 8,873,534 B2 | 10/2014 | Sindhushayana |
| 8,878,393 B2 | 11/2014 | Kirby |
| 8,879,440 B2 | 11/2014 | Guo |
| 8,879,445 B2 | 11/2014 | Sadek |
| 8,885,744 B2 | 11/2014 | Kadous |
| 8,886,126 B2 | 11/2014 | Mantravadi |
| 8,886,239 B2 | 11/2014 | Dayal |
| 8,891,436 B2 | 11/2014 | Zhang |
| 8,892,035 B2 | 11/2014 | Mohammadian |
| 8,897,181 B2 | 11/2014 | Wang |
| 8,897,188 B2 | 11/2014 | Black |
| 8,897,220 B2 | 11/2014 | Kadous |
| 8,897,256 B2 | 11/2014 | Cherian |
| 8,903,021 B2 | 12/2014 | Mantravadi |
| 8,908,496 B2 | 12/2014 | Kadous |
| 8,923,109 B2 | 12/2014 | Wang |
| 8,923,125 B2 | 12/2014 | Lott |
| 8,923,208 B2 | 12/2014 | Dayal |
| 8,929,908 B2 | 1/2015 | Agrawal |
| 8,947,042 B2 | 2/2015 | Kirby |
| 8,948,095 B2 | 2/2015 | Black |
| 8,948,147 B2 | 2/2015 | Zheng |
| 8,954,063 B2 | 2/2015 | Sarkar |
| 8,963,486 B2 | 2/2015 | Kirby |
| 8,966,001 B2 | 2/2015 | Rauber |
| 8,971,461 B2 | 3/2015 | Sampath |
| 8,971,811 B2 | 3/2015 | Grob |
| 8,971,823 B2 | 3/2015 | Gore |
| 8,971,884 B2 | 3/2015 | Ahluwalia |
| 8,983,480 B2 | 3/2015 | Rezaiifar |
| 8,995,417 B2 | 3/2015 | Jou |
| 9,001,735 B2 | 4/2015 | Padovani |
| 9,007,942 B2 | 4/2015 | Zhao |
| 9,014,152 B2 | 4/2015 | Jou |
| 9,037,134 B2 | 5/2015 | Grob |
| 9,055,545 B2 | 6/2015 | Black |
| 9,059,785 B2 | 6/2015 | Fertonani |
| 9,066,306 B2 | 6/2015 | Yavuz |
| 9,071,344 B2 | 6/2015 | Smee |
| 9,072,102 B2 | 6/2015 | Yavuz |
| 9,078,269 B2 | 7/2015 | Yavuz |
| 9,088,389 B2 | 7/2015 | Gorokhov |
| 9,100,549 B2 | 8/2015 | Jacobs |
| 9,106,287 B2 | 8/2015 | Wang |
| 9,113,488 B2 | 8/2015 | Oguz |
| 9,118,387 B2 | 8/2015 | Padovani |
| 9,119,026 B2 | 8/2015 | Black |
| 9,119,217 B2 | 8/2015 | Black |
| 9,124,344 B2 | 9/2015 | Padovani |
| 9,131,420 B2 | 9/2015 | Rezaiifar |
| 9,136,958 B2 | 9/2015 | Walker |
| 9,136,974 B2 | 9/2015 | Gorokhov |
| 9,137,806 B2 | 9/2015 | Yavuz |
| 9,141,961 B2 | 9/2015 | Rajan |
| 9,143,957 B2 | 9/2015 | Sadek |
| 9,144,036 B2 | 9/2015 | Gorokhov |
| 9,144,084 B2 | 9/2015 | Sadek |
| 9,148,256 B2 | 9/2015 | Sampath |
| 9,148,908 B2 | 9/2015 | Bhargava et al. |
| 9,154,179 B2 | 10/2015 | Gudem |
| 9,154,211 B2 | 10/2015 | Sampath |
| 9,155,106 B2 | 10/2015 | Krishnan |
| 9,155,124 B2 | 10/2015 | Bhargava et al. |
| 9,161,232 B2 | 10/2015 | Linsky |
| 9,161,233 B2 | 10/2015 | Wang |
| 9,166,715 B2 | 10/2015 | Jacobs |
| 9,172,402 B2 | 10/2015 | Gudem |
| 9,172,453 B2 | 10/2015 | Wang |
| 9,178,632 B2 | 11/2015 | Grob |
| 9,179,319 B2 | 11/2015 | Gore |
| 9,184,870 B2 | 11/2015 | Sampath |
| 9,185,718 B2 | 11/2015 | Kadous |
| 9,185,720 B2 | 11/2015 | Mantravadi |
| 9,191,276 B2 | 11/2015 | Jacobs |
| 9,198,053 B2 | 11/2015 | Edge |
| 9,204,437 B2 | 12/2015 | Smee |
| 9,226,173 B2 | 12/2015 | Sadek |
| 9,246,560 B2 | 1/2016 | Sampath |
| 9,247,525 B2 | 1/2016 | Jacobs |
| 9,253,658 B2 | 2/2016 | Sadek |
| 9,264,972 B2 | 2/2016 | Fan |
| D751,928 S | 3/2016 | Shaanan |
| 9,277,564 B2 | 3/2016 | Wang |
| 9,282,462 B2 | 3/2016 | Dayal |
| 9,288,814 B2 | 3/2016 | Yavuz |
| 9,294,932 B2 | 3/2016 | Walker |
| 9,307,544 B2 | 4/2016 | Gore |
| 9,344,973 B2 | 5/2016 | Yavuz |
| 9,358,940 B2 | 6/2016 | Cooper |
| 9,363,006 B2 | 6/2016 | Bhargava et al. |
| 9,363,764 B2 | 6/2016 | Black |
| 9,374,791 B2 | 6/2016 | Yavuz |
| 9,398,602 B2 | 7/2016 | Kadous |
| 9,407,327 B2 | 8/2016 | Kirby |
| 9,408,165 B2 | 8/2016 | Jou |
| 9,408,220 B2 | 8/2016 | Gore |
| 9,414,434 B2 | 8/2016 | Bhargava et al. |
| 9,419,751 B2 | 8/2016 | Sindhushayana |
| 9,428,127 B2 | 8/2016 | Cooper |
| D765,595 S | 9/2016 | Shaanan |
| 9,450,638 B2 | 9/2016 | Yan |
| 9,451,480 B2 | 9/2016 | Huang |
| 9,451,514 B1 | 9/2016 | Michel et al. |
| 9,454,265 B2 | 9/2016 | Wyrwas |
| 9,461,736 B2 | 10/2016 | Bhushan |

(56) References Cited

U.S. PATENT DOCUMENTS

| | | |
|---|---|---|
| 9,474,075 B2 | 10/2016 | Yavuz |
| 9,483,769 B2 | 11/2016 | Rajan |
| 9,491,722 B2 | 11/2016 | Yavuz |
| 9,497,495 B2 | 11/2016 | Krishnamoorthi |
| 9,503,134 B2 | 11/2016 | Sadek Ahmed Kamel |
| 9,509,452 B2 | 11/2016 | Liang |
| 9,524,502 B2 | 12/2016 | Rajan |
| 9,525,477 B1 | 12/2016 | Wu |
| 9,544,075 B2 | 1/2017 | Altman |
| 9,578,591 B2 | 2/2017 | Bhargava et al. |
| 9,578,649 B2 | 2/2017 | Dayal |
| 9,585,150 B2 | 2/2017 | Marsh |
| 9,585,156 B2 | 2/2017 | Bhattad |
| 9,609,649 B2 | 3/2017 | Fan |
| 9,660,776 B2 | 5/2017 | Kadous |
| 9,667,817 B2 | 5/2017 | Grob |
| 9,673,837 B2 | 6/2017 | Xue |
| 9,716,402 B2 | 7/2017 | Kirby |
| 9,730,227 B2 | 8/2017 | Marsh |
| 9,747,613 B2 | 8/2017 | Rajan |
| 9,750,014 B2 | 8/2017 | Sadek |
| 9,788,361 B2 | 10/2017 | Valliappan |
| 9,793,738 B2 | 10/2017 | Jacobs |
| 9,794,949 B2 | 10/2017 | Bhargava et al. |
| 9,806,791 B2 | 10/2017 | Bhargava et al. |
| 9,832,785 B2 | 11/2017 | Kadous |
| 9,860,033 B2 | 1/2018 | Kadous |
| 9,867,194 B2 | 1/2018 | Kadous |
| 9,893,800 B2 | 2/2018 | Wu |
| 9,900,856 B2 | 2/2018 | Wu |
| 9,924,368 B2 | 3/2018 | Valliappan |
| 9,924,436 B2 | 3/2018 | Grob |
| 9,936,400 B2 | 4/2018 | Lee |
| 9,942,921 B2 | 4/2018 | Bhargava et al. |
| 9,954,668 B2 | 4/2018 | Lee |
| 9,955,476 B2 | 4/2018 | Black |
| 9,980,090 B2 | 5/2018 | Gujral |
| 9,986,480 B2 | 5/2018 | Ta et al. |
| 9,991,986 B2 | 6/2018 | Sindhushayana |
| 10,038,999 B2 | 7/2018 | Sprigg |
| 10,044,438 B2 | 8/2018 | Kadous |
| 10,044,459 B2 | 8/2018 | Chendamarai Kannan |
| 10,075,313 B2 | 9/2018 | Black |
| 10,091,789 B2 | 10/2018 | Valliappan |
| 10,136,311 B2 | 11/2018 | Bhargava et al. |
| 10,178,649 B2 | 1/2019 | Liu |
| 10,182,404 B2 | 1/2019 | Prakash |
| 10,201,014 B2 | 2/2019 | Kadous |
| 10,205,505 B2 | 2/2019 | Michel et al. |
| 10,218,406 B2 | 2/2019 | Liu |
| 10,219,235 B2 | 2/2019 | Patel |
| 10,219,252 B2 | 2/2019 | Chendamarai Kannan |
| 10,219,300 B2 | 2/2019 | Gorokhov |
| 10,225,818 B2 | 3/2019 | Liu |
| 10,292,019 B2 | 5/2019 | Ta et al. |
| 2001/0024437 A1 | 9/2001 | Bender |
| 2001/0034762 A1 | 10/2001 | Jacobs |
| 2001/0034763 A1 | 10/2001 | Jacobs |
| 2001/0044736 A1 | 11/2001 | Jacobs |
| 2001/0044741 A1 | 11/2001 | Jacobs |
| 2001/0047408 A1 | 11/2001 | Jacobs |
| 2001/0055391 A1 | 12/2001 | Jacobs |
| 2002/0029166 A1 | 3/2002 | Jacobs |
| 2002/0059418 A1 | 5/2002 | Bird |
| 2002/0072967 A1 | 6/2002 | Jacobs |
| 2002/0173315 A1 | 11/2002 | Chmaytelli |
| 2003/0050832 A1 | 3/2003 | Jacobs |
| 2003/0145119 A1 | 7/2003 | Bender |
| 2003/0149738 A1 | 8/2003 | Jacobs |
| 2004/0039642 A1 | 2/2004 | Jacobs |
| 2004/0039784 A1 | 2/2004 | Jacobs |
| 2004/0054588 A1 | 3/2004 | Jacobs |
| 2004/0110469 A1* | 6/2004 | Judd .............. G01S 19/25 455/15 |
| 2004/0110525 A1 | 6/2004 | Black |
| 2004/0121730 A1 | 6/2004 | Kadous |
| 2004/0205151 A1 | 10/2004 | Sprigg |
| 2004/0249708 A1 | 12/2004 | Jacobs |
| 2004/0268216 A1 | 12/2004 | Jacobs |
| 2005/0104857 A1 | 5/2005 | Jacobs |
| 2006/0063569 A1 | 3/2006 | Jacobs |
| 2006/0111920 A1 | 5/2006 | Jacobs |
| 2006/0174314 A1 | 8/2006 | Jacobs |
| 2006/0203794 A1 | 9/2006 | Sampath |
| 2006/0223580 A1 | 10/2006 | Antonio |
| 2006/0229089 A1 | 10/2006 | Tokgoz |
| 2007/0005428 A1 | 1/2007 | Jacobs |
| 2007/0005429 A1 | 1/2007 | Jacobs |
| 2007/0038728 A1 | 2/2007 | Jacobs |
| 2007/0041457 A1 | 2/2007 | Kadous |
| 2007/0066232 A1 | 3/2007 | Black |
| 2007/0071147 A1 | 3/2007 | Sampath |
| 2007/0165738 A1 | 7/2007 | Barriac |
| 2007/0198981 A1 | 8/2007 | Jacobs |
| 2008/0025241 A1 | 1/2008 | Bhushan |
| 2008/0032740 A1 | 2/2008 | Joshi |
| 2008/0112495 A1 | 5/2008 | Gore |
| 2008/0126258 A1 | 5/2008 | Jacobs |
| 2009/0080499 A1 | 3/2009 | Yavuz |
| 2009/0163209 A1 | 6/2009 | Black |
| 2009/0187593 A1 | 7/2009 | Chen |
| 2009/0198608 A1 | 8/2009 | Jain |
| 2009/0307739 A1 | 12/2009 | Dean |
| 2010/0003931 A1 | 1/2010 | Krishnan |
| 2010/0046497 A1 | 2/2010 | Jalali |
| 2010/0057924 A1 | 3/2010 | Rauber |
| 2010/0067422 A1 | 3/2010 | Kadous |
| 2010/0215022 A1 | 8/2010 | Black |
| 2010/0225270 A1 | 9/2010 | Jacobs |
| 2010/0240302 A1 | 9/2010 | Buczkiewicz et al. |
| 2011/0007680 A1 | 1/2011 | Kadous |
| 2011/0007688 A1 | 1/2011 | Veeravalli |
| 2011/0047384 A1 | 2/2011 | Jacobs |
| 2011/0222423 A1 | 9/2011 | Spindola |
| 2011/0256834 A1 | 10/2011 | Dayal |
| 2011/0310858 A1 | 12/2011 | Tokgoz |
| 2012/0069232 A1 | 3/2012 | Chui |
| 2012/0077532 A1 | 3/2012 | Kadous |
| 2012/0113906 A1 | 5/2012 | Kadous |
| 2012/0127870 A1 | 5/2012 | Zhao |
| 2012/0127923 A1 | 5/2012 | Zhao |
| 2012/0140798 A1 | 6/2012 | Kadous |
| 2012/0163283 A1 | 6/2012 | Kim et al. |
| 2012/0213303 A1 | 8/2012 | Kadous |
| 2013/0027440 A1 | 1/2013 | Martin |
| 2013/0176935 A1 | 7/2013 | Kim et al. |
| 2013/0201959 A1 | 8/2013 | Guo |
| 2013/0214909 A1 | 8/2013 | Meijers |
| 2013/0217333 A1 | 8/2013 | Sprigg |
| 2013/0229990 A1 | 9/2013 | Fan |
| 2013/0235745 A1 | 9/2013 | Zhang et al. |
| 2013/0253918 A1 | 9/2013 | Jacobs |
| 2013/0294541 A1 | 11/2013 | Blanc et al. |
| 2013/0297422 A1 | 11/2013 | Hunter |
| 2013/0300358 A1 | 11/2013 | Kirby |
| 2013/0335528 A1 | 12/2013 | Vishwanath et al. |
| 2014/0029705 A1 | 1/2014 | Wu |
| 2014/0038645 A1 | 2/2014 | Wu |
| 2014/0056239 A1 | 2/2014 | Zhang |
| 2014/0071894 A1 | 3/2014 | Kairouz |
| 2014/0079155 A1 | 3/2014 | Wang |
| 2014/0089073 A1 | 3/2014 | Jacobs |
| 2014/0219117 A1 | 8/2014 | Meshkati |
| 2014/0219243 A1 | 8/2014 | Meshkati |
| 2014/0247814 A1 | 9/2014 | Zhang |
| 2014/0256340 A1 | 9/2014 | Prakash et al. |
| 2014/0269616 A1 | 9/2014 | Black |
| 2014/0273884 A1 | 9/2014 | Mantravadi |
| 2014/0285684 A1 | 9/2014 | Huang |
| 2014/0362744 A1 | 12/2014 | Yan |
| 2015/0063150 A1 | 3/2015 | Sadek |
| 2015/0063151 A1 | 3/2015 | Sadek |
| 2015/0063323 A1 | 3/2015 | Sadek |
| 2015/0065152 A1 | 3/2015 | Sadek |

(56) References Cited

U.S. PATENT DOCUMENTS

| | | |
|---|---|---|
| 2015/0070323 A1 | 3/2015 | Hong |
| 2015/0071648 A1 | 3/2015 | Hong |
| 2015/0083917 A1 | 3/2015 | Wyrwas |
| 2015/0084928 A1 | 3/2015 | Wyrwas |
| 2015/0084994 A1 | 3/2015 | Wyrwas |
| 2015/0085686 A1 | 3/2015 | Chande |
| 2015/0133184 A1 | 5/2015 | Sadek |
| 2015/0139015 A1 | 5/2015 | Kadous |
| 2015/0163823 A1 | 6/2015 | Sadek |
| 2015/0181299 A1 | 6/2015 | Rauber |
| 2015/0195733 A1 | 7/2015 | Yavuz |
| 2015/0223077 A1 | 8/2015 | Fan |
| 2015/0245273 A1 | 8/2015 | Grob |
| 2015/0282077 A1 | 10/2015 | Yavuz |
| 2015/0319702 A1 | 11/2015 | Patel |
| 2015/0326382 A1 | 11/2015 | Li |
| 2015/0350919 A1 | 12/2015 | Patel |
| 2015/0382190 A1 | 12/2015 | Canoy |
| 2016/0012489 A1 | 1/2016 | Rajan |
| 2016/0085440 A1 | 3/2016 | Canoy |
| 2016/0088625 A1 | 3/2016 | Kadous |
| 2016/0095039 A1 | 3/2016 | Valliappan |
| 2016/0095040 A1 | 3/2016 | Valliappan |
| 2016/0128130 A1 | 5/2016 | Sadek |
| 2016/0285534 A1 | 9/2016 | Li et al. |
| 2016/0315688 A1 | 10/2016 | Bhargava et al. |
| 2016/0316361 A1 | 10/2016 | Bhargava et al. |
| 2016/0337971 A1 | 11/2016 | Bhargava et al. |
| 2016/0353482 A1 | 12/2016 | Valliappan |
| 2017/0005741 A1 | 1/2017 | Wu |
| 2017/0013658 A1 | 1/2017 | Ta et al. |
| 2017/0019814 A1 | 1/2017 | Determan |
| 2017/0027017 A1 | 1/2017 | Black |
| 2017/0048047 A1 | 2/2017 | Kadous |
| 2017/0048889 A1 | 2/2017 | Kadous |
| 2017/0054488 A1 | 2/2017 | Michel et al. |
| 2017/0055260 A1 | 2/2017 | Valliappan |
| 2017/0055285 A1 | 2/2017 | Valliappan |
| 2017/0055291 A1 | 2/2017 | Gorokhov |
| 2017/0064657 A1 | 3/2017 | Chendamarai Kannan et al. |
| 2017/0064729 A1 | 3/2017 | Sadek |
| 2017/0070847 A1 | 3/2017 | Altman |
| 2017/0076311 A1 | 3/2017 | Rajan |
| 2017/0093545 A1 | 3/2017 | Kadous |
| 2017/0094680 A1 | 3/2017 | Patel |
| 2017/0135029 A1 | 5/2017 | Chendamarai Kannan |
| 2017/0142705 A1 | 5/2017 | Chendamarai Kannan |
| 2017/0142713 A1 | 5/2017 | Chendamarai Kannan |
| 2017/0202022 A1 | 7/2017 | Chendamarai Kannan |
| 2017/0208576 A1 | 7/2017 | Chendamarai Kannan |
| 2017/0222771 A1 | 8/2017 | Chendamarai Kannan |
| 2017/0223651 A1 | 8/2017 | Patel |
| 2017/0223737 A1 | 8/2017 | Patel |
| 2017/0251473 A1 | 8/2017 | Xue |
| 2017/0280382 A1 | 9/2017 | Radulescu |
| 2017/0311316 A1 | 10/2017 | Chendamarai Kannan |
| 2017/0311343 A1 | 10/2017 | Chendamarai Kannan |
| 2017/0311346 A1 | 10/2017 | Chendamarai Kannan |
| 2017/0318586 A1 | 11/2017 | Wang |
| 2017/0332288 A1 | 11/2017 | Sadek |
| 2017/0359263 A1 | 12/2017 | Barghi |
| 2017/0359815 A1 | 12/2017 | Chendamarai Kannan |
| 2018/0014311 A1 | 1/2018 | Bhargava et al. |
| 2018/0026703 A1 | 1/2018 | Bhargava et al. |
| 2018/0042018 A1 | 2/2018 | Bhushan |
| 2018/0054348 A1 | 2/2018 | Luo |
| 2018/0054382 A1 | 2/2018 | Luo |
| 2018/0054762 A1 | 2/2018 | Kadous |
| 2018/0054780 A1 | 2/2018 | Radulescu |
| 2018/0054783 A1 | 2/2018 | Luo |
| 2018/0054811 A1 | 2/2018 | Luo |
| 2018/0054812 A1 | 2/2018 | Luo |
| 2018/0054830 A1 | 2/2018 | Luo |
| 2018/0054832 A1 | 2/2018 | Luo |
| 2018/0059221 A1 | 3/2018 | Slobodyanyuk |
| 2018/0063799 A1 | 3/2018 | Sadek |
| 2018/0069589 A1 | 3/2018 | Liu |
| 2018/0070243 A1 | 3/2018 | Liu |
| 2018/0076878 A1 | 3/2018 | Ryu et al. |
| 2018/0084430 A1 | 3/2018 | Patel |
| 2018/0098225 A1 | 4/2018 | Damnjanovic |
| 2018/0098335 A1 | 4/2018 | Sun |
| 2018/0103461 A1 | 4/2018 | Sun |
| 2018/0103472 A1 | 4/2018 | Zhang |
| 2018/0109957 A1 | 4/2018 | Fan |
| 2018/0110022 A1 | 4/2018 | Fan |
| 2018/0110063 A1 | 4/2018 | Fan |
| 2018/0115907 A1 | 4/2018 | Damnjanovic |
| 2018/0115933 A1 | 4/2018 | Radulescu |
| 2018/0115973 A1 | 4/2018 | Black |
| 2018/0123859 A1 | 5/2018 | Liu |
| 2018/0124770 A1 | 5/2018 | Yerramalli |
| 2018/0124776 A1 | 5/2018 | Yerramalli |
| 2018/0124777 A1 | 5/2018 | Yerramalli |
| 2018/0124789 A1 | 5/2018 | Yerramalli |
| 2018/0124820 A1 | 5/2018 | Sun |
| 2018/0132236 A1 | 5/2018 | Kadous |
| 2018/0139616 A1 | 5/2018 | Khoshnevisan |
| 2018/0139618 A1 | 5/2018 | Yerramalli |
| 2018/0139782 A1 | 5/2018 | Sadek |
| 2018/0146480 A1 | 5/2018 | Chendamarai Kannan |
| 2018/0160328 A1 | 6/2018 | Chendamarai Kannan |
| 2018/0160389 A1 | 6/2018 | Yerramalli |
| 2018/0167848 A1 | 6/2018 | Lei |
| 2018/0167968 A1 | 6/2018 | Liu |
| 2018/0175986 A1 | 6/2018 | Chendamarai Kannan |
| 2018/0176946 A1 | 6/2018 | Sun |
| 2018/0198518 A1 | 7/2018 | Wu |
| 2018/0199379 A1 | 7/2018 | Bhargava et al. |
| 2018/0213560 A1 | 7/2018 | Naghshvar |
| 2018/0220428 A1 | 8/2018 | Sun |
| 2018/0227011 A1 | 8/2018 | Yerramalli |
| 2018/0227771 A1 | 8/2018 | Malik |
| 2018/0227797 A1 | 8/2018 | Liu |
| 2018/0227936 A1 | 8/2018 | Yerramalli |
| 2018/0227944 A1 | 8/2018 | Yerramalli |
| 2018/0241494 A1 | 8/2018 | Chendamarai Kannan |
| 2018/0241526 A1 | 8/2018 | Chendamarai Kannan |
| 2018/0242163 A1 | 8/2018 | Patel |
| 2018/0242223 A1 | 8/2018 | Chendamarai Kannan |
| 2018/0242232 A1 | 8/2018 | Chendamarai Kannan |
| 2018/0242277 A1 | 8/2018 | Liu |
| 2018/0242348 A1 | 8/2018 | Chendamarai Kannan |
| 2018/0249380 A1 | 8/2018 | Zhang |
| 2018/0249496 A1 | 8/2018 | Radulescu |
| 2018/0255561 A1 | 9/2018 | Barghi |
| 2018/0255584 A1 | 9/2018 | Sun |
| 2018/0262962 A1 | 9/2018 | Ta et al. |
| 2018/0269962 A1 | 9/2018 | Liu |
| 2018/0278363 A1 | 9/2018 | Bhushan |
| 2018/0279134 A1 | 9/2018 | Malik |
| 2018/0279156 A1 | 9/2018 | Malik |
| 2018/0279212 A1 | 9/2018 | Malik |
| 2018/0279292 A1 | 9/2018 | Luo |
| 2018/0287762 A1 | 10/2018 | Sun |
| 2018/0287840 A1 | 10/2018 | Akkarakaran |
| 2018/0287870 A1 | 10/2018 | Yerramalli |
| 2018/0288747 A1 | 10/2018 | Sun |
| 2018/0288749 A1 | 10/2018 | Sun |
| 2018/0288781 A1 | 10/2018 | Akkarakaran |
| 2018/0294911 A1 | 10/2018 | Sun |
| 2018/0295622 A1 | 10/2018 | Sadek |
| 2018/0302186 A1 | 10/2018 | Reddy |
| 2018/0302201 A1 | 10/2018 | Yoo |
| 2018/0302796 A1 | 10/2018 | Zhang |
| 2018/0309479 A1 | 10/2018 | Yerramalli |
| 2018/0310267 A1 | 10/2018 | Liu |
| 2018/0310341 A1 | 10/2018 | Yerramalli |
| 2018/0317093 A1 | 11/2018 | Li |
| 2018/0317259 A1 | 11/2018 | Islam |
| 2018/0324713 A1 | 11/2018 | Yoo |
| 2018/0331870 A1 | 11/2018 | Sun |
| 2018/0332551 A1 | 11/2018 | Liu |
| 2018/0338299 A1 | 11/2018 | Liu |

(56) References Cited

U.S. PATENT DOCUMENTS

| | | |
|---|---|---|
| 2018/0343156 A1 | 11/2018 | Malik |
| 2018/0343588 A1 | 11/2018 | Sadek |
| 2018/0343676 A1 | 11/2018 | Yerramalli |
| 2018/0352563 A1 | 12/2018 | Liu |
| 2018/0359656 A1 | 12/2018 | Liu |
| 2018/0359685 A1 | 12/2018 | Li |
| 2018/0367362 A1 | 12/2018 | Sun |
| 2018/0368089 A1 | 12/2018 | Yerramalli |
| 2018/0376392 A1 | 12/2018 | Wu |
| 2018/0376393 A1 | 12/2018 | Wu |
| 2018/0376503 A1 | 12/2018 | Sun |
| 2019/0007946 A1 | 1/2019 | Yerramalli |
| 2019/0009756 A1 | 1/2019 | Jacobs |
| 2019/0014481 A1 | 1/2019 | Yerramalli |
| 2019/0014507 A1 | 1/2019 | Zhang |
| 2019/0014589 A1 | 1/2019 | Yerramalli |
| 2019/0020424 A1 | 1/2019 | Yerramalli |
| 2019/0020461 A1 | 1/2019 | Yerramalli |
| 2019/0020522 A1 | 1/2019 | Sun |
| 2019/0020527 A1 | 1/2019 | Lei |
| 2019/0020528 A1 | 1/2019 | Lei |
| 2019/0020529 A1 | 1/2019 | Lei |
| 2019/0021080 A1 | 1/2019 | Lei |
| 2019/0028999 A1 | 1/2019 | Yerramalli |
| 2019/0029019 A1 | 1/2019 | Zhang |
| 2019/0037376 A1 | 1/2019 | Liu |
| 2019/0037427 A1 | 1/2019 | Yerramalli |
| 2019/0037481 A1 | 1/2019 | Zhang |
| 2019/0037482 A1 | 1/2019 | Damnjanovic |
| 2019/0037525 A1 | 1/2019 | Liu |
| 2019/0037603 A1 | 1/2019 | Damnjanovic |
| 2019/0053048 A1 | 2/2019 | Bhargava et al. |
| 2019/0053269 A1 | 2/2019 | Lei |
| 2019/0059001 A1 | 2/2019 | Yerramalli |
| 2019/0059102 A1 | 2/2019 | Yerramalli |
| 2019/0069325 A1 | 2/2019 | Yerramalli |
| 2019/0075597 A1 | 3/2019 | Yerramalli |
| 2019/0253844 A1 | 8/2019 | Ta et al. |

OTHER PUBLICATIONS

3GPP TR 36.741, Study on Further Enhancements to Coordinated Multi-Point (CoMP) Operation for LTE, V14.0.0, Mar. 2017.

Agrawal, et al., Dynamic Point Selection for LTE-Advanced: Algorithms and Performance, Wireless Communications and Networking Conference (WCNC), 2014 IEEE, Istanbul, Turkey, Apr. 2014, pp. 1392-1397.

Andrews, et al., Are We Approaching the Fundamental Limits of Wireless Network Densification?, IEEE Communications Magazine, vol. 54, No. 10, pp. 184-190, Oct. 2016.

Björnson, et al., Cooperative Multicell Precoding: Rate Region Characterization and Distributed Strategies with Instantaneous and Statistical CSI, IEEE Transactions on Signal Processing, vol. 58, No. 8, pp. 4298-4310, Aug. 2010.

Buzzi, et al., Cell-Free Massive MIMO: User-Centric Approach, IEEE Wireless Communications Letters, vol. 6, No. 6, pp. 706-709, Dec. 2017.

Checko, et al., Cloud RAN for Mobile Networks—a Technology Overview, IEEE Communications Surveys & Tutorials, vol. 17, No. 1, Sep. 2014.

Chen, et al., Channel Hardening and Favorable Propagation in Cell-Free Massive MIMO with Stochastic Geometry, version 1, 2017. Available at: http://arxiv.org/abs/1710.00395.

Chen, et al., Channel Hardening and Favorable Propagation in Cell-Free Massive MIMO with Stochastic Geometry, version 2, 2018. Available at: http://arxiv.org/abs/1710.00395.

Davydov, et al., Evaluation of Joint Transmission CoMP in C-RAN based LTE-A HetNets with Large Coordination Areas, Proc. GLOBECOM'14, Atlanta, U.S., Dec. 2013, pp. 801-806.

Forenza, et al., Achieving Large Multiplexing Gain in Distributed Antenna Systems via Cooperation with pCell Technology, 49th Asilomar Conference on Signals, Systems and Computers, Nov. 2015, IEEE, pp. 286-293.

Gesbert, et al., Multi-cell MIMO Cooperative Networks: A New Look at Interference, IEEE Journal on Selected Areas in Communications, vol. 28, No. 9, pp. 1380-1408, Dec. 2010.

Gilhousen, et al., On the Capacity of a Cellular CDMA system, IEEE Transactions on Vehicular Technology, vol. 40, No. 2, pp. 303-311, May 1991.

Interdonato, et al., How Much Do Downlink Pilots Improve Cell-Free Massive MIMO?, IEEE, 2016, 7 pages.

Larsson, et al., Massive MIMO for Next Generation Wireless Systems, Jan. 2014.

Marzetta, et al., Fundamentals of Massive MIMO, Cambridge University Press, Dec. 2016, Table of Contents.

Nayebi, et al., Precoding and Power Optimization in Cell-Free Massive MIMO Systems, IEEE Transactions on Wireless Communications, vol. 16, No. 7, pp. 4445-4459, Jul. 2017.

Ngo, et al., Cell-Free Massive MIMO Versus Small Cells, IEEE Transactions on Wireless Communications, vol. 16, No. 3, pp. 1834-1850, Mar. 2017.

Ngo, et al., On the Total Energy Efficiency of Cell-Free Massive MIMO, IEEE Transactions on Green Communications and Networking, vol. 2, No. 1, pp. 25-39, Mar. 2018.

Osseiran, et al., 5G Mobile and Wireless Communications Technology, Cambridge University Press, Oct. 2016, Ch. 9, Coordinated multi-point transmission in 5G.

Rohde & Schwarz, LTE Transmission Modes and Beamforming, White Paper, Jul. 2015.

Shamai, et al., Enhancing the Cellular Downlink Capacity via Co-processing at the Transmitting End, Proceedings of IEEE VTC—Spring, vol. 3, 2001, pp. 1745-1749.

Sun, et al., Performance Evaluation of CS/CB for Coordinated Multipoint Transmission in LTE-A Downlink, Proceedings of IEEE PIMRC'12, Sydney, Australia, Sep. 2012, pp. 1061-1065.

Tanghe, et al., The Industrial Indoor Channel: Large-Scale and Temporal Fading at 900, 2400, and 5200 MHz, IEEE Transactions on Wireless Communications, vol. 7, No. 7, pp. 2740-2751, Jul. 2008.

Wu et al., Cloud Radio Access Network (C-RAN): A Primer, IEEE Network, vol. 29, No. 1, pp. 35-41, Jan./Feb. 2015.

Wu et al. Centralized and Distributed Schedulers for Non-Coherent Joint Transmission, Sep. 2018.

Zhou, et al., Distributed Wireless Communication System: A New Architecture for Future Public Wireless Access, IEEE Communications Magazine, vol. 41, No. 3, pp. 108-113, Mar. 2003.

Zheng, Zeyu, et al., "On the relay selection for cooperative wireless networks with physical-layer network coding," Wireless Netw (2012), Mar. 13, 2012, pp. 653-665.

International Search Report dated May 20, 2020 for International Patent Application No. PCT/US2020/015594.

Written Opinion dated May 20, 2020 for International Patent Application No. PCT/US2020/015594.

* cited by examiner

USER EQUIPMENT FOR WIRELESSLY COMMUNICATING CELLULAR SIGNAL WITH ANOTHER USER EQUIPMENT

BACKGROUND

Technical Field

Embodiments of this disclosure relate to wireless communication systems and/or devices arranged to wirelessly communicate with other devices.

Description of Related Technology

The types of modern computing devices continues to increase along with the differing and dynamic needs of each device. The wireless communication systems providing services to such devices are facing increasing constraints on resources and demands for quality and quantities of service. Accordingly, improvements in providing wireless communication services, such as in a multiple-input multiple-output system, are desired.

BRIEF DESCRIPTION OF THE DRAWINGS

Embodiments of this disclosure will now be described, by way of non-limiting example, with reference to the accompanying drawings.

SUMMARY OF CERTAIN INVENTIVE ASPECTS

Figure 1:
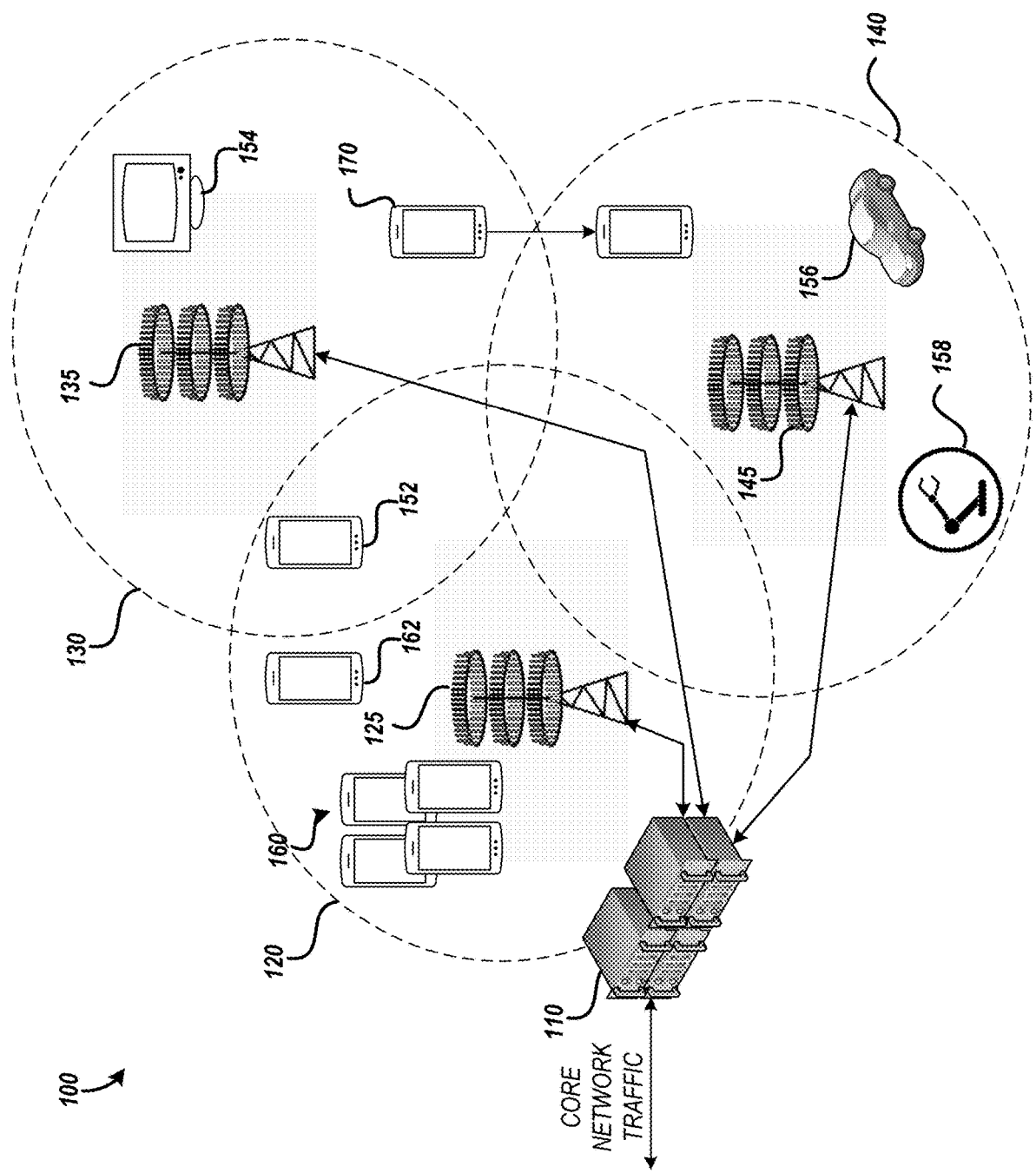
FIG. 1 is a diagram illustrating an example multiple-input multiple-output (MIMO) network in which user equipment (UE) and a network system wirelessly communicate.

The innovations described in the claims each have several aspects, no single one of which is solely responsible for its desirable attributes. Without limiting the scope of the claims, some prominent features of this disclosure will now be briefly described.

One aspect of this disclosure is a user equipment that includes a baseband processor and a transceiver in communication with the baseband processor. The transceiver includes a receive path and a transmit path. The transceiver is configurable into at least a first mode and a second mode. The receive path is coupled to the transmit path in an analog domain in the first mode. The receive path is configured to receive a receive downlink cellular signal in the first mode. The transmit path is configured to output a transmit downlink cellular signal in the first mode. In the first mode, the transceiver is also configured to receive a receive uplink cellular signal and output a transmit uplink cellular signal. In the second mode, the transceiver is configured to generate an uplink radio frequency signal based on an output signal from the baseband processor, to process a received downlink radio frequency signal, and to downconvert the processed downlink radio frequency signal to baseband.

Another aspect of this disclosure is a method of data transmission. The method includes receiving, by a receive path of a first user equipment, a receive downlink cellular signal in a first mode. The receive path of the first user equipment is coupled to a transmit path of the first user equipment in an analog domain in the first mode. The method includes transmitting, via the transmit path of the first user equipment, a transmit downlink cellular signal to a second user equipment in the first mode. The method includes receiving, by the first user equipment, a receive uplink cellular signal in the first mode. The method includes transmitting, by the first user equipment, a transmit uplink cellular signal to the second user equipment in the first mode. The method includes toggling a mode of the first user equipment from the first mode to a second mode. The method includes generating a transmit uplink cellular signal based on an output of a baseband processor of the first user equipment in the second mode. The method includes transmitting, by the first user equipment, the transmit uplink cellular signal in the second mode.

Another aspect of this disclosure is a user equipment that includes a baseband processor and a transceiver in communication with the baseband processor. The transceiver is configurable into at least a virtual transmit-receive point mode and a traffic mode. In the virtual transmit-receive point mode, the transceiver is configured to receive a downlink cellular signal, process the downlink cellular signal without demodulation to baseband and by at least frequency translating the downlink cellular signal, and output the processed downlink cellular signal for wireless transmission by the user equipment. In the virtual transmit-receive point mode, the transceiver is further configured to receive an uplink cellular signal, process the uplink cellular signal without demodulation to baseband and by at least frequency translating the uplink cellular signal, and output the processed uplink cellular signal for wireless transmission by the user equipment. In the traffic mode, the transceiver is configured to generate an uplink radio frequency signal based on an output signal from the baseband processor, to process a received downlink radio frequency signal, and to downconvert the processed downlink radio frequency signal to baseband.

Another aspect of this disclosure is a method of downlink data transmission. The method includes transmitting, by a network system, downlink data for a first user equipment to the first user equipment while the first user equipment is operating in a traffic mode. The method includes determining, by the network system, to use the first user equipment as a repeater for wirelessly communicating with at least one second user equipment. The method includes signaling, by the network system, to the first user equipment to operate in a repeater mode. The first user equipment is configured to function as a repeater in the repeater mode. The method includes transmitting, by the network system, first downlink data for the at least one second user equipment to the first user equipment while the first user equipment is operating in the repeater mode. The first user equipment operates in the repeater mode at a different time than operating in the traffic mode. The method also includes transmitting, by the network system, second downlink data for the at least one second user equipment to the at least one second user equipment while the first user equipment is operating in the repeater mode.

Another aspect of this disclosure is method of processing uplink data. The method includes receiving, by a network system, uplink data for a first user equipment from the first user equipment while the first user equipment is operating in a traffic mode. The method includes determining, by the network system, to use the first user equipment as a repeater for wirelessly communicating with at least one second user equipment. The method includes signaling, by the network system, to the first user equipment to operate in a repeater mode. The first user equipment is configured to function as a repeater in the repeater mode. The method includes receiving, by the network system, first uplink data for the at least one second user equipment from the first user equipment while the first user equipment is operating in the repeater mode. The first user equipment operates in the repeater mode at a different time than operating in the traffic mode. The method includes receiving, by the network system, second uplink data for the at least one second user equipment from the at least one second user equipment while the first user equipment is operating in the repeater mode. The method includes jointly processing, by the network system, the first uplink data together with the second uplink data.

Another aspect of this disclosure is a network system that includes a plurality of antennas and a base band unit in communication with the plurality of antennas. The base band unit is arranged to process data associated with wireless communication via one or more of the plurality of antennas. The base band unit configured to: cause transmission of downlink data for a first user equipment to the first user equipment while the first user equipment operates in a traffic mode; determine to use the first user equipment as a repeater for wirelessly communicating with at least one second user equipment; cause the network system to signal to the first user equipment to operate in a repeater mode, wherein the first user equipment is configured to function as a repeater in the repeater mode; cause transmission of first downlink data for the at least one second user equipment to the first user equipment while the first user equipment is operating in the repeater mode; cause transmission of second downlink data for the at least one second user equipment to the at least one second user equipment while the first user equipment is operating in the repeater mode; receive first uplink data for the at least one second user equipment from the first user equipment while the first user equipment is operating in the repeater mode; receive second uplink data for the at least one second user equipment from the at least one second user equipment while the first user equipment is operating in the repeater mode; and jointly process the first uplink data together with the second uplink data.

Another aspect to this disclosure is method of downlink data transmission. The method includes transmitting, by a network system, downlink data for a first user equipment to the first user equipment while the first user equipment is operating in a traffic mode. The method includes determining, by the network system, to use the first user equipment as a virtual transmit-receive point of the network system for wirelessly communicating multiple-input multiple-output (MIMO) data with at least one second user equipment. The method includes signaling, by the network system, to the first user equipment to operate in a virtual transmit-receive point mode. The method includes transmitting, by the network system, downlink data for the at least one second user equipment to the first user equipment while the first user equipment is operating in the virtual transmit-receive point mode. The first user equipment operates in the virtual transmit-receive point mode at a different time than operating in the traffic mode.

Another aspect of this disclosure is method of processing uplink data. The method includes receiving, by a network system, uplink data for a first user equipment from the first user equipment while the first user equipment is operating in a traffic mode. The method includes determining, by the network system, to use the first user equipment as a virtual transmit-receive point of the network system for wirelessly communicating multiple-input multiple-output (MIMO) data with at least one second user equipment. The method includes signaling, by the network system, to the first user equipment to operate in a virtual transmit-receive point mode. The method includes receiving, by the network system, uplink data for the at least one second user equipment from the first user equipment while the first user equipment is operating in the virtual transmit-receive point mode. The first user equipment operates in the virtual transmit-receive point mode at a different time than operating in the traffic mode. The method includes processing, by the network system, the uplink data for the at least one second user equipment.

Another aspect of this disclosure is a network system that includes a plurality of antennas and a base band unit in communication with the plurality of antennas. The base band unit is arranged to process data associated with wireless communication via one or more of the plurality of antennas. The base band unit configured to: cause transmission of downlink data for a first user equipment to the first user equipment while the first user equipment is operating in a traffic mode; determine to use the first user equipment as a virtual transmit-receive point of the network system for wirelessly communicating data with at least one second user equipment; cause the network system to signal to the first user equipment to operate in a virtual transmit-receive point mode; cause transmission of downlink data for the at least one second user equipment to the first user equipment while the first user equipment is operating in the virtual transmit-receive point mode; receive uplink data for the at least one second user equipment from the first user equipment while the first user equipment is operating in the virtual transmit-receive point mode; and process the uplink data for the at least one second user equipment.

The present disclosure relates to U.S. patent application Ser. No. 16/268,346, titled "COMMUNICATION WITH USER EQUIPMENT ARRANGED TO WIRELESSLY COMMUNICATE WITH ANOTHER USER EQUIPMENT," filed on even date herewith and the disclosure of which is hereby incorporated by reference in its entirety herein. The present disclosure relates to U.S. patent application Ser. No. 16/268,343, titled "COMMUNICATION WITH USER EQUIPMENT ARRANGED TO OPERATE AS VIRTUAL TRANSMIT-RECEIVE POINT," filed on even date herewith and the disclosure of which is hereby incorporated by reference in its entirety herein.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

DETAILED DESCRIPTION OF CERTAIN EMBODIMENTS

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

A wireless carrier network, such as a distributed coordinated multiple-input multiple-output (MIMO) network, can be capacity limited. Resources of the network can constrain MIMO dimension and/or network coverage. This disclosure provides technical solutions to increase MIMO dimension and/or provide strategic scattering and/or extend network coverage boundaries. Technical features disclosed herein can be implemented in private and/or public networks.

Technology disclosed herein relates to enabling a user equipment (UE) to function as a virtual network element that can operate as one or more of a repeater, a virtual transmit-receive point (TRP) (e.g., a virtual coordinated multi-point (CoMP) TRP), or a virtual remote radio unit (RRU). UEs disclosed herein can operate as a MIMO TRP of a network system and/or operate as a repeater of a network system. Hardware of the UE together with network configuration can implement such features. A UE can include radio frequency (RF) circuitry arranged to process a received RF signal and generate a transmit RF signal without intervening baseband processing. Accordingly, such RF circuitry can be implemented entirely by analog circuitry. The RF circuitry can process a received RF signal and generate a transmit RF signal entirely in the RF domain without demodulation to baseband. In some instances, the RF circuitry can frequency translate a received RF signal and generate a transmit RF signal having a different carrier frequency than the received RF signal. Alternatively or additionally, the RF circuitry can process a received RF signal and generate a transmit RF signal without modulation and/or demodulation. According to some applications, the RF circuitry can perform front haul processing on a received RF signal. A network system can signal the UE to operate in a mode for operating as a virtual network element, such a repeater mode or a TRP mode. Embodiments of the technology disclosed herein can achieve one or more of richer scattering, higher network MIMO dimension, or extended network coverage.

Aspects of this disclosure relate to a UE with RF circuitry that enables the UE to function as a network repeater and/or a virtual MIMO TRP such as a virtual RRU. The UE can function as a virtual MIMO TRP or a repeater in response to a command from a network system. A UE operating as a MIMO TRP and/or a repeater can receive incentives and/or be rewarded. The network system can configure one or more UEs as virtual network elements in a manner that provides little and/or minimal disruption to network operation while increasing and/or maximizing overall network system spectral efficiency.

A multi-radio UE with RF translation circuitry can be arranged such that one or more of the radios can communicate with a network system as backhaul (e.g., dedicated band or in-band) with one or more other radios function as part of the network. One or more of the radios of a multi-radio UE with RF translation circuitry can be downlink transmitters upon receiving downlink data from one or more other network nodes. One or more of the radios of a multi-radio UE with RF translation circuitry can be uplink transmitters upon receiving uplink data from one or more other UEs. A network system can signal to the UE to operate in a virtual TRP mode during an idle more or during selected time slots of a traffic mode, for example.

Technology described herein can bring flexibility and scalability into a network deployment where coverage and capacity can be scaled up quickly. Embodiments disclosed herein can enable a network system to efficiently balance traffic in uplink and downlink and make use of idle UEs to increase network capacity utilization. Certain advantages disclosed herein can be achieved through (a) UE RF circuitry from integrated backhaul to over-the-air downlink transmission and (b) network configuration that enables the UE to switch in/out of a virtual network element mode relatively quickly. With technology disclosed herein, a network with M nodes and N UEs, in which N is greater than M, can configure one or more of the N UEs to function as a virtual network element and thereby achieve increased spectral efficiency. In accordance with embodiments disclosed herein, the number of effective network nodes that can provide coverage to a set of UEs can be increased by selectively converting one or more other UEs into virtual network elements. The resulting increase in antenna elements and/or signal processing chains from using certain UEs as virtual network elements can increase the MIMO order for wireless communications with one or more UEs of the set of UEs.

MIMO Network

FIG. 1 is a diagram illustrating a multiple-input multiple-output (MIMO) network in which user equipment (UE) and a network system wirelessly communicate according. FIG. 1 shows an example environment 100 for MIMO wireless communications. Various UEs can communicate with a network system via MIMO communications in the environment 100. One or more UEs of the environment 100 can operate as a virtual network element for facilitating communication between the network system and another UE of the environment. For example, one or more UEs can operating as network TRPs in the environment 100. Such UEs can perform processing functions of a remote radio unit. As another example, one or more UEs can operate as network repeaters in the environment 100.

Various standards and protocols may be implemented in the environment 100 to wirelessly communicate data between a base station and a wireless communication device. Some wireless devices may communicate using an orthogonal frequency-division multiplexing (OFDM) digital modulation scheme via a physical layer. Example standards and protocols for wireless communication in the environment 100 can include the third generation partnership project (3GPP) Long Term Evolution (LTE), Long Term Evolution Advanced (LTE Advanced), 3GPP New Radio (NR) also known as 5G, Global System for Mobile Communications (GSM), Enhanced Data Rates for GSM Evolution (EDGE), Worldwide Interoperability for Microwave Access (WiMAX), and the IEEE 802.11 standard, which may be known as Wi-Fi. In some systems, a radio access network (RAN) may include one or more base station associated with one or more evolved Node Bs (also commonly denoted as enhanced Node Bs, eNodeBs, or eNBs), gNBs, or any other suitable Node Bs (xNBs). In some other embodiments, radio network controllers (RNCs) may be provided as the base stations. A base station provides a bridge between the wireless network and a core network such as the Internet. The base station may be included to facilitate exchange of data for the wireless communication devices of the wireless network.

A wireless communication device may be referred to as a user equipment (UE). The UE may be a device used by a user such as a smartphone, a laptop, a tablet computer, cellular telephone, a wearable computing device such as smart glasses or a smart watch or an ear piece, one or more networked appliances (e.g., consumer networked appliances or industrial plant equipment), an industrial robot with connectivity, or a vehicle. In some implementations, the UE may include a sensor or other networked device configured to collect data and wirelessly provide the data to a device (e.g., server) connected to a core network such as the Internet. Such devices may be referred to as Internet of Things devices (IoT devices). Any suitable UE disclosed herein can include circuitry that enables the UE to operate as a virtual network element. A downlink (DL) transmission generally refers to a communication from the base transceiver station (BTS) or eNodeB to the wireless communication device. An uplink (UL) transmission generally refers to a communication from the wireless communication device to the BTS.

FIG. 1 illustrates a cooperative, or cloud radio access network (C-RAN) environment 100. In the environment 100, the eNodeB functionality is subdivided between a base band unit (BBU) 110 and multiple remote radio units (RRUs) (e.g., RRU 125, RRU 135, and RRU 145). The network system of FIG. 1 includes the BBU 110 and the RRUs 125, 135, and 145. An RRU may include multiple antennas, and one or more of the antennas may serve as a transmit-receive point (TRP). The RRU and/or a TRP may be referred to as a serving node. The BBU 110 may be physically connected to the RRUs such as via an optical fiber connection. The BBU 110 may provide operational information to an RRU to control transmission and reception of signals from the RRU along with control data and payload data to transmit. The RRU may provide data received from UEs within a service area associated with the RRU to the network. As shown in FIG. 1, the RRU 125 provides service to devices within a service area 120. The RRU 135 provides service to devices within a service area 130. The RRU 145 provides service to devices within a service area 140. For example, wireless downlink transmission service may be provided to the service area 140 to communicate data to one or more devices within the service area 140.

The illustrated RRUs 125, 135, and 145 include multiple antennas and can provide MIMO communications. For example, an RRU may be equipped with various numbers of transmit antennas (e.g., 2, 4, 8, or more) that can be used simultaneously for transmission to one or more receivers, such as a UE. Receiving devices may include more than one receive antenna (e.g., 2, 4, etc.). An array of receive antennas may be configured to simultaneously receive transmissions from the RRU. Each antenna included in an RRU may be individually configured to transmit and/or receive according to a specific time, frequency, power, and direction configuration. Similarly, each antenna included in a UE may be individually configured to transmit and/or receive according to a specific time, frequency, power, and direction configuration. The configuration may be provided by the BBU 110. The direction configuration may be generated based on a network estimate using channel reciprocity and/or determined based on feedback from UE via selection of a beamforming codebook index, or a hybrid of the two.

The service areas shown in FIG. 1 may provide communication services to a heterogeneous population of user equipment. For example, the service area 120 may include a cluster of UEs 160 such as a group of devices associated with users attending a large event. The service area 120 can also include an additional UE 162 that is located away from the cluster of UEs 160. A mobile user equipment 170 may move from the service area 130 to the service area 140. Another example of a mobile user equipment is a vehicle 156 which may include a transceiver for wireless communications for real-time navigation, on-board data services (e.g., streaming video or audio), or other data applications. The environment 100 may include semi-mobile or stationary UEs, such as robotic device 158 (e.g., robotic arm, autonomous drive unit, or other industrial or commercial robot) or a television 154, configured for wireless communications.

A user equipment 152 may be located with an area with overlapping service (e.g., the service area 120 and the service area 130). Each device in the environment 100 may have different performance needs which may, in some instances, conflict with the needs of other devices.

One or more UEs in the environment 100 can function as a virtual network element. For example, the UE 162 can function as a repeater or a TRP for a UE of the cluster of UEs 160. As another example, the UE 152 can be idle and the network system can signal the UE 152 to operate as a repeater or a TRP for the UE 162. In these examples, the network system can increase throughput, increase MIMO dimensionality, improve signal quality, and/or increase overall spectral efficiency of the network system, among other things.

Increasing Network Performance Using UE as Virtual Network Element

In various MIMO network environments, one or more UEs can be used as virtual network elements to increase network performance. Such a UE can operate as a repeater and/or as a virtual TRP and/or virtual RRU. A UE operating as a network repeater can provide strategic scattering within a network environment. A UE operating as a virtual TRP can increase dimensionality of MIMO wireless communications in the network environment. Such a UE can assist with TRP calibration of a network TRP. The UE operating as a virtual TRP can extend network coverage beyond a coverage area served by TRPs of a network system. In certain instances, a UE arranged to operate as a repeater and/or a virtual TRP can be arranged to operate as a relay in which the UE can receive data for itself and one or more neighboring UEs in an area with relatively poor coverage. Example network environments will be discussed with reference to FIGS. 2A to 2D. Any suitable principles and advantages disclosed in connection with FIGS. 2A to 2D can be implemented together with each other and/or together with any other principles and advantages disclosed herein.

Figure 2A:
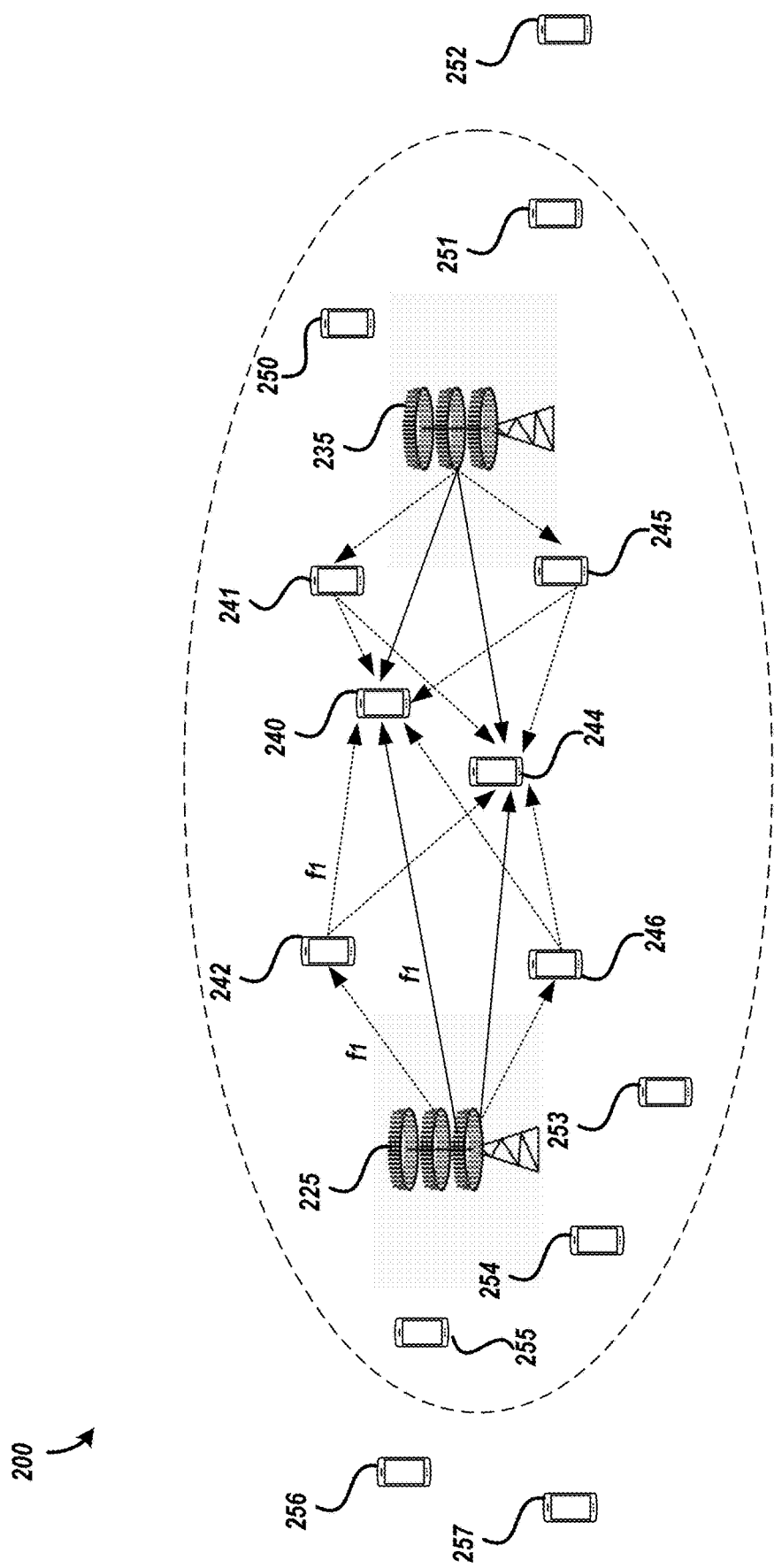
FIG. 2A is a diagram illustrating a MIMO network environment in which UEs operate as network repeaters according to an embodiment.

FIG. 2A is a diagram illustrating a MIMO network environment 200 in which UEs operate as network repeaters according to an embodiment. In the MIMO network environment 200, RRUs 225 and 235 each wirelessly communicate with UEs in data traffic mode and UEs functioning as repeaters. Accordingly, certain UEs in the MIMO network environment 200 wirelessly communicate with other UEs operating as network repeaters and also wirelessly communicate with RRUs of the network system. As shown in FIG. 2A, the example MIMO network environment 200 includes RRUs 225 and 235 and UEs 240, 241, 242, 243, 244, 245, 246, 250, 251, 252, 253, 254, 255, 256, and 257. In the MIMO network environment 200, the network system is serving UEs 240 and 244. UEs 241, 242, 245, and 246 are operating as repeaters in FIG. 2A. UEs 250 to 257 are not wirelessly communicating with the network system in the MIMO network environment 200.

The RRUs 225 and 235 each wirelessly communicate data associated with the UE 240 to the UE 240. The RRU 225 also wirelessly communicates data associated with the UE 240 to the UEs 242 and 246. As illustrated, the UEs 242 and 246 can operate as network repeaters to wirelessly communicate data downlink data from the RRU 225 to the UE 240. When a UE operates as a network repeater, the UE can receive a receive downlink data transmission and transmit a transmit downlink data transmission at substantially the same carrier frequency. A UE operating as a network repeater can perform signal amplification and filter without demodulation. FIG. 2A illustrates that a downlink data transmission from the RRU 225 to the UE 242 and a downlink data transmission from the UE 242 to the UE 240 can both have a carrier frequency $f_1$. The RRU 225 can also transmit downlink data with the carrier frequency $f_1$ to the UE 240. The UE 240 can also receive data from the network system from the RRU 235 and the UEs 241 and 245 operating as network repeaters. Wireless communication between the network system and the UE 244 can be implemented similarly to wireless communication between the network system and the UE 240 in the MIMO network environment 200.

As shown in FIG. 2A, UEs operating as network repeaters can perform repeater functionality for downlink data transmitted to more than one other UE. For example, the UE 242 can operate as a network repeater for both the UE 240 and the UE 244. In certain other applications, a UE can operate as a repeater for a single other UE. According to some other applications, a UE can operate a repeater for three or more other UEs.

In the MIMO network environment 200 of FIG. 2A, the UEs operating as repeaters can increase a signal-to-noise ratio (SNR) at the UEs 240 and 244. This can increase the spectral efficiency and/or potential MIMO order. Alternatively or additionally, UEs operating as a repeater can improve links to the RRU 225 and the RRU 235 such that the order of joint MIMO transmission from these nodes can be increased.

Although FIG. 2A illustrates downlink wireless communication, uplink wireless communication can be implemented in accordance with similar principles and advantages as downlink wireless communication in the MIMO network environment 200.

Figure 2B:
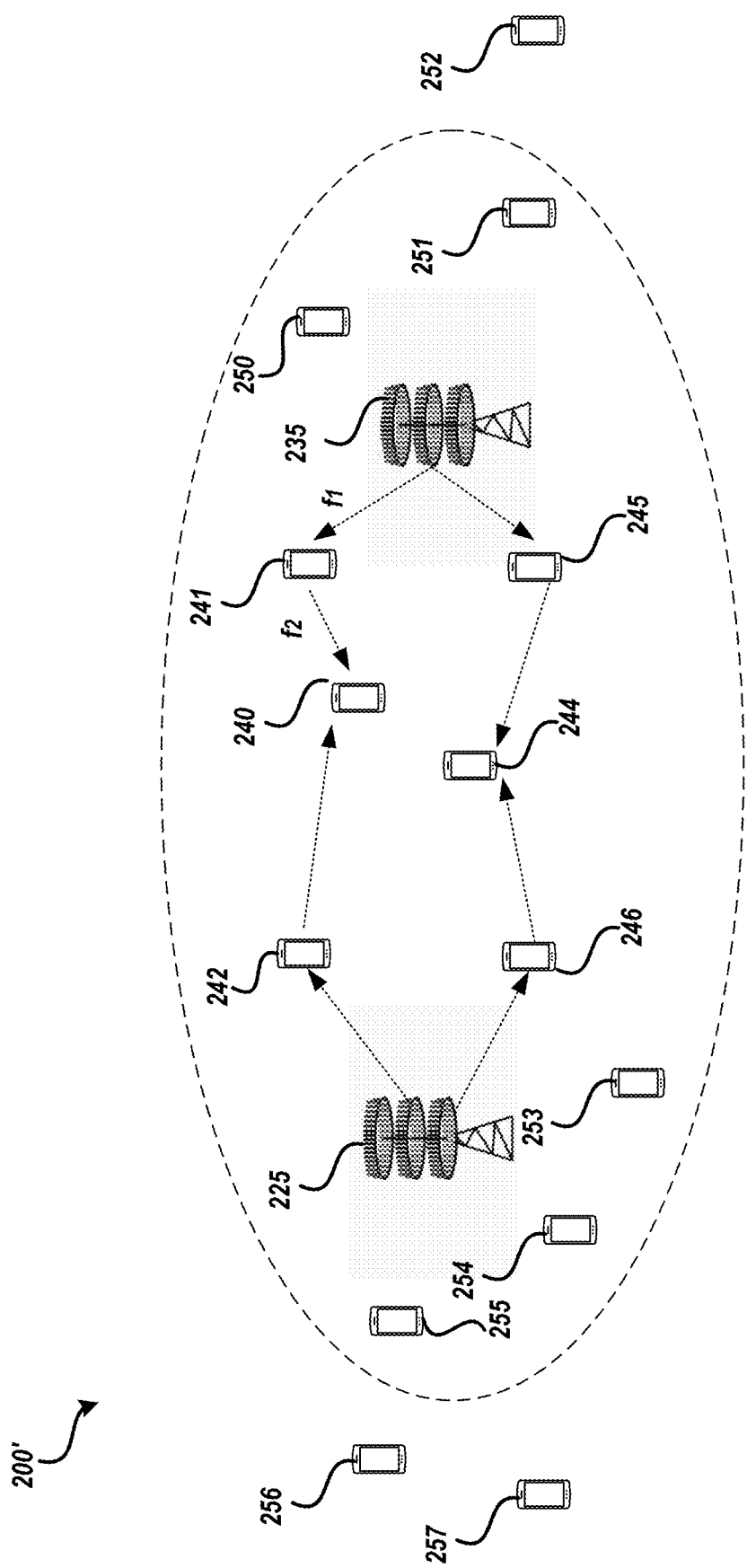
FIG. 2B is a diagram illustrating a network environment in which UEs operate as network transmit-receive points (TRPs) according to an embodiment.

FIG. 2B is a diagram illustrating a network environment 200' in which UEs operate as network TRPs according to an embodiment. In the network environment 200', the network system communicates with UEs operating as network TRPs and the UEs operating as network TRPs wirelessly communicate with other UEs. The example network environment 200' includes the same devices as the MIMO network environment 200 of FIG. 2A. There is different wireless communication in the network environment 200' than in the MIMO network environment 200.

As illustrated in FIG. 2B, the network system wirelessly communicates with UEs operating as TRPs. For instance, the RRU 235 can wirelessly communicate with UEs 241 and 245. Similarly, the RRU 225 can wirelessly communicate with UEs 242 and 246.

A UE operating as a TRP can receive a receive downlink data transmission for another UE and generate a transmit downlink data transmission for the other UE. Generating the transmit downlink data transmission can involve frequency translation in the RF domain. For example, as shown in the example network environment 200', the RRU 235 can transmit a downlink cellular signal with a first carrier frequency $f_1$ to the UE 241 and the UE 241 can generate a downlink cellular signal with a second carrier frequency $f_2$ to the UE 240, in which the first and second carrier frequencies are different. In certain applications, the UE 241 can receive a millimeter wave (mmW) signal from the RRU 235 and transmit a RF signal having a frequency of less than 6 gigahertz (GHz) to the UE 241. UEs 242, 245, and 246 can operate similarly to the UE 241 in the network environment 200'.

Although the UEs operating as TRPs shown in FIG. 2B are each wirelessly communicating with one other UE, a UE operating as a TRP can wirelessly communicate with two or more other UEs in various other applications. The number and/or type of antennas of the UE can determine a number of other UEs with which it can wirelessly communicate. Alternatively or additionally, the number of transmit and/or receive signal chains of the UE can determine a number of other UEs with which it can wirelessly communicate.

Although FIG. 2B illustrates downlink wireless communication, uplink wireless communication can be implemented in accordance with similar principles and advantages as downlink wireless communication in the network environment 200'.

Figure 2C:
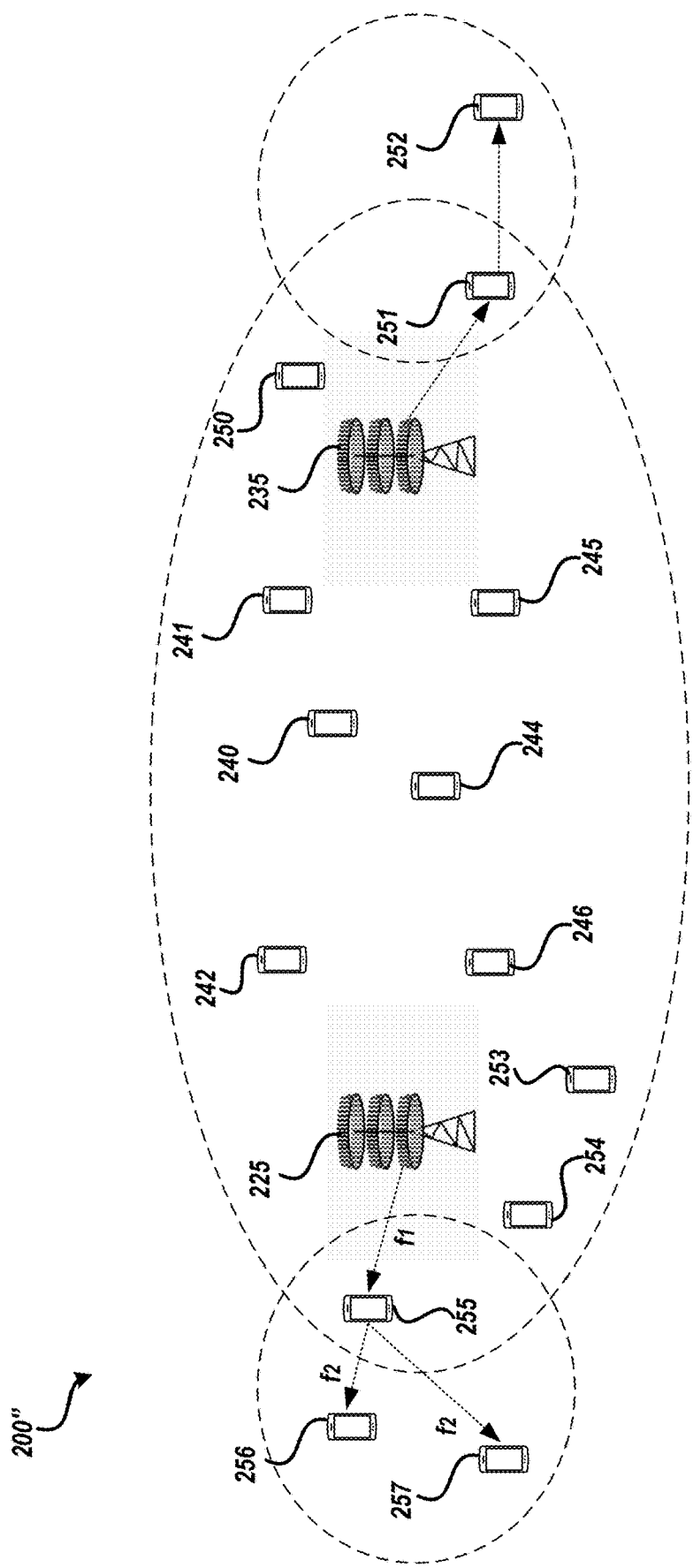
FIG. 2C is a diagram illustrating a network environment in which UEs operate as network TRPs according to another embodiment.

FIG. 2C is a diagram illustrating a network environment 200" in which UEs operate as network TRPs according to another embodiment. In the network environment 200", the network system communicates with UEs operating as network TRPs and the UEs operating as network TRPs wirelessly communicate with other UEs that are outside of the network coverage area of the RRUs 225 and 235. The example network environment 200" includes the same devices as the MIMO network environment 200 of FIG. 2A. There is different wireless communication in the network environment 200" than in the MIMO network environment 200.

As illustrated in FIG. 2C, the network system wirelessly communicates with UEs operating as TRPs. For instance, the RRU 225 can wirelessly communicate with the UE 255 operating as a TRP and the UE 255 can wirelessly communicate with UEs 256 and 257 outside of the coverage area of the RRUs 225 and 235. Accordingly, the UE 255 can extend the coverage area of the network system. The UE 255 in the MIMO network environment 200" can function similarly to the UE 240 of the MIMO network environment 200' of FIG. 2B. As also shown in FIG. 2C, the RRU 235 can wirelessly communicate with the UE 251 operating as a TRP and the UE 251 can wirelessly communicate with UE 252 outside of the coverage area of the RRUs 225 and 235. Although FIG. 2C illustrates downlink wireless communication, uplink wireless communication can be implemented in accordance with similar principles and advantages as downlink wireless communication.

Figure 2D:
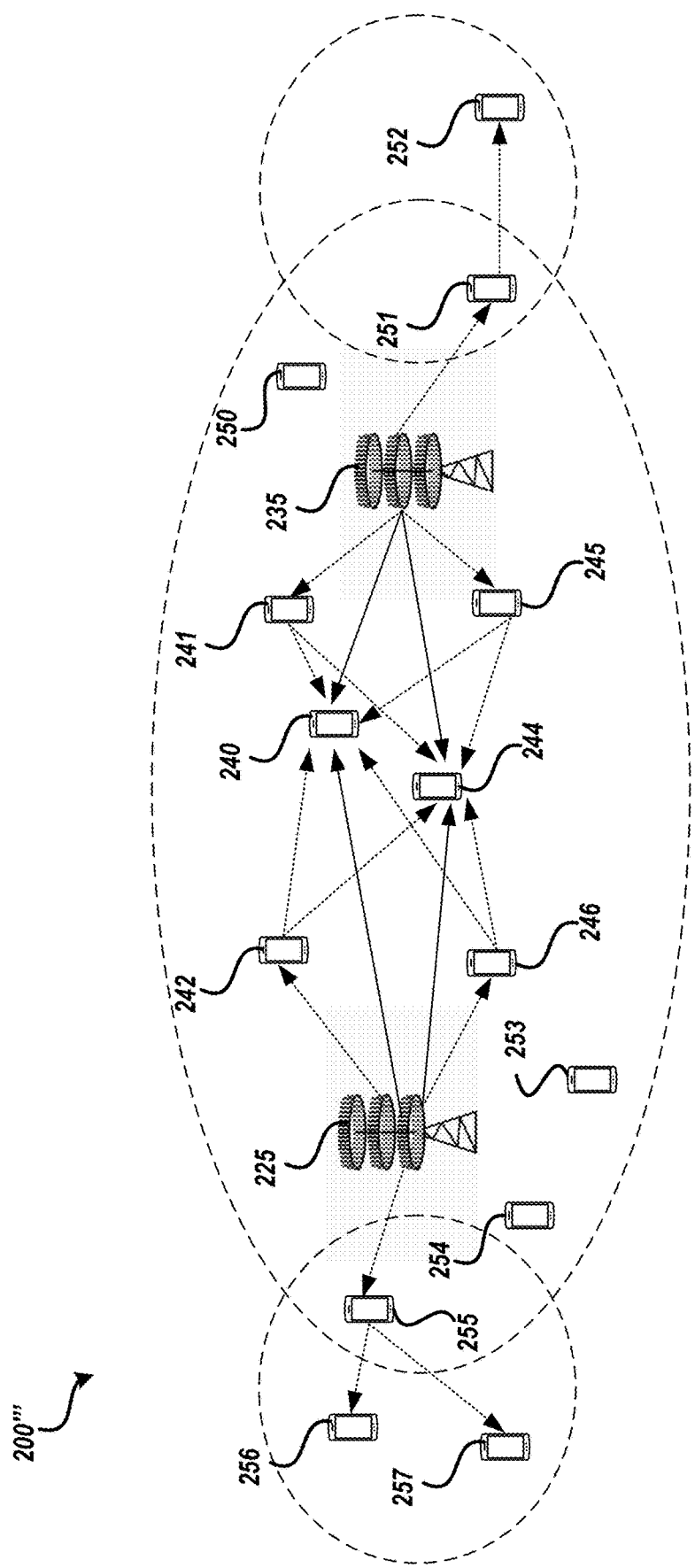
FIG. 2D is a diagram illustrating a MIMO network environment in which UEs operate as network repeaters and other UEs other as network TRPs according to an embodiment.

FIG. 2D is a diagram illustrating a MIMO network environment 200''' in which UEs operate as network repeaters and other UEs other as network TRPs according to an embodiment. The example network environment 200''' includes the same devices as the MIMO network environment 200 of FIG. 2A. The network environment 200''' illustrates that some UEs can operate as network repeaters while other UEs can operate as network TRPs. In the network environment 200''', benefits of the network environments of FIGS. 2A to 2C can be realized.

Multi-Mode UE with Mode for Operating as Virtual Network Element

A UE can be configurable to operate in multiple modes, in which at least one of the modes enables the UE to operate as a virtual network element and another mode is a traffic mode. The UE can include a multi-mode transceiver arranged to operate in the multiple modes. The transceiver can perform analog signal processing in a UE, such as amplification, filtering, and up conversion/down conversion. The transceiver can operate in the RF domain. In some instances, the UE can enable a virtual network element mode when the UE is in an idle mode. UEs arranged to operate as a virtual network element can include RF translation circuitry and/or mode switching circuitry. The RF translation circuitry can adjust a frequency of a received RF signal in the RF domain without demodulation to baseband. The mode switching circuitry can implement RF front end gating between virtual network element mode and a traffic mode. UEs disclosed herein can operate in any suitable number environment, such as any of the network environments of FIGS. 1 to 2D. Example UEs will be discussed with reference to FIGS. 3 to 6B. Any suitable principles and advantages disclosed in connection with FIGS. 3 to 6B can be implemented together with each other and/or together with any other principles and advantages disclosed herein.

Figure 3:
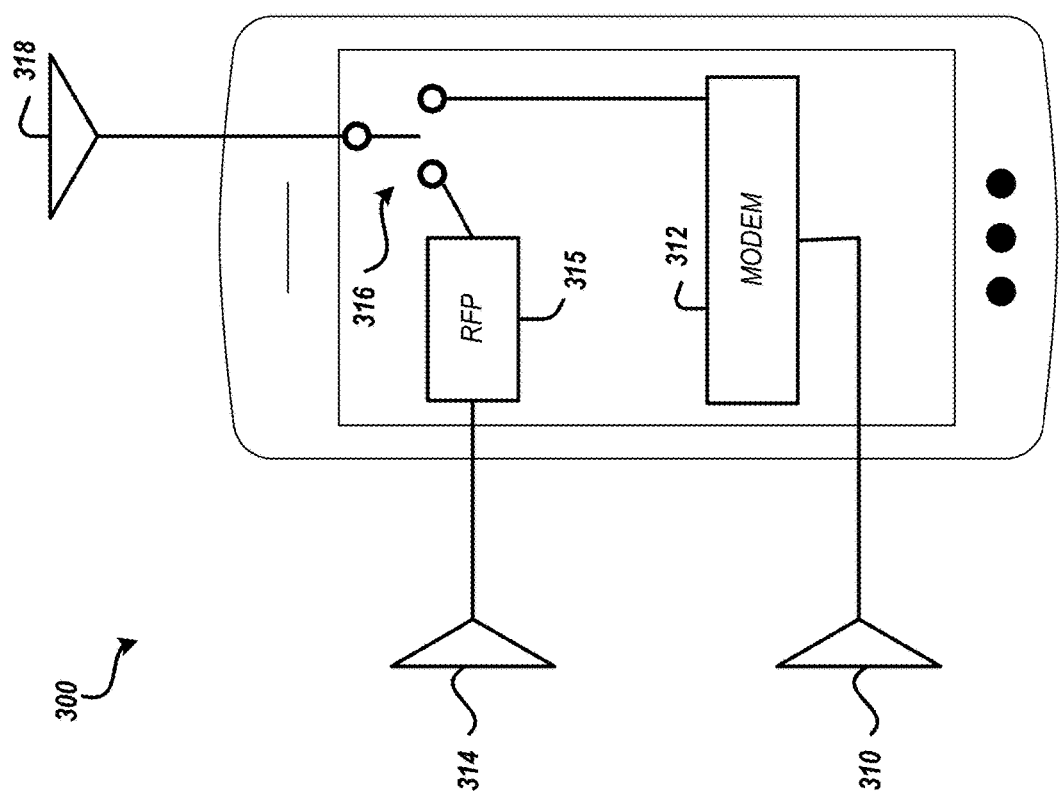
FIG. 3 is a diagram of a UE according to an embodiment.

FIG. 3 is a diagram of a UE 300 according to an embodiment. As illustrated, the UE 300 includes a first antenna 310, a modem 312, a second antenna 314, an RF processing circuit 315, a switch 316, and a third antenna 318. The UE 300 is configurable into a traffic mode and a virtual network element mode. A transceiver of the UE 300 can include circuitry of the RF processing circuit 315 and RF circuitry for processing RF signals associated with the traffic mode of the UE 300.

In the traffic mode, the UE 300 can receive downlink data from a network system via the antenna 310 and process the received downlink data using the modem 312. In the traffic mode, the UE 300 can generate uplink data using the modem 312 and transmit uplink data to the network system via antenna 318. The illustrated modem 312 includes both baseband processing circuitry and transceiver processing circuitry. The modem 312 can be implemented by a chipset arranged to perform processing to facilitate wireless communication according to one or more suitable wireless communication standards.

In the virtual network element mode, the UE 300 can receive a signal via the antenna 314, process the received signal without demodulation to baseband using the RF processing circuit 315, and transmit the processed circuit via the antenna 318. The UE 300 can receive a receive downlink data transmission and transmit a transmit downlink data transmission in the virtual network element mode. The UE 300 can receive a receive uplink data transmission and transmit a transmit uplink data transmission in the virtual network element mode. The RF processing circuit 315 can include analog circuitry configured to perform signal amplification and filtering. When the virtual network element mode is a repeater mode, the RF processing circuit 315 can perform amplification and filtering on a received RF signal without modulating and/or demodulating the carrier frequency of the received RF signal. When the virtual network element mode is a TRP mode, the RF processing circuit 315 can perform front haul data processing. In the TRP mode, the RF processing circuit 315 can perform signal amplification, filtering, and frequency translation. The RF processing circuit 315 can be arranged to perform processing for a repeater mode and/or a TRP mode.

The switch 316 can selectively electrically couple the antenna 318 to either the RF processing circuit 315 or the modem 312. In the traffic mode, the switch 316 electrically connects the modem 312 to the antenna 318. In the virtual network element mode, the switch electrically connects the RF processing circuit 315 to the antenna 318. The switch 316 can be controlled by the signal provided by the network system. Accordingly, the network system can signal the UE 300 to operate in the virtual network element mode or in the traffic mode. The UE 300 can determine whether to switch state based on an incentive for operating in a virtual network element mode and/or one or more operational characteristics of the UE 300 (e.g., an application running on the UE 300 and/or battery power level). In some other embodiments, a variety of other circuitry different than the switch 316 can implement functionality related to switching modes, such as a switch in a different part of a transceiver, a multiplexer, or the like.

In the illustrated UE 300, the first antenna 310 can be a UE receive antenna, the second antenna 314 can be a network front haul antenna, and the third antenna 318 can be a UE transmit antenna. In some instances, the second antenna 314 is configured to receive mmW signals. In the UE 300, the third antenna 318 can transmit signals in both the traffic mode and the virtual network element mode.

The principles and advantages disclosed herein can be applied to UEs having a variety of different antenna arrangements, including the arrangement shown in FIG. 3 and different arrangements. For example, the same antenna of a UE can receive and transmit data in the traffic mode. As another example, the same antenna of a UE can receive and transmit data in the virtual network element. As another example, one or more dedicated antennas of a UE can function as receive only and/or transmit only antennas in the virtual network element mode. As another example, one or more dedicated antennas of a UE can function as receive only and/or transmit only antennas in the traffic mode. As one more example, a receive only diversity antenna for traffic mode of a UE can be used as a transmit antenna in a virtual network element mode.

Although the RF processing circuit 315 is illustrated as being separate from the UE processing circuitry (i.e., the modem 312) in FIG. 3, the RF processing circuit 315 can be implemented as part of a transceiver that also processes signals in the traffic mode of the UE in a number of other embodiments. Even in embodiments where the RF processing circuit 315 is implemented separate from the UE processing circuitry, a transceiver can include the RF processing circuit 315 and at least part of the UE processing circuitry.

Figure 4A:
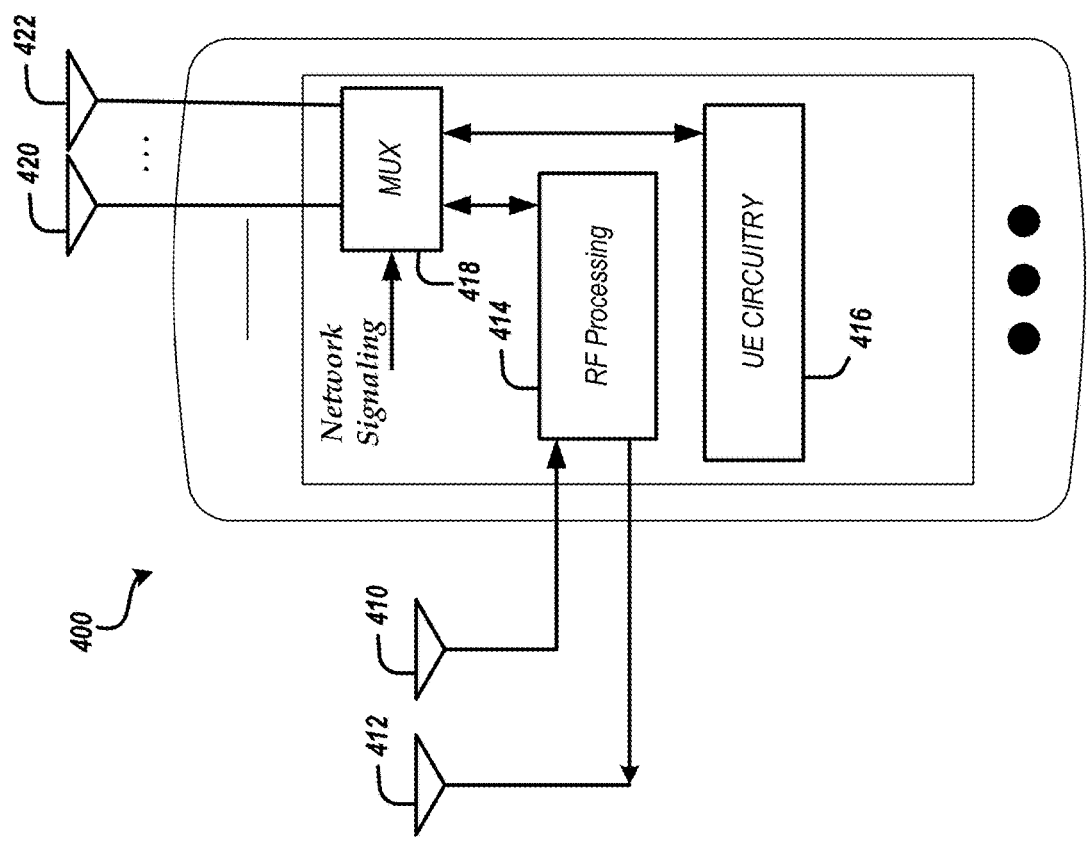
FIG. 4A is a diagram of a UE according to another embodiment.

FIG. 4A is a diagram of a UE 400 according to an embodiment. The UE 400 can operate in a virtual network element mode, such as a repeater mode or a TRP mode. The illustrated UE 400 includes antennas 410 and 412, RF processing circuitry 414, UE circuitry 416, a multiplexer 418, and antenna 420 and 422.

The antennas 410 and 412 can be front haul antennas. The antenna 410 can be configured to receive mmW signals in certain instances. The antenna 410 can be configured to receive RF signals having a frequency of 6 GHz or less in some other instances. The antenna 412 can be configured to transmit mmW signals in certain instances. The antenna 412 can be configured to transmit RF signals having a frequency of 6 GHz or less in some other instances. The antennas 420 and 422 can be wide-area network (WAN) antennas.

A transceiver of the UE 400 can include the RF processing circuitry 414 and RF circuitry of the UE circuitry 416. In the UE 400, the RF processing circuitry 414 can be implemented separate from the RF circuitry of the UE circuitry 416. The RF processing circuitry 414 can perform analog signal amplification and filtering. In some instances, the RF processing circuitry 414 can perform front haul data processing. The RF processing circuitry 414 can process a downlink signal received by the antenna 410 without demodulation to baseband. The RF processing circuitry 414 can consist of analog circuitry.

The UE circuitry 416 can perform processing associated with a traffic mode of the UE 400. The UE circuitry 416 can include a baseband processor and RF circuitry configured to (a) generate RF signals for transmission based on an output of the baseband processor and (b) process received RF signals and provide a baseband signal to an input of the base band processor.

The multiplexer 418 can provide the processed downlink signal from the RF processing circuitry 414 to one or more the antennas 420, 422 for transmission in a virtual network element mode. The multiplexer 418 can provide an uplink signal received from one or more the antenna 420, 422 to the RF processing circuitry 414 in the virtual network element mode. The RF processing circuitry 414 can provide the uplink signal and transmit the processed uplink signal via the antenna 412. The multiplexer 418 can receive a signal from the network system to operate in a virtual network element mode, such as a repeater mode or a TRP mode. The multiplexer 418 can change state responsive to the signal from the network system. The UE circuitry 416 can control state of the multiplexer 418 in a traffic mode.

Figure 4B:
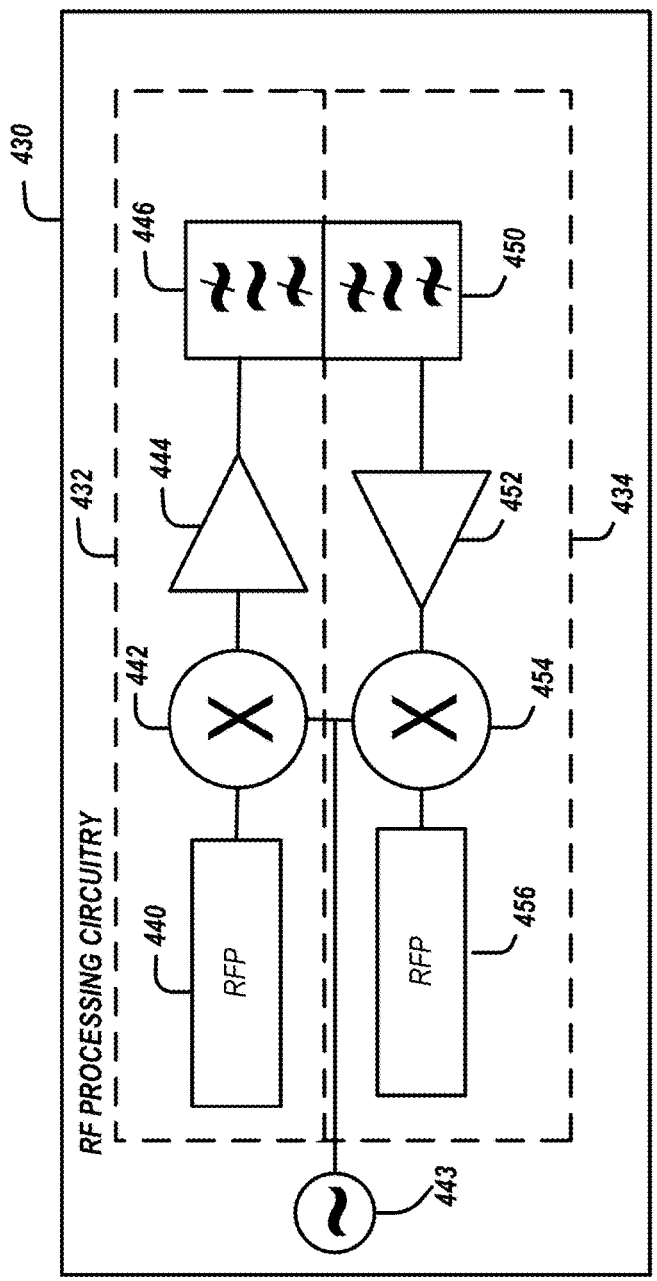
FIG. 4B is a schematic block diagram of radio frequency (RF) processing circuitry according to an embodiment.

FIG. 4B is a schematic block diagram of RF processing circuitry 430 according to an embodiment. The RF processing circuitry 430 is an example of the RF processing circuitry 414 of the UE 400 of FIG. 4A. The RF processing circuitry 430 can be implemented in the UE 400 of FIG. 4A and/or in any other suitable UEs. The RF processing circuitry 430 can be implemented entirely of analog circuitry. The RF processing circuitry 430 can perform processing in the RF domain without demodulation to baseband. The RF processing circuitry 430 includes a receive path coupled to a transmit path in an analog domain. Accordingly, the receive path can be coupled to the transmit path in the without intervening baseband circuitry. Signals received by the receive path can be processed and transmitted by the transmit path without demodulation to baseband.

The illustrated RF processing circuitry 430 includes a downlink processing path 432 and an uplink processing path 434. The downlink processing path 432 is arranged to process signals received via an antenna, such as the antenna 410 of the UE 400 of FIG. 4A. The downlink processing path 432 can receive a receive downlink data transmission and generate a transmit downlink data transmission. The downlink processing path 432 includes an RF protocol processing circuit 440, a mixer 442, a power amplifier 444 and a filter 446. The RF protocol processing circuit 440 can perform functionality of a RRU. In the downlink processing path 432, a receive path can include the RF protocol processing circuit 440 and the transmit path can include the power amplifier 444 and the filter 446. The mixer 442 can be part of the receive path or the transmit path, depending on the application.

The RF protocol processing circuit 440 can perform a variety of processing, for example, various features that will be discussed with reference to FIG. 4D. The RF protocol processing circuit 440 can perform front haul data processing in a TRP mode. The RF protocol processing circuit 440 can perform analog signal amplification in a repeater mode. The mixer 442 can receive a signal from local oscillator 443 and frequency translate a signal received from the RF protocol processing circuit 440. When functioning as a repeater, no frequency translation can be performed (e.g., the mixer 442 can be bypassed or arranged to not adjust frequency). The power amplifier 444 can amplify a signal output from the mixer 442. The filter 446 can filter the output of the power amplifier 444. The output of the downlink processing path 432 can be transmitted via an antenna, such as the antenna 420 or 422 of the UE 400 of FIG. 4A. The filter 450 can filter a signal receive via an antenna, such as the antenna 420 or 422 of the UE 400 of FIG. 4A. As illustrated in FIG. 4B, the filter 446 can be included in a duplexer that also include a filter 450 of the uplink processing path.

The uplink processing path 434 is arranged to process signals for transmission via an antenna, such as the antenna 412 of the UE 400 of FIG. 4A. The uplink processing path 434 can receive a receive uplink data transmission and generate a transmit uplink data transmission. The uplink processing path 434 includes a filter 450, an amplifier 452, a mixer 454, and an RF protocol processing circuit 456. In the uplink processing path, a receive path can include the filter 450 and the amplifier 452 and a transmit path can include the RF protocol processing circuit. The mixer 454 can be part of the receive path or the transmit path, depending on the application.

The filter 450 can filter a signal receive via an antenna, such as the antenna 420 or 422 of the UE 400 of FIG. 4A. The amplifier 452 can amplify an output of the FIG. 450. The mixer 454 can frequency translate the output of the amplifier 452. The RF protocol processing circuit 456 can perform functionality of a RRU. The RF protocol processing circuit 456 can perform a variety of processing, for example, various features that will be discussed with reference to FIG. 4D. The RF protocol processing circuit 456 can perform front haul data processing in a TRP mode. The RF protocol processing circuit 456 can perform analog signal amplification and filtering in a repeater mode. In the repeater mode, the mixer 454 and/or the RF protocol processing circuit 456 can be bypassed in certain instances.

Figure 4C:
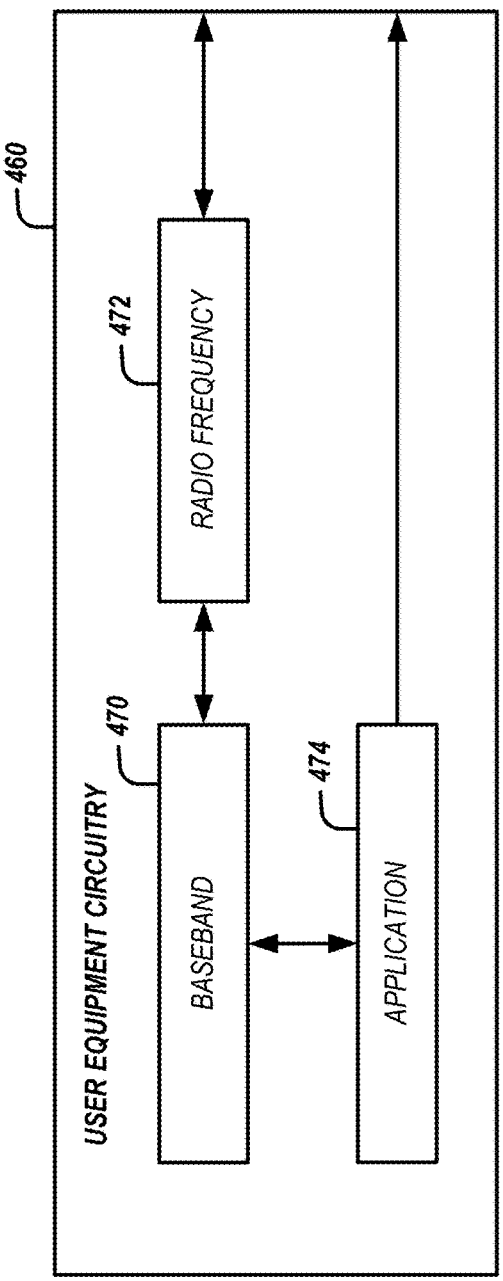
FIG. 4C is a schematic block diagram of UE circuitry according to an embodiment.
Figure 4D:
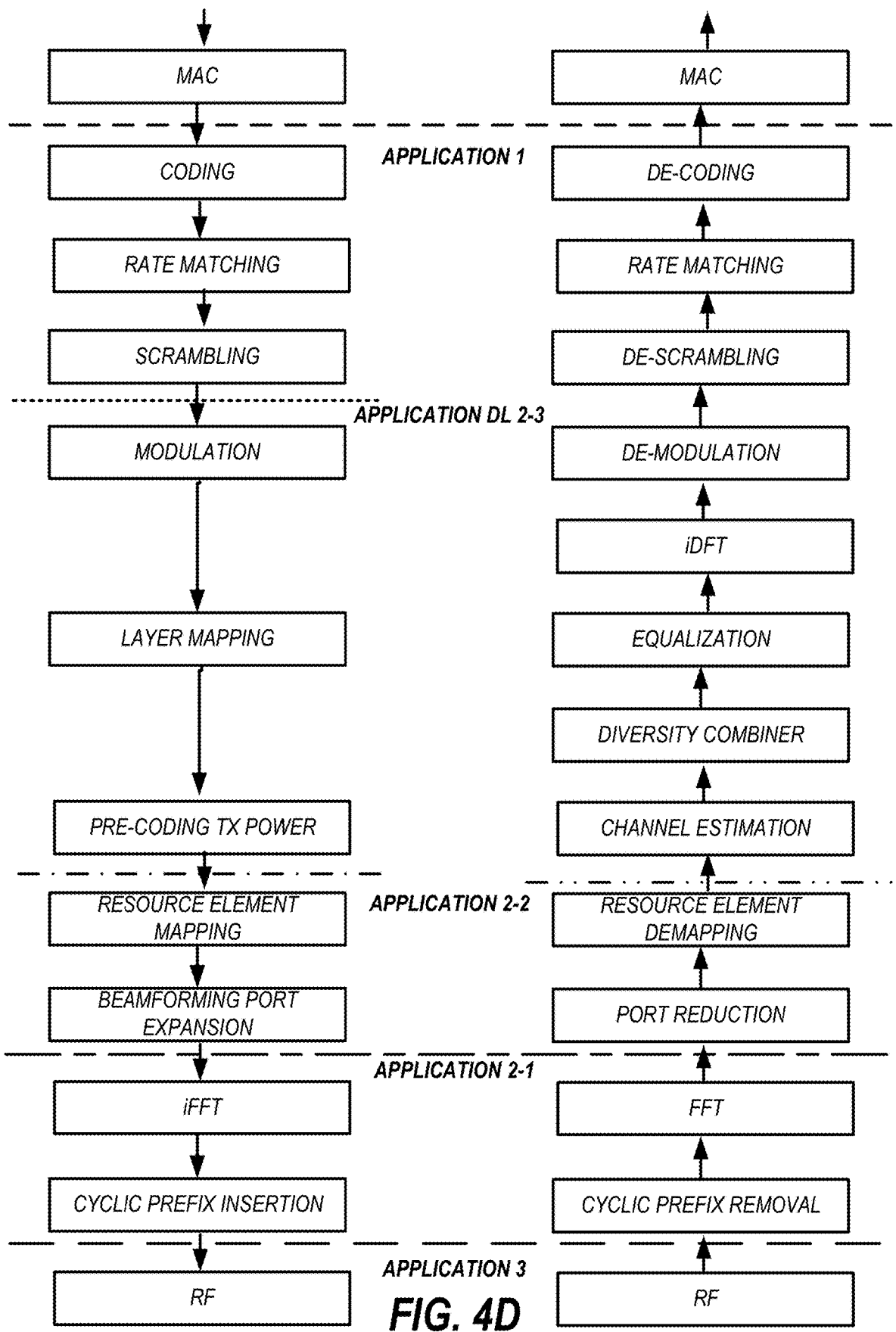
FIG. 4D is a diagram illustrating functionality that can be performed by an RF protocol processing circuit of a UE according to certain embodiments.

FIG. 4C is a schematic block diagram of UE circuitry 460 according to an embodiment. The UE circuitry 460 is an example of the UE processing circuitry 416 of the UE 400 of FIG. 4A. The UE circuitry 460 can be implemented in the UE 400 of FIG. 4A and/or in any other suitable UEs. The UE circuitry 460 can perform functions and signal processing for a UE to wirelessly communicate with a network system over a cellular link. The illustrated UE circuitry 460 includes a baseband processor 470, radio frequency circuitry 472, and an application processor 474. The UE circuitry 460 can process a downlink signal received via an antenna. The radio frequency circuitry 472 can process the downlink signal in the RF domain and bring the downlink signal to baseband for processing by the baseband processor 470. The UE circuitry 460 can generate an uplink signal based on an output of the baseband processor 470. The RF circuitry 472 can upconvert the output of the baseband processor 470 and process the upconverted signal in the RF domain to generate an uplink signal for transmission via an antenna. The application processor 474 can perform any suitable application processing. The application processor 474 can be in communication with the baseband processor 470 and switching/multiplexing circuitry, such as the multiplexer 418 of the UE 400 of FIG. 4A.

An RF protocol processing circuit of a UE can perform certain operations of an RRU. The specific functions that an RF protocol processing circuit is arranged to perform can depend on baseband unit/RRU split options implemented by a network system. FIG. 4D is a diagram illustrating functionality that can be performed by an RF protocol processing circuit of a UE. Downlink processing can be performed, for example, with the RF protocol processing circuit 440 of FIG. 4B. Uplink processing can be performed, for example, with the RF protocol processing circuit 456 of FIG. 4B. RF protocol processing circuits can receive coded bits, modulation symbols or RF signals in various applications.

For example, in application 1, the RF protocol processing circuit can perform all illustrated functions expect media access control (MAC) functions. For downlink in application 1, the RF protocol processing circuit can perform the following functions: coding, rate matching, scrambling, modulation, layer mapping, precoding transmit power, resource element mapping, beamforming port extension, inverse Fast Fourier Transform (iFFT), cyclic prefix insertion, and RF signal processing. For uplink in application 1, the RF protocol processing circuit can perform the following functions: RF signal processing cyclic prefix removal, Fast Fourier Transform (FFT), port reduction, resource element demapping, channel estimation, diversity combining, equalization, inverse Discrete Fourier Transform (iDFT), de-modulation, de-scrambling, rate matching, and de-coding.

As another example, in application 2-1, the RF protocol processing circuit can perform iFFT, cyclic prefix insertion, and RF signal processing for downlink and RF signal processing, cyclic prefix removal, and FFT for uplink. In application 2-2, the RF protocol processing circuit can perform resource mapping, beamforming port extension, iFFT, cyclic prefix insertion, and RF signal processing for downlink and RF signal processing, cyclic prefix removal, FFT, port reduction, and resource element demapping for uplink. For application 2-3, the RF protocol processing circuit can perform modulation, layer mapping, precoding transmit power, resource element mapping, beamforming port extension, iFFT, cyclic prefix insertion, and RF signal processing for downlink.

As another example, in application 3, the RF protocol processing circuit can perform RF signal processing for downlink and RF signal processing for uplink.

Figure 5A:
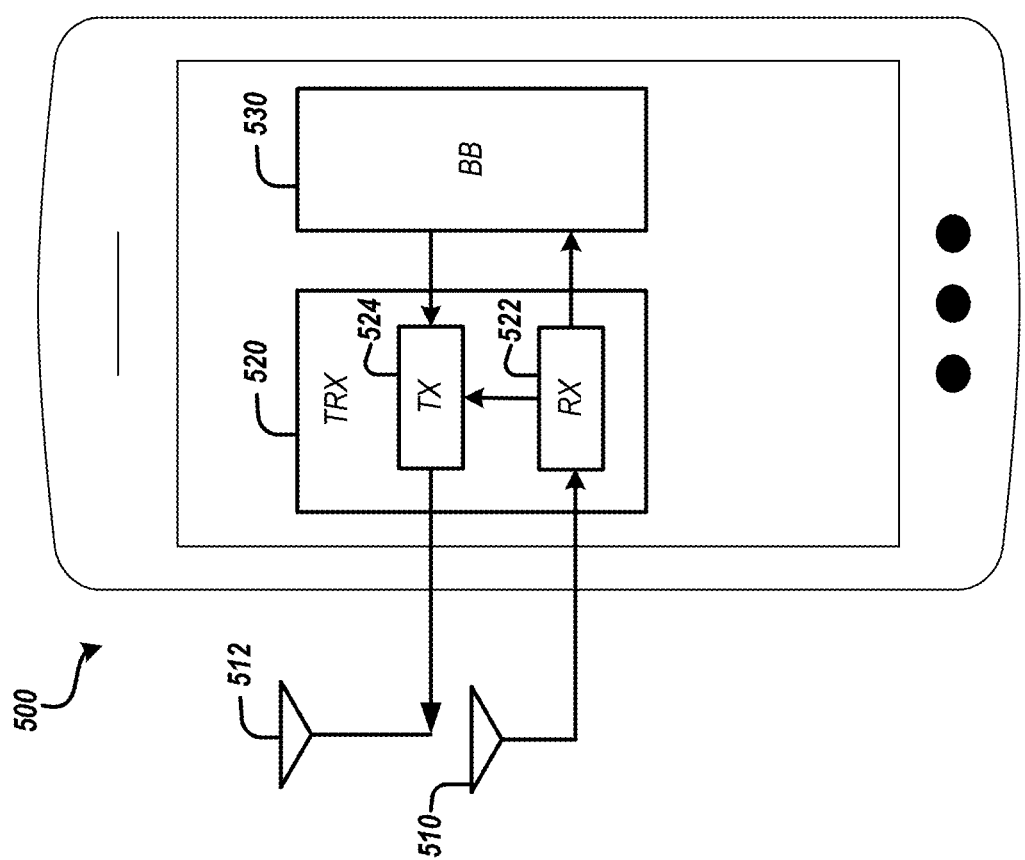
FIG. 5A is a diagram of a UE according to an embodiment.

FIG. 5A is a diagram of a UE 500 according to an embodiment. The illustrated UE 500 includes antennas 510 and 512, a transceiver 520, and a baseband processor 530. The transceiver 520 includes a receive path 522 and a transmit path 524. The transceiver 520 can operate in multiple modes. In a first mode, the transceiver 520 is configured to couple the receive path 522 to the transmit path 524 in an analog domain. Accordingly, the receive path 522 can be coupled to the transmit path 512 without intervening baseband circuitry. More details about the first mode will be discussed with reference to FIGS. 5C, 5D, and 5E. In a second mode, the transceiver 520 is configured to provide signal processing between an antenna 510 and/or 512 and the baseband processor 530. More details about the second mode will be discussed with reference to FIG. 5F. Although the UE 500 includes two antennas for illustrative purposes, the UE 500 can include any suitable number of antennas. In some instances, a UE can receive and transmit a signal from the same antenna. Although the transceiver 520 includes one receive path and one transmit path for illustrative purposes, the transceiver 520 can include any suitable number of transmit paths and any suitable number of receive paths.

Figure 5B:
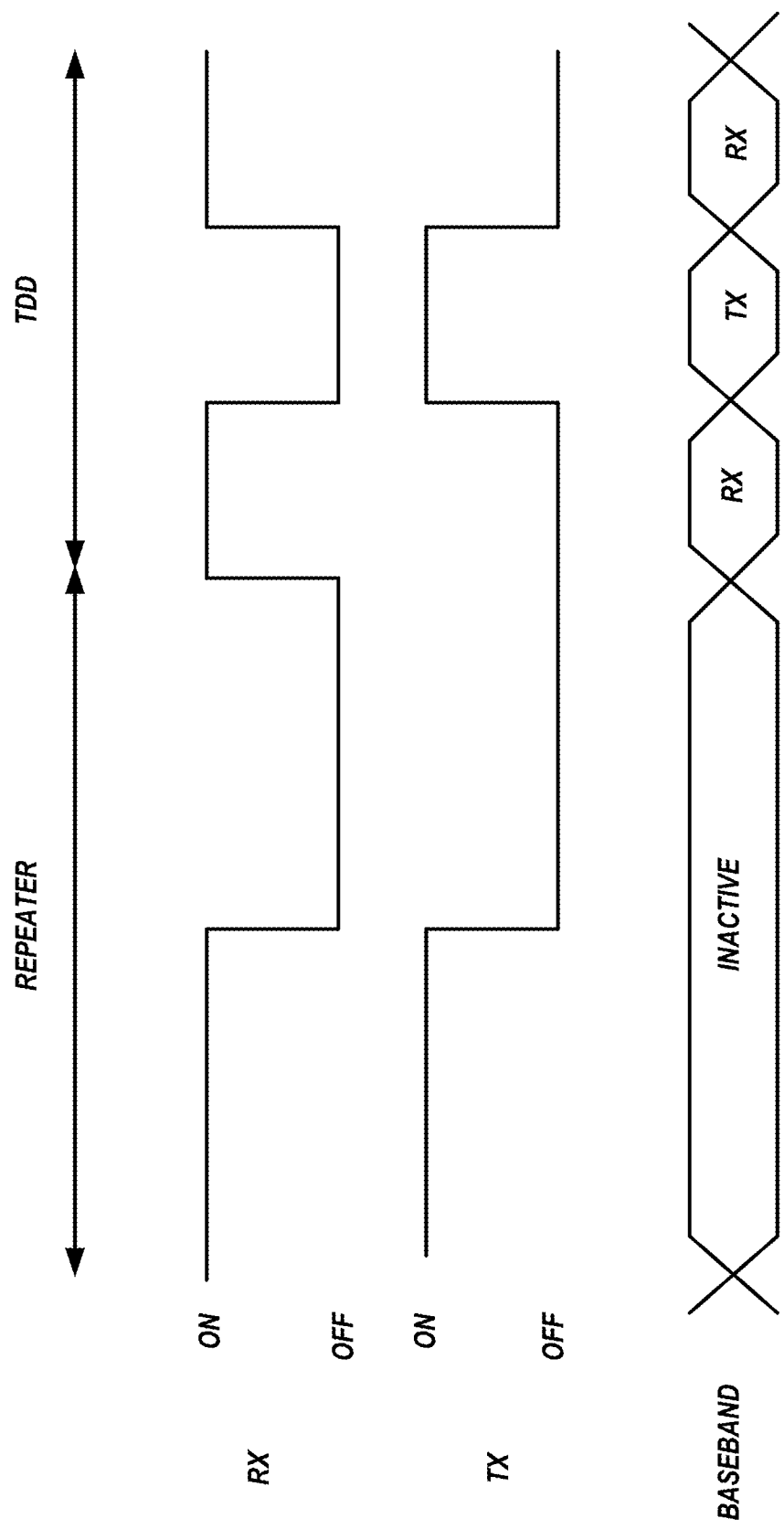
FIG. 5B is a timing diagram for the UE of FIG. 5A according to an embodiment.

FIG. 5B is a timing diagram for the UE 500 of FIG. 5A according to an embodiment. The timing diagram illustrates activity of the receive path 522, the transmit path 524, and the baseband processor 530 of the UE 500 in a repeater mode and in a traffic mode. The first mode can be a repeater mode. In the repeater mode, the receive path 522 and the transmit path 524 can both be on concurrently. The receive path 522 and the transmit path 524 can also be off concurrently in the repeater mode. The baseband processor 530 can be inactive in the repeater mode. The second mode can be a traffic mode. In the timing diagram of FIG. 5B, the traffic mode is a time division duplex (TDD) traffic mode. The receive path 522 and the transmit path 524 can alternate being on and off in the TDD mode. When the receive path 522 is on and the transmit path is off in the TDD mode, the baseband processor 530 can process receive signals. When the receive path 522 is off and the transmit path is on in the TDD mode, the baseband processor 530 can generate transmit signals.

Figure 5C:
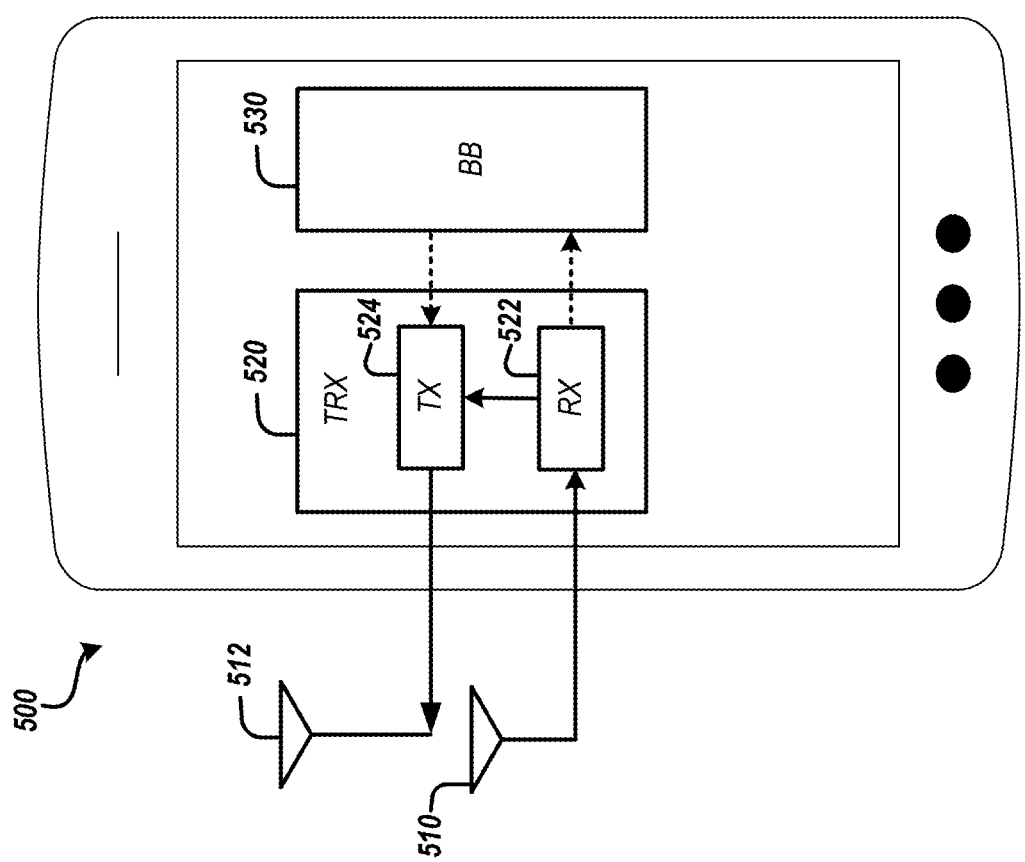
FIG. 5C illustrates the UE of FIG. 5A with the transceiver operating in the first mode.

FIG. 5C illustrates the UE 500 of FIG. 5A with the transceiver 520 operating in the first mode. In the first mode, the transceiver 520 can receive a receive downlink signal via antenna 510. The receive path 522 can process the receive downlink signal. The transceiver 520 can couple the receive path 522 to the transmit path 524 in the analog domain. The dashed lines between the transceiver 520 and the baseband processor 530 indicate that communication between the transceiver 520 and the baseband processor 530 is inactive. Accordingly, the transmit path 524 can receive a downlink signal from the receive path 522 without demodulation to baseband and without intervening baseband processing in the first mode of the transceiver 520. The transmit path 524 can generate a transmit downlink signal for transmission via the antenna 512.

Figure 5D:
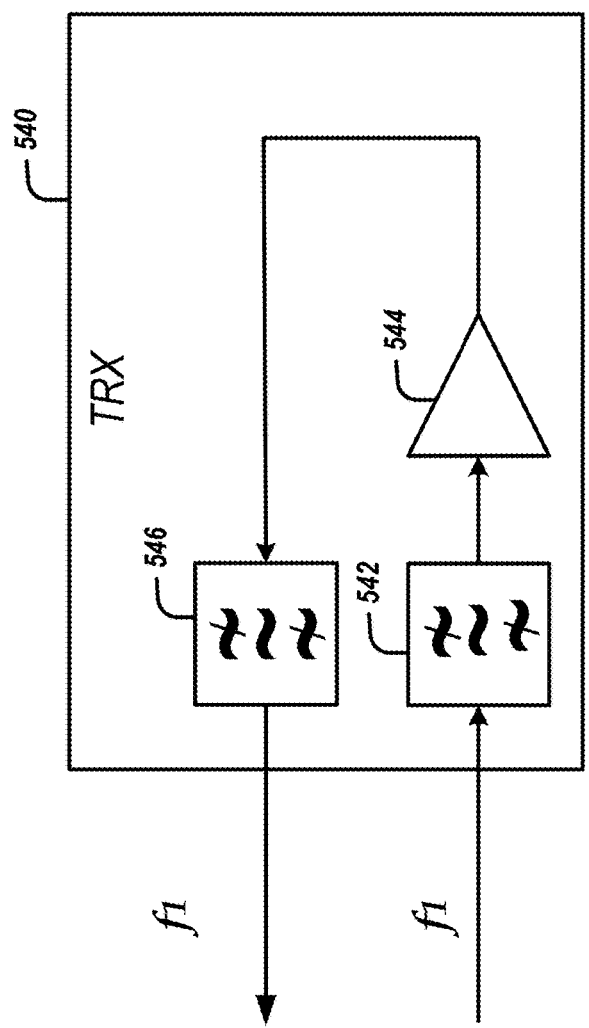
FIG. 5D illustrates an example transceiver operating as a repeater in the first mode.

FIG. 5D illustrates an example transceiver 540 operating as a repeater in the first mode. The transceiver 540 illustrates an example of components of the transceiver 520 operating as a repeater in the first mode. The transceiver 540 can be implemented in the UE 500 and/or in other UEs. Although FIG. 5D only illustrates components of the transceiver 540 for operating as a repeater, the transceiver 540 can include other components, for example, for processing uplink and downlink signals exchanged between a UE and a network system.

As illustrated, the transceiver 540 can receive an input signal with carrier frequency $f_1$ and provide an output signal with carrier frequency $f_1$. Accordingly, the input signal and the output signal have the same carrier frequency. The transceiver 540 can filter the input signal with a filter 542 and amplify the filtered input signal with an amplifier 544. The filter 542 can be included in a receive path. In some instances, the filter 542 and the amplifier 544 can be included in a receive path. The output of the amplifier 544 can be filtered by filter 546. The filter 546 can be included in a transmit path in certain instances. In some instances, the amplifier 544 and the filter 546 can be included in a transmit path. The filters 542 and 546 can be band pass filters as illustrated. Such band pass filters can have substantially the same pass band. One or more intervening circuit elements can be coupled between the illustrated circuit elements of the transceiver 540. Such intervening circuit elements can consist of analog circuitry. The receive path can be selectively coupled to the transmit path, for example, by a switch. In some instances, the receive path and/or the transmit path illustrated in FIG. 5D can be selectively activated.

Figure 5E:
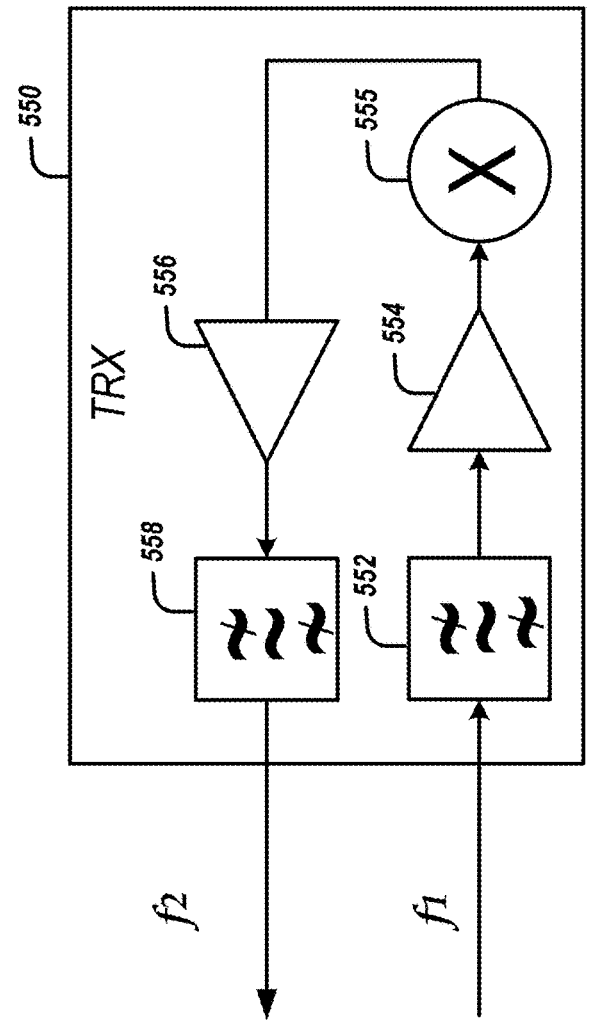
FIG. 5E illustrates an example transceiver operating as a TRP in the first mode.

FIG. 5E illustrates an example transceiver 550 operating as a TRP in the first mode. The transceiver 550 illustrates an example of components of the transceiver 520 operating as a TRP in the first mode. The transceiver 550 can be implemented in the UE 500 and/or in other UEs. Although FIG. 5E only illustrates components of the transceiver 550 for operating as a TRP, the transceiver 550 can include other components, for example, for processing uplink and downlink signals exchanged between a UE and a network system and/or for operating as a repeater.

As illustrated, the transceiver 550 can receive an input signal with carrier frequency $f_1$ and provide an output signal with carrier frequency $f_2$. Accordingly, the input signal and the output signal have different carrier frequencies. The transceiver 550 can filter the input signal with a filter 552 and amplify the filtered input signal with an amplifier 554.

In certain instances, the filter 552 and the amplifier 554 can be included in a receive path. A mixer 555 or any suitable other circuit can frequency translate the output of the amplifier 554. This can cause the output signal to be frequency translated relative to the input signal. The output of the mixer 555 can be amplified by amplifier 556 and then filtered by the filter 558. The filters 542 and 558 can be band pass filters as illustrated, in which the filters 542 and 558 have different respective pass bands. In certain instances, the mixer 555, the amplifier 556, and the filter 588 can be included in a transmit path.

One or more intervening circuit elements can be coupled between the illustrated circuit elements of the transceiver 550. Such intervening circuit elements can consist of analog circuitry. One or more components of the transceiver 550 can be selectively coupled in for the first mode. For example, the receive path can be selectively coupled to the transmit path by a switch. In some instances, the one or more components of the transceiver 550 can be selectively activated.

Figure 5F:
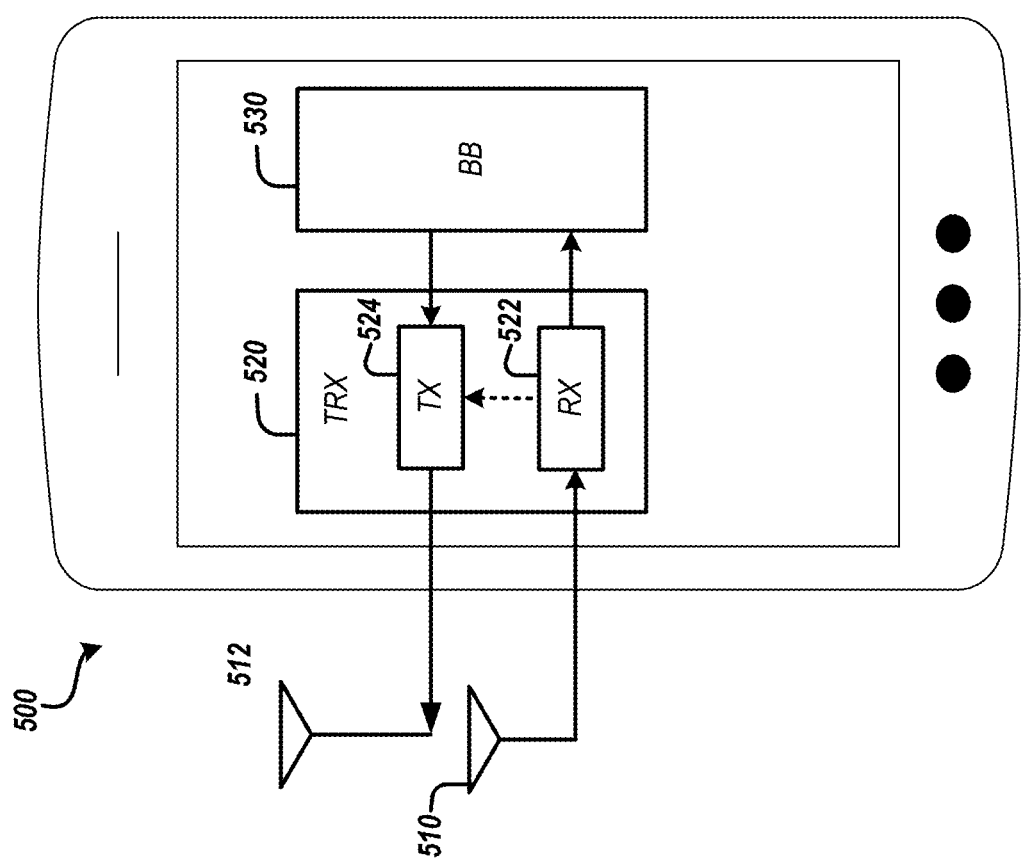
FIG. 5F illustrates the UE of FIG. 5A with the transceiver operating in the second mode.

FIG. 5F illustrates the UE 500 of FIG. 5A with the transceiver operating in the second mode. In the second mode, the transceiver 520 can receive a downlink radio frequency signal via antenna 510. The receive path 522 can process the downlink radio frequency signal and downconvert the processed downlink radio frequency signal to baseband. The baseband processor 530 can receive the baseband downlink signal. The baseband processor 530 can generate a baseband uplink signal in the second mode. The transmit path 524 can generate an uplink radio frequency signal form the baseband uplink signal. The transmit path 524 can transmit the uplink radio frequency signal via the antenna 512. The dashed line between the receive path 522 and the transmit path 524 indicates that these paths are decoupled in the analog domain in the second mode.

Figure 6A:
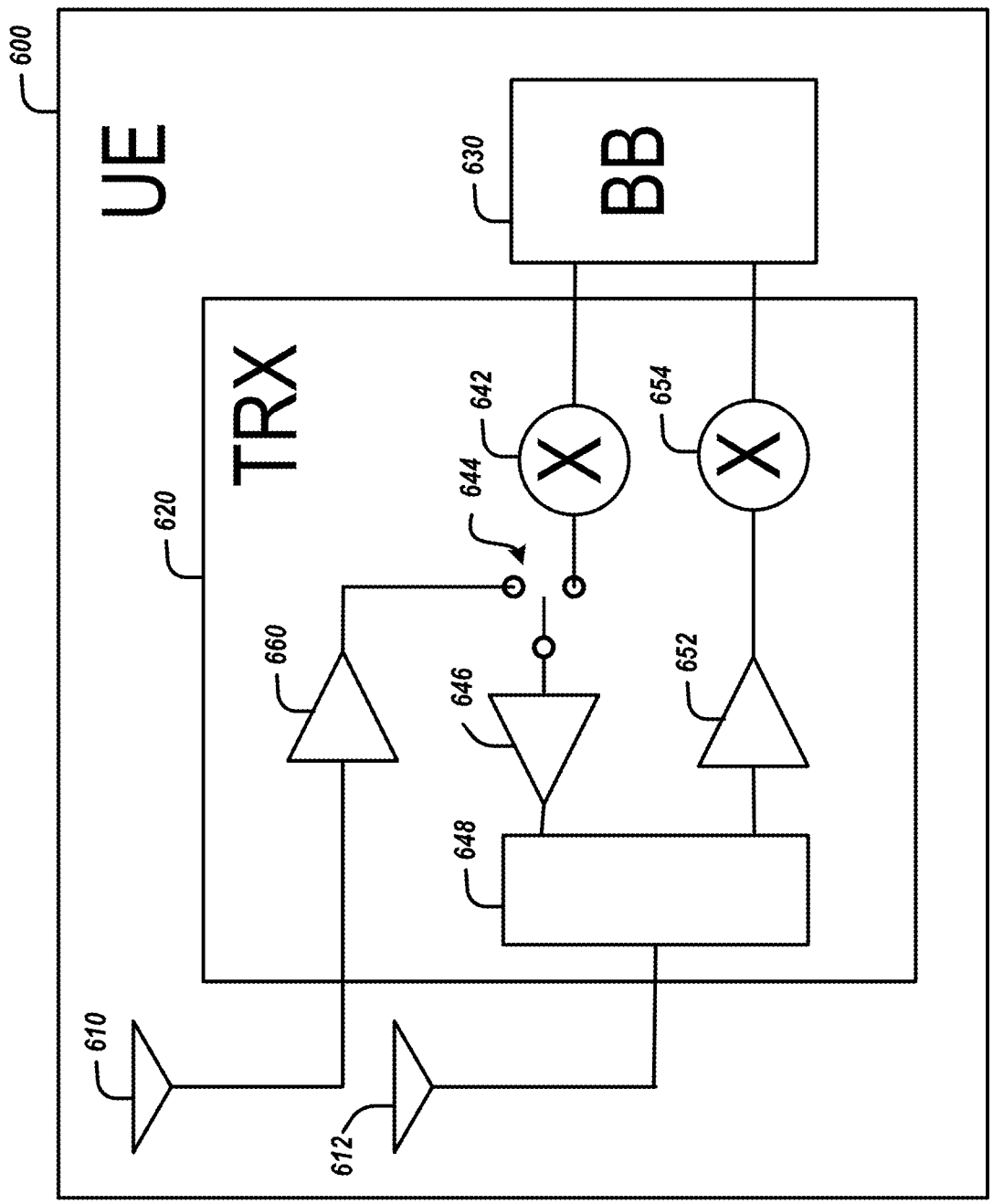
FIG. 6A is a schematic block diagram of a UE according to an embodiment.

FIG. 6A is a schematic block diagram of a UE 600 according to an embodiment. The illustrated UE 600 includes antennas 610 and 612, a transceiver 620, and a baseband processor 630. The transceiver 620 includes a transmit path, a first receive path, and a second receive path. The transceiver 620 is operable in at least a traffic mode and a repeater mode.

In a traffic mode, the transceiver 620 can generate an uplink signal based on an output of the baseband processor 630 and transmit the uplink signal via the antenna. The transmit path can upconvert the output of the baseband processor with a mixer 642. The output of the mixer 642 can be electrically coupled to an input of the power amplifier 646 via the switch 644 in the traffic mode. The power amplifier 646 can amplify the output of the mixer 642 and provide the amplified signal to the antenna 612 for transmission via an intervening circuit element 648. The intervening circuit element 648 can be a switch (e.g., a transmit/receive switch) or a multiplexer that includes a plurality of filters coupled to a common antenna node (e.g., a duplexer). In the traffic mode, the transceiver 620 can process a downlink signal received via the antenna 612 with the first receive path and provide the processed downlink signal to the baseband processor 630. The first receive path can include a low noise amplifier 652 and a mixer 654. The low noise amplifier 652 can amplify a received signal. The mixer 654 is arranged to downconvert the output of the low noise amplifier 652 to baseband. The low noise amplifier 652 can receive a downlink signal from the antenna 612 via the intervening circuit element 648.

In a repeater mode, the transceiver 620 can receive a signal from via the antenna 610. The received signal can be processed by the second receive path. The second receive path can include at least an amplifier 660, which can be a low noise amplifier. The second receive path can also include one or more filters (not illustrated). The switch 644 can electrically couple the second receive path to the transmit path of the transceiver 620 in the repeater mode. The output of the second receive path can then be processed by the transmit path for transmission via the antenna 612. The second receive path together with the transmit path can receive a receive downlink signal and provide a transmit downlink signal in the repeater mode. The second receive path together with the transmit path can receive a receive uplink signal and provide a transmit uplink signal in the repeater mode.

Figure 6B:
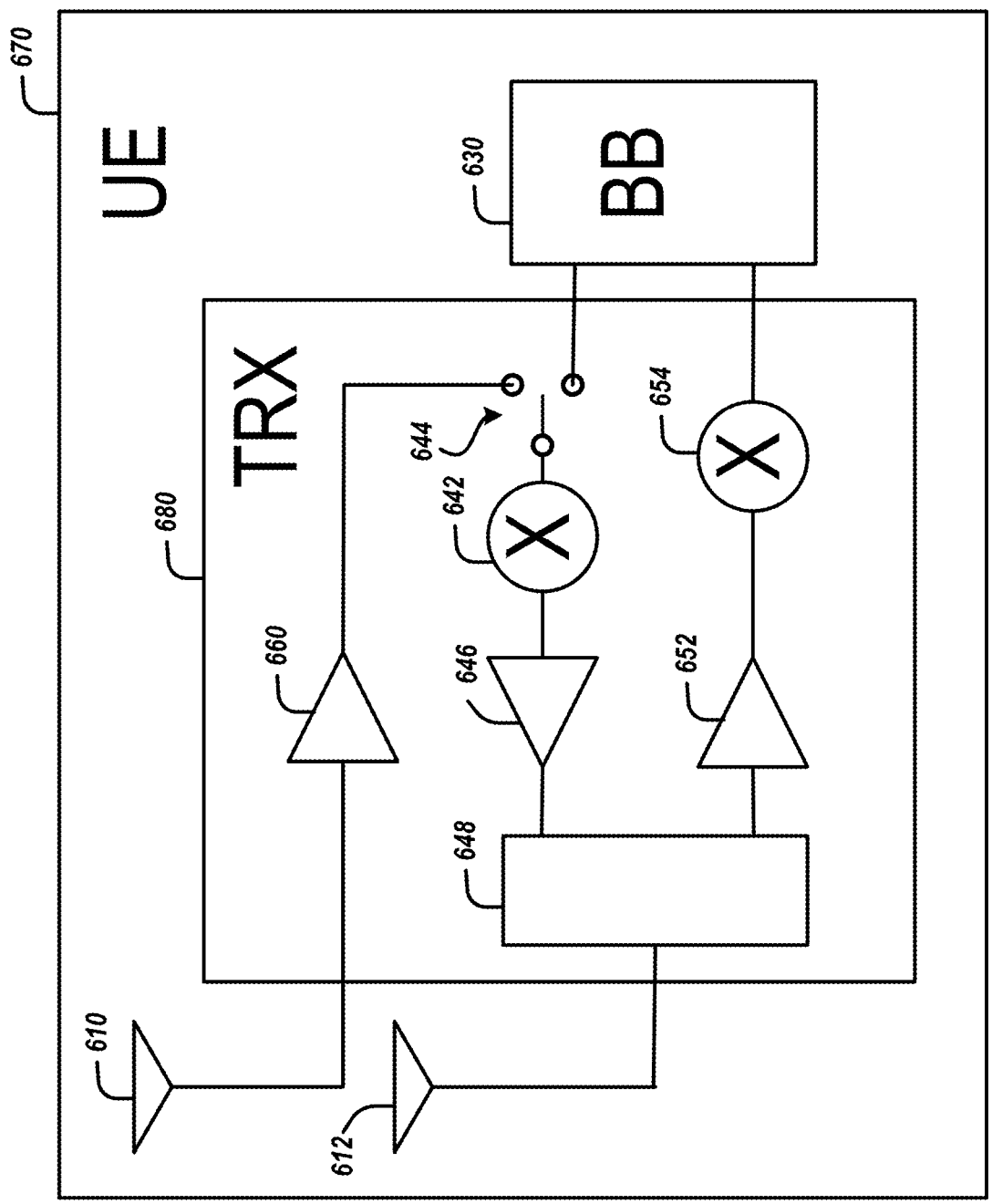
FIG. 6B is a schematic block diagram of a UE according to another embodiment.

FIG. 6B is a schematic block diagram of a UE 670 according to an embodiment. The illustrated UE 670 is similar to the UE 600 of FIG. 6A except that the second receive path can be selectively electrically coupled to the transmit path of a transceiver at a different node. In the transceiver 680 of the UE 670, the second receive path can be electrically coupled to an input of the mixer 642 in a TRP mode. Accordingly, the transceiver 680 can frequency translate a signal from the second receive path for transmission via the antenna 612. In some instances, a transceiver can be implemented in accordance with any suitable principles and advantages associated with the transceiver 620 of FIG. 6A and the transceiver 680 of FIG. 6B. For example, a transceiver can implement a repeater mode in accordance with features of the transceiver 620 and implement a TRP mode in accordance with the transceiver 680.

Network System

Figure 7A:
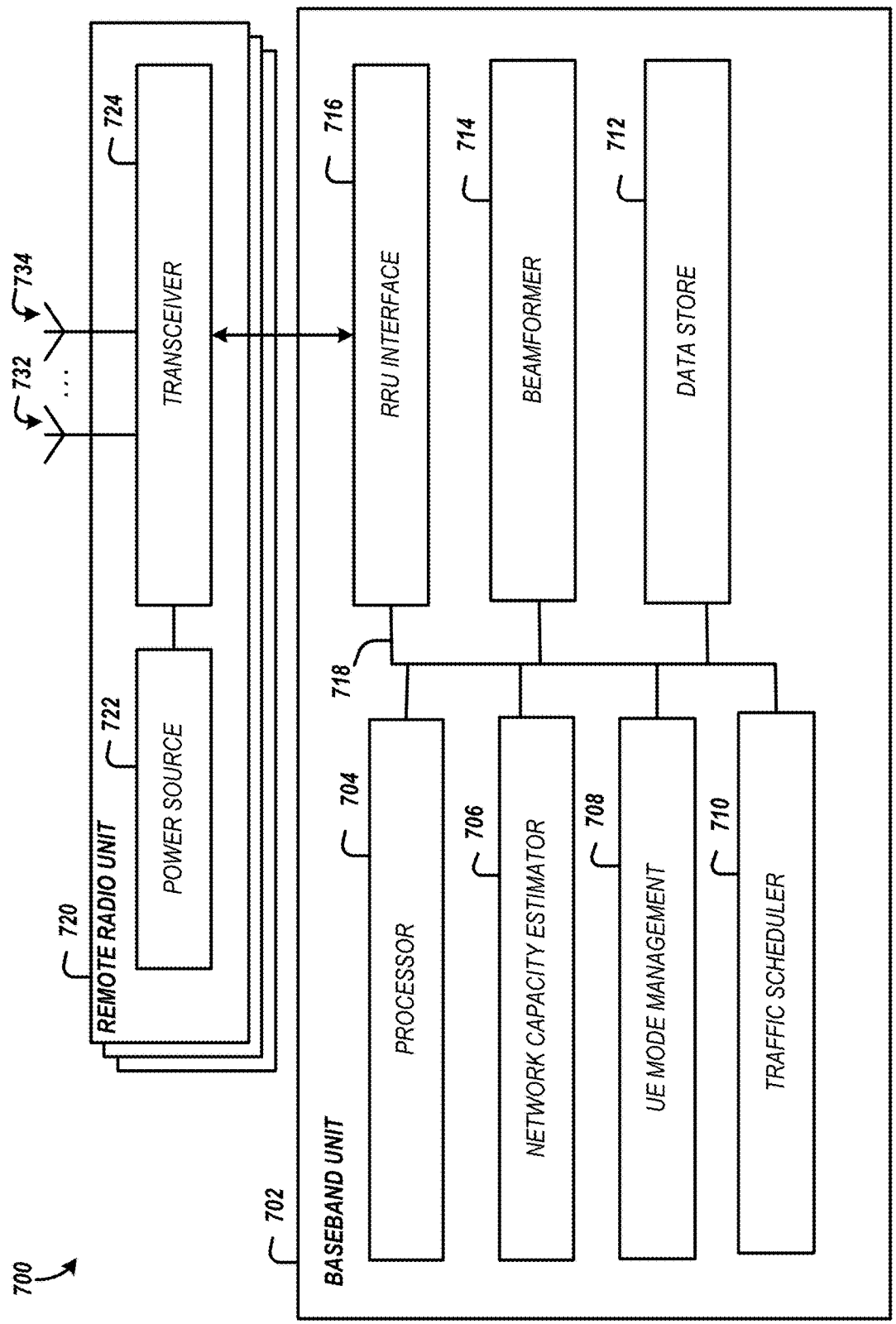
FIG. 7A is a block diagram illustrating an example network system that includes base band unit and remote radio units according to an embodiment.
Figure 7B:
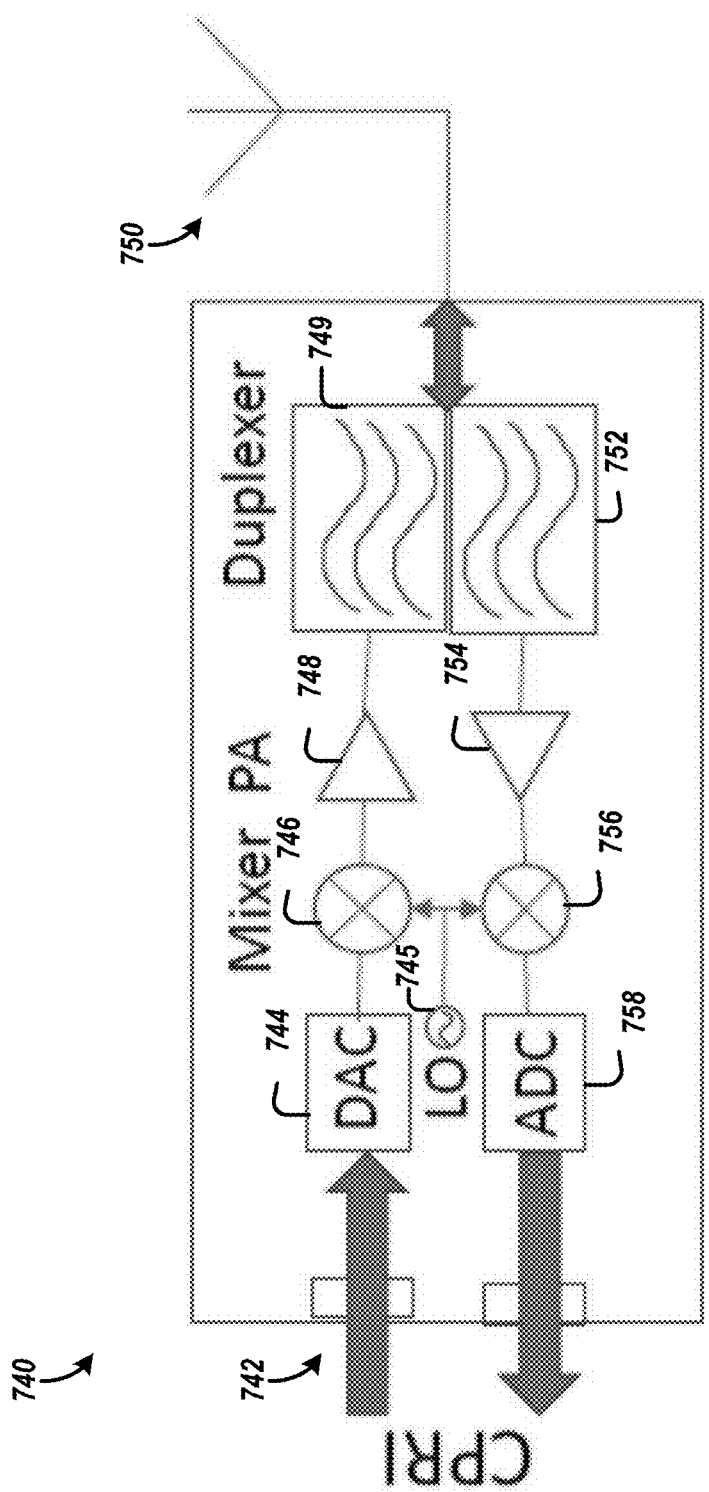
FIG. 7B is a schematic block diagram illustrating an example remote radio unit (RRU) arranged to wirelessly communicate with a UE.

A network system can be configured to communicate with a UE via another UE arranged as a virtual network element. The network system can determine to use a UE as a virtual network element, such as a repeater or a virtual TRP and/or a virtual RRU. The network system can route traffic through the UE operating as the virtual network element. In some instances, the UE operating as a virtual network element can perform front haul processing. FIG. 7A illustrates an example network system and FIG. 7B illustrates an example RRU. The network systems and RRUs disclosed herein can be can operate in any suitable number environment, such as any of the network environments of FIGS. 1 to 2D. The network systems and RRUs disclosed herein can wirelessly communicate with any of the UEs disclosed herein.

FIG. 7A is a block diagram illustrating an example network system 700 that includes base band unit 702 and remote radio units 720 according to an embodiment. The network system 700 of FIG. 7A can wirelessly communicate with UEs in accordance with any suitable principles and advantages disclosed herein. The base band unit 702 can be coupled with at least one remote radio unit 720. The base band unit 702 can be coupled with a plurality of remote radio units 720. Such remote radio units 720 can be distributed.

A remote radio unit 720 can include at least a first antenna 732 and a second antenna 734 for wireless communications, such as MIMO wireless communications. Any antenna disclosed herein, such as the antenna 732 or the antenna 734, can be referred to as antenna element. A remote radio unit can include any suitable number of antennas and/or arrays of antennas. The antennas 732 and 734 of the RRU 720 can be coupled with a transceiver 724. The transceiver 724 includes a receiver and a transmitter. The receiver can process signals received via the antennas 732 and/or 734. The transceiver 724 can provide the processed signals to an RRU interface 716 included in the BBU 702. The transceiver 724 can include any suitable number of receive paths. The transmitter can process signals received from the BBU 702 for transmission via the antennas 732 and/or 734. The RRU 720 can include a power source 722, which can provide power to the transceiver 724. The transceiver 724 can include any suitable number of transmit paths. In some other instances, the BBU 702 can perform some or all of the signal processing of a transceiver.

As illustrated, the BBU 702 includes a processor 704, a network capacity estimator 706, an UE mode management block 708, a traffic scheduler 710, a data store 712, a beamformer 714, an RRU interface 716, and a bus 718. The bus 718 can couple several elements of the BBU 702.

The processor 705 can include any suitable physical hardware configured to perform the functionality described with reference to the processor 705. The processor 705 can include a processor configured with specific executable instructions, a microprocessor, a microcontroller, a digital signal processor (DSP), an application specific integrated circuit (ASIC), a programmable logic device such as field programmable gate array (FPGA), the like, or any combination thereof designed to perform the functions described herein. The processor 705 can be implemented by any suitable combination of computing devices and/or discrete processing circuits in certain applications.

The network capacity estimator 706 can estimate network capacity using one or more UEs as virtual network elements. The estimate of network capacity can be used to determine whether or not to request that a particular UE operate as a virtual network element. In some instances, the network capacity estimator 706 can compute network efficiency. The computed network efficiency can include one or more UEs operating as a virtual network element. The computed network efficiency can be used to determine whether to initiate termination of a UE operating as a virtual network element. The network capacity estimator 706 can be implemented by dedicated circuitry and/or by circuitry of the processor 704.

The UE mode management block 708 can determine to request that a UE operate in a virtual network element mode and cause such a request to be transmitted to the UE. The UE mode management block 708 can determine which UEs are available for operating as a virtual network element, such as a network repeater or a network TRP. The UE mode management block 708 can access information from the data store 712 associated with one or more UEs capable of operating as a virtual network element. The UE mode management block 708 can cause the network capacity estimator 706 to compute network capacity with one or more UEs operating as virtual network elements. The UE mode management block 708 can request UE capability information from UEs determined to increase the network capacity. The UE mode management block 708 can be implemented by dedicated circuitry and/or by circuitry of the processor 704.

The UE mode management block 708 can determine whether to include UEs as an option for scheduling network traffic. This determination can be based on one or more operational characteristics of a UE, such as power level (e.g., battery power), processor load, memory, applications executing on the UE, existing operation as a virtual network element, MIMO capabilities, traffic state, a channel condition associated with one or more other UEs in proximity, a link quality indicator associated with one or more other UEs in proximity, or one or more other detectable operational metrics for the UE. As an example, the UE mode management block 708 can determine whether to include UEs as a virtual network element for scheduling traffic if the UE's battery power satisfies a first threshold and a link quality indicator associated with the UE satisfies a second threshold. Information associated with the one or more operational characteristics can be obtained via the request for UE capability information. In some instances, the UE mode management block 708 can determine whether to include the UE as an option for a virtual network element based on an amount of incentives desired by the UE for operating as a virtual network element. Any other suitable information can be alternatively or additionally be used to determine whether to include the UE as an option for operating as a virtual network element.

The UE mode management block 708 can initiate termination of the UE operating as a virtual network element. The UE mode management block 708 can initiate such a termination in response to determining that the UE is providing less than a threshold amount of increased network efficiency. The threshold amount can be zero in certain instances. The threshold amount can be greater than zero in other instances. Information associated with network efficiency can be obtained from the network capacity estimator 706.

The traffic scheduler 710 can schedule traffic between a network system and one or more UEs. The traffic scheduler 710 can schedule uplink and/or downlink traffic between a RRU and a UE. The traffic scheduler 710 can schedule traffic between a UE operating as a virtual network element and another UE. For example, the traffic scheduler 710 can route traffic between a RRU and a first UE through a second UE operating as a repeater. In this example, the traffic scheduler 710 can also route traffic directly between the RRU and the first UE concurrent with the traffic being routed through the second UE operating at the repeater. As another example, the traffic scheduler 710 can route traffic between a RRU and a first UE through a second UE operating as a network TRP. The traffic scheduler 710 can route traffic through any serving nodes stored in a serving node data store, which can be included in the data store 712. The serving node data store can keep an updated list of the UEs available to operate as a virtual network element. The traffic scheduler 710 can be implemented by dedicated circuitry and/or by circuitry of the processor 704.

As illustrated, the processor 705 is in communication the data store 712. The data store 712 can store instructions that can be executed by the processor 712 to implement any suitable combination of the features described herein. In some implementations, the data store 712 can retain information associated with one or more UEs capable of operating as a network repeater and/or as a network TRP. The data store 712 can alternatively or additionally retain information associated with network capacity determined by the network capacity estimator 706 and/or regarding network efficiency. The data store 712 can retain information regarding rewarding UEs for operating as a network repeater and/or a network TRPs in certain instances. The data store 712 can retain information regarding UEs providing a reward to other UEs for operating as a network repeater and/or a network TRPs in various instances. The data store 712 can store network traffic information. The data store 712 can store any other suitable data for the baseband unit 702.

The beamformer 714 can generate parameters for serving nodes (e.g., RRUs and/or UEs operating as RRUs) for UEs. The parameters can include one or more of transmission mode, time, frequency, power, beamforming matrix, tone allocation, or channel rank. The beamformer 714 can determine optimal parameters for RRUs 720 coupled with the BBU 702 that facilitate a network-wide optimization of downlink data transmissions. Similar functionality can be implemented for receiving uplink data transmission.

The illustrated processor 705 is in communication the RRU interface 716. The RRU interface 716 can be any suitable interface for proving signals to an RRU 720 and receiving signals from the RRU 720. As an example, the RRU interface 716 can be a Common Public Radio Interface.

FIG. 7B is a schematic block diagram illustrating an example RRU 740 arranged to wirelessly communicate with a UE. As illustrated, the RRU includes a Common Public Radio Interface (CPRI) 740, data converters including a digital-to-analog converter (DAC) 744 and an analog-to-digital converter (ADC) 754, a local oscillator 745, mixers 746 and 756, amplifiers including a power amplifier 748 and a low noise amplifier 745, a duplexer including a transmit filter 749 and a receive filter 752, and an antenna 750. The CPRI 740 provides an interface between radio equipment controllers (e.g., of a base band unit) and radio equipment (e.g., a transceiver and RF front end). In some instances, the CPRI 740 can be an enhanced CPRI (eCPRI).

The RRU 740 can transmit downlink data to a user equipment. Digital data received via the CPRI 740 can be converted to analog data by the DAC 744. The mixer 746 can upconvert the analog data to a desired carrier frequency in the RF domain. The local oscillator 745 can set the carrier frequency of the output of the mixer 746. The power amplifier 748 can amplify the output of the mixer 746. The transmit filter 749 can filter the output of the power amplifier 748 for transmission to a UE via the antenna 750. The antenna 750 can be a WAN antenna.

The RRU 740 can receive and process uplink data from a user equipment. The antenna 750 can receive a cellular uplink signal from the UE. The receive filter 752 can filter the cellular uplink signal. The low noise amplifier 754 can filter the output of the receive filter 752. The mixer 756 can downconvert the output of the low noise amplifier 754 to baseband. The local oscillator 745 can provide a local oscillator signal to the mixer 756 for down conversion to baseband. The ADC 758 can convert an analog output of the mixer 756 to a digital signal. The output of the ADC 758 can be provided to a baseband unit for baseband processing via the CPRI 740.

TRP Mode

UEs disclosed herein can operate in a virtual TRP mode. In the virtual TRP mode, the UE can process a received RF signal and output a processed RF signal to facilitate communication between a network system and another UE. The UE can operate in the virtual TRP mode in either an idle state or an active state. The virtual TRP mode and a traffic mode can be time partitioned. The UE can operate in the virtual TRP mode in response to a signal provided by a network system. In certain instances, the UE can perform functionality of an RRU. The UE can receive network data via one or more front haul antennas in certain instances. The UE can serve network transmitted data to a designated UE in proximity using a WAN antenna. The UE can operate as a virtual RRU in the virtual TRP mode to help the network system with calibration and/or network synchronization. The UE operating in the virtual TRP mode can receive incentives to encourage the UE to operate as a virtual TRP.

Figure 8:
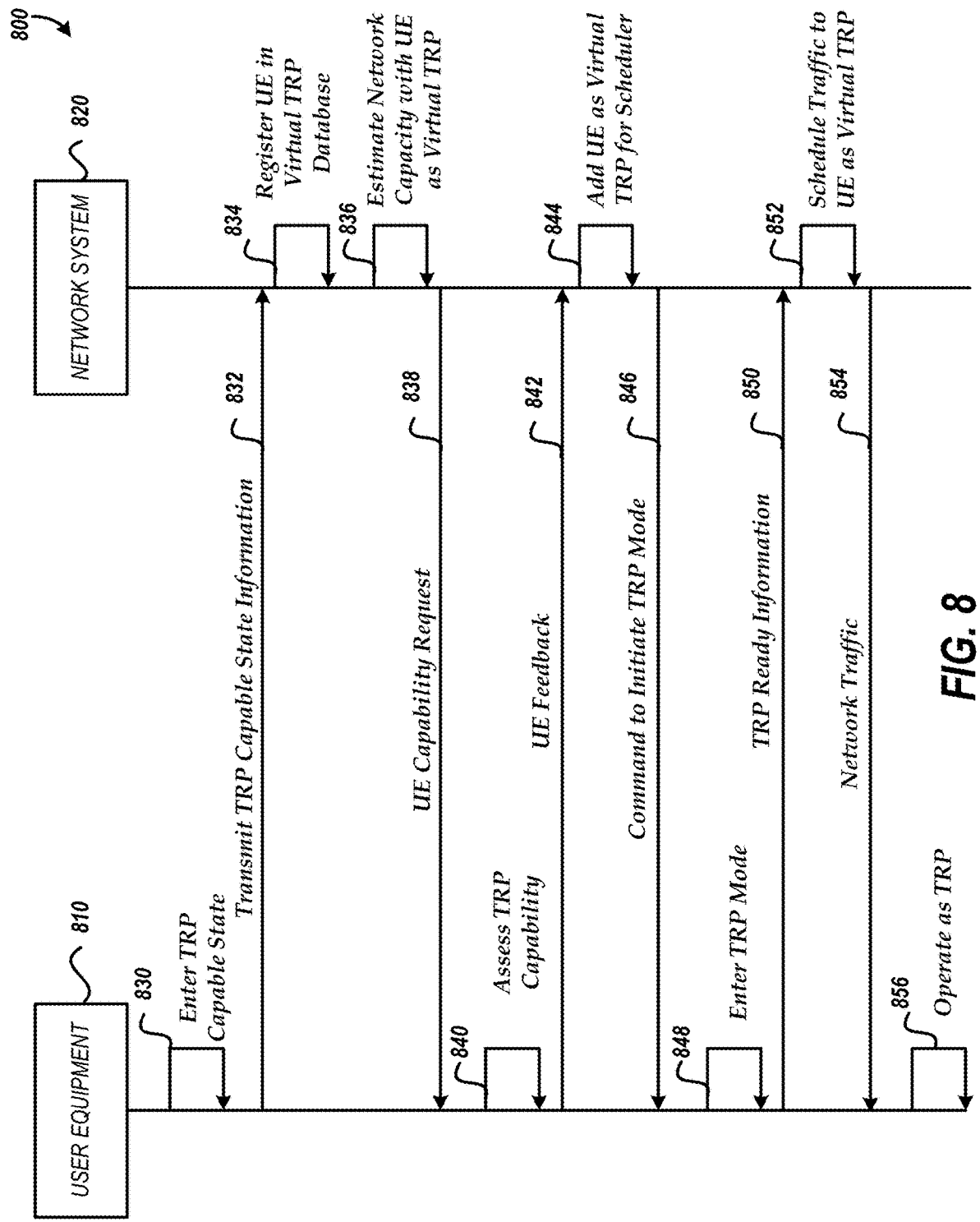
FIG. 8 illustrates example communications and events of an embodiment of configuring and operating a UE as a network TRP.

FIG. 8 illustrates example communications and events of an embodiment of configuring and operating a UE as a network TRP. The message flow 800 illustrates example communications and events associated with a user equipment 810 and a network system 820. The UE 810 can implement any suitable features of the UEs disclosed herein.

For instance, the UE 810 can be implemented in accordance with any suitable principles and advantages disclosed in association with one or more of FIG. 3, 4A, 4B, 4D, 5A, 5C, 5E, or 6B. The network system 820 may include a base band unit or other network device configured to schedule communications with devices within a service area. The network system 820 can also include a plurality of RRUs and/or TRPs. The network system 820 can be implemented in accordance with any suitable principles and advantages of the network systems disclosed herein. For instance, network system 820 can be implemented in accordance with any suitable combination of features of the network system of FIG. 7A. The message flow 800 can be implemented in the example communication environments of FIGS. 2B, 2C, and/or 2D, for example. Additional or alternative entities may be included to mediate one or more of the interactions shown such as network routers, switches, security devices, or the like.

Although the message flow 800 is shown as being between a single UE 810 and a network system 820, a plurality of UEs can communicate with the network system 820 concurrently and/or in sequence in accordance with the principles and advantages disclosed with reference to FIG. 8. For example, the network system 820 can determine to use two or more UEs as virtual TRPs and direct traffic to such UEs operating in virtual TRP mode.

In event 830, the UE 810 can enter a TRP capable state. For example, the UE 810 can enter the TRP capable state in response to detecting that the UE 810 is idle and has a sufficient power level (e.g., battery power) to operate in a virtual TRP mode. The UE 810 can determine whether to enter a TRP capable state based on one or more of a variety of factors. Example factors include one or more operational characteristics of the UE 810 and one or more TRP operation metrics.

Operational characteristics of the UE 810 can include one or more of a channel condition, processing capabilities, available memory, one or more applications executing on the UE, power level (e.g., battery power level), or the like. The UE 810 can determine to enter the TRP capable state in response to one or more operational characteristics satisfying a respective threshold. For instance, the UE 810 can enter the TRP capable state in response to determining that its battery power level is above a threshold amount.

TRP operation metrics include one or more of an amount of data to transmit and/or receive as a TRP, a type of data to transmit and/or receive as a TRP, an incentive provided to the UE 810 for operating as a TRP, any a priori agreements, or the like. Example incentives include cellular data allowance credit from a mobile network operator, cellular data allowance transfer from another UE, digital cash, or tokens. The amount of incentives provided to the UE for operating as a network TRP can be dynamically allocated in certain instances. The amount of incentives provided to the UE for operating as a network TRP can be based on demand for extra network capacity in a particular area. The amount of incentives provided to the UE for operating as a network TRP can alternatively or additionally be based on one or more operational characteristics of the UE such as any of the operational characteristics described herein. The UE 810 can determine to enter the TRP capable state in response to an amount of incentives satisfying a threshold. A priori agreements can include one or more explicit a priori agreements (e.g., users who have agreed to operate as their UEs as TRPs) and/or one or more implicit a priori agreements (e.g., users who allow their UEs to operate as TRPs for other UEs associated with a friend list or list of users with common interest defined by social network service).

The UE 810 can transmit TRP capable state information to the network system 820 in event 832. The TRP capable state information can indicate that the UE 810 is available to operate as a network TRP. The transmission may include information indicating various information associated with the UE 810 such as information identifying a device type, information about capabilities of the UE 810 such as a number of antennas or a number of transmit and/or receive paths of a transceiver of the UE 810, or the like.

The network system 820 can register the UE 810 in a data store in event 834. This can involve storing an identifier and/or other information associated with the UE 810 in a virtual TRP database. In event 836, the network system 820 can estimate network capacity with the UE 810 operating as a network TRP. The network system 820 can determine whether the UE 810 can increase network capacity by operating as a TRP. In some instances, the network system 820 can determine whether the UE 810 can increase network capacity more than a threshold amount. In response to determining that the UE 810 can sufficiently increase network capacity, the network system 820 can send the UE 810 a UE capability request in event 838. In some instances, an amount of incentives to encourage the UE 810 to operate as a TRP can be provided with the UE capability request.

The UE 810 can collect information in response to the UE capability request provided by the network system 820. In event 840, the UE 810 can assess its capacity as a network TRP. For instance, the UE 810 can detect one or more operational characteristics of the UE 810, such as power level (e.g., battery power), processor load, memory, applications executing on the UE 810, existing operation as a virtual network element, MIMO capabilities such as number of MIMO dimensions available, traffic state, a channel condition associated with one or more other UEs in proximity, a link quality indicator associated with one or more other UEs in proximity, or one or more other detectable operational metrics for the UE 810. As one example, the UE 810 can detect its battery power and a channel condition associated with another UE in proximity. In event 842, the UE 810 can provide feedback to the network system 820 regarding capabilities of the UE 810 operating as a network TRP. The feedback can include any suitable information collected in event 840. The UE 810 can send information regarding desired incentives for operating as a TRP in event 842.

The network system 820 can add the UE 810 as a network TRP for a network scheduler in event 844. The determination in event 844 can include accessing information associated with the user equipment 810 from a data store. Such information can include information stored in event 834, for example. The network system 820 can verify that the UE 810 includes circuitry capable of performing TRP functionality. The determination to request that the UE 810 operate as a network repeater in event 844 can be based on the verifying of the capability of the UE 810. The determination in event 844 can be based on any suitable information from the feedback provided by the UE 810 in event 842.

The network system 820 can send a command to the UE 810 to initiate a virtual TRP mode in event 846. Then the UE 810 can enter TRP mode in event 848. The UE 810 can verify that it will receive a sufficient amount of incentives for operating as a TRP prior to entering TRP mode in certain instances. A transceiver of the UE 810 can change mode to enter the TRP mode. In some instances, this can involve changing the state of a switch of the transceiver. The UE 810 can activate one or more RF signal chains to operate in the TRP mode. Such RF signal chains can include a dedicated signal chain and/or a signal chain that includes at least a portion of an RF signal path that is also used in a traffic mode of the UE 810. In response to entering the virtual TRP mode, the UE 810 can send a TRP ready information to the network system 820 to indicate that the UE 810 is ready to operate as a network TRP in event 850. The network system 820 can schedule traffic to the UE 810 in event 852.

In event 854, the network system 820 can route network traffic to the UE 810. Incentives desired by a UE 810 for operating as a TRP can be one variable used by the network system 820 to determine traffic routing. Accordingly, the network system 820 can account for an amount of incentives desired by the UE 810 in determining how to route traffic. The traffic can be downlink traffic as illustrated in FIG. 8. The UE 810 can operate as a network TRP in event 856. As a network TRP, the UE 810 can transmit downlink data to another UE. This can increase network performance, for example, by increasing the MIMO dimension of a downlink data transmission to the other UE. While FIG. 8 illustrates downlink traffic being transmitted from the network system 820 to the UE 810, the network system 820 can alternatively or additionally route uplink traffic from another UE to the network system 820 via the UE 810.

Repeater Mode

UEs disclosed herein can operate in a repeater mode. In the repeater mode, the UE can filter and amplify a received RF signal and output a processed RF signal that has substantially the same carrier frequency as the received RF signal. This can facilitate communication between a network system and another UE. The UE can operate in repeater mode when the UE is not in a traffic mode. In certain instances, such a UE can operate in the repeater mode when the UE is otherwise in an idle state. The repeater mode can be turned on for an idle carrier for frequency division duplexing traffic. The repeater mode can be turned on for an idle time slot for time division duplexing traffic. A neighboring UE channel can be sensed via a beacon. Feedback can be provided by the UE to the network system. The UE operating in the repeater mode can receive incentives to encourage the UE to operate as a repeater.

Figure 9:
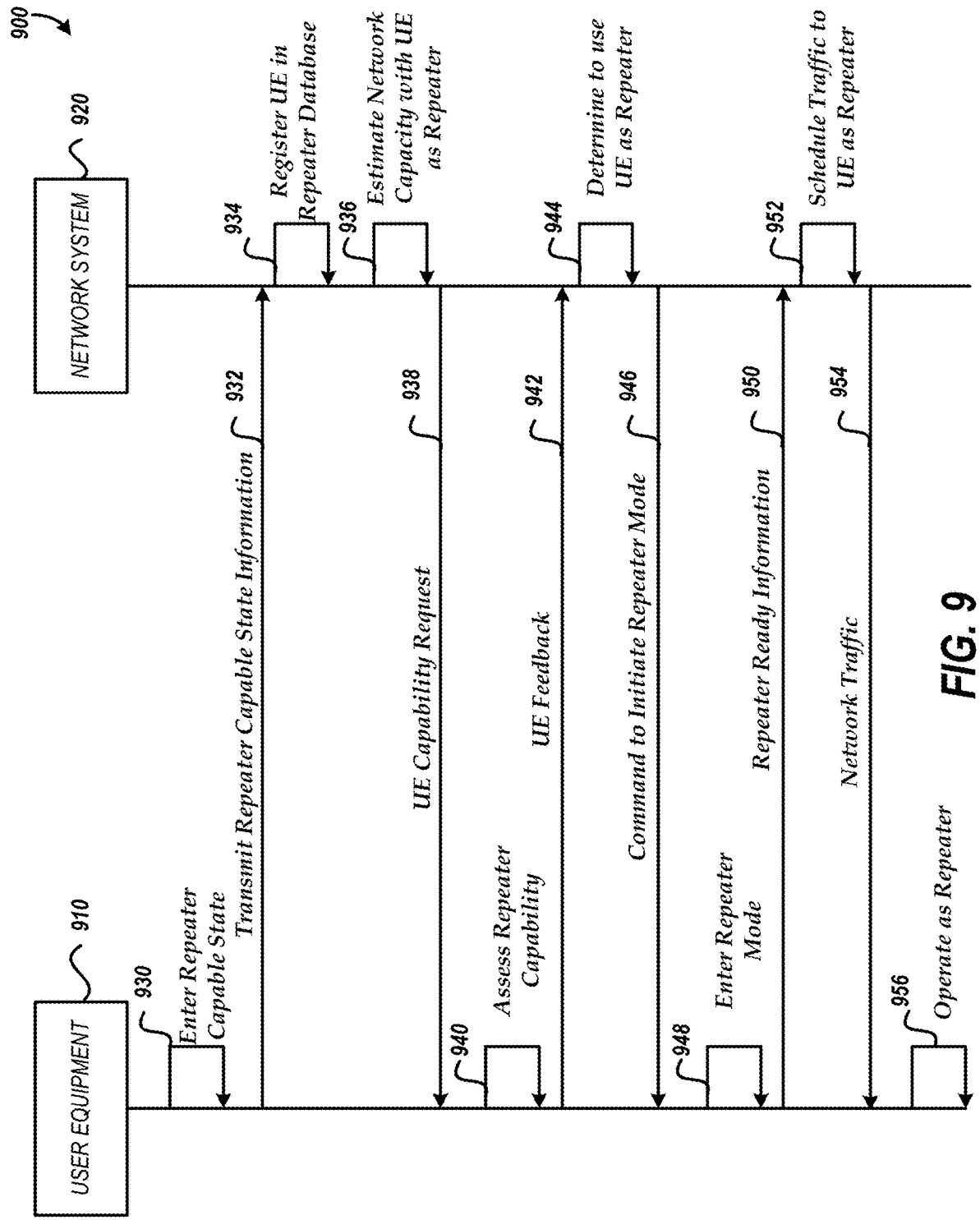
FIG. 9 illustrates example communications and events of an embodiment of configuring and operating a UE as a network repeater.

FIG. 9 illustrates example communications and events of an embodiment of configuring and operating a UE as a network repeater. The message flow 900 illustrates example communications and events associated with a user equipment 910 and a network system 920. The UE 910 can implement any suitable features of the UEs disclosed herein. For instance, the UE 910 can be implemented in accordance with any suitable principles and advantages disclosed in association with one or more of FIG. 3, 4A, 5A, 5B, 5D, or 6A. The network system 920 may include a base band unit or other network device configured to schedule communications with devices within a service area. The network system 920 can also include a plurality of RRUs and/or TRPs. The network system 920 can be implemented in accordance with any suitable principles and advantages of the network systems disclosed herein. For instance, network system 920 can be implemented in accordance with any suitable combination of features of the network system of FIG. 7A. The message flow 900 can be implemented in the example communication environments of FIGS. 2A and/or 2D, for example. Additional or alternative entities may be included to mediate one or more of the interactions shown such as network routers, switches, security devices, or the like.

Although the message flow 900 is shown as being between a single UE 910 and a network system 920, a plurality of UEs can communicate with the network system 920 concurrently and/or in sequence in accordance with the principles and advantages disclosed with reference to FIG. 9. For example, the network system 920 can determine to use two or more UEs as network repeaters and direct traffic to such UEs operating in a repeater mode. In some instances, a network system can communicate with one or more UEs in association with the one or more UEs operating in a virtual TRP mode in accordance with any suitable principles and advantages of FIG. 8 and also communicate with one or more additional UEs in association with the one or more additional UEs operating in repeater mode in accordance with any suitable principles and advantages of FIG. 9.

In event 930, the UE 910 can enter a repeater capable state. For example, the UE 910 can enter the repeater capable state in response to detecting that the UE 910 is idle and has a sufficient power level (e.g., battery power) to operate in a repeater mode.

The UE 910 can determine whether to enter a repeater capable state based on one or more of a variety of factors. Example factors include one or more operational characteristics of the UE 910 and one or more repeater operation metrics.

Operational characteristics of the UE 910 can include one or more of a channel condition, processing capabilities, available memory, one or more applications executing on the UE, power level (e.g., battery power level), or the like. The UE 910 can determine to enter the repeater capable state in response to one or more operational characteristics satisfying a respective threshold. For instance, the UE 910 can enter the repeater capable state in response to determining that its battery power level is above a threshold amount.

Repeater operation metrics include one or more of an amount of data to transmit and/or receive as a repeater, a type of data to transmit and/or receive as a repeater, an incentive provided to the UE 910 for operating as a repeater, any a priori agreements, or the like. Example incentives include cellular data allowance credit from a mobile network operator, cellular data allowance transfer from another UE, digital cash, or tokens. The amount of incentives provided to the UE for operating as a network repeater can be dynamically allocated in certain instances. The amount of incentives provided to the UE for operating as a network repeater can be based on demand for extra network capacity in a particular area. The amount of incentives provided to the UE for operating as a network repeater can alternatively or additionally be based on one or more operational characteristics of the UE such as any of the operational characteristics described herein. The UE 910 can determine to enter the repeater capable state in response to an amount of incentives satisfying a threshold. A priori agreements can include one or more explicit a priori agreements (e.g., users who have agreed to operate as their UEs as repeaters) and/or one or more implicit a priori agreements (e.g., users who allow their UEs to operate as repeaters for other UEs associated with a friend list or list of users with common interest defined by social network service).

The UE 910 can transmit repeater capable state information to the network system 920 in event 932. The repeater capable state information can indicate that the UE 910 is available to operate as a network repeater. The transmission may include information indicating various information associated with the UE 910 such as information identifying a device type, information about capabilities of the UE 910 such as a number of antennas or a number of transmit and/or receive paths of a transceiver of the UE 910, or the like.

The network system 920 can register the UE 910 in a data store in event 934. This can involve storing an identifier and/or other information associated with the UE 910 in a repeater database. In event 936, the network system 920 can estimate network capacity with the UE 910 operating as a network repeater. The network system 920 can determine whether the UE 910 can increase network capacity by operating as a repeater. In some instances, the network system 920 can determine whether the UE 910 can increase network capacity more than a threshold amount. In response to determining that the UE 910 can sufficiently increase network capacity, the network system 920 can send the UE 910 a UE capability request in event 938. In some instances, an amount of incentives to encourage the UE 910 to operate as a repeater can be provided with the UE capability request.

The UE 910 can collect information in response to the UE capability request provided by the network system 920. In event 940, the UE 910 can assess its capacity as a network repeater. For instance, the UE 910 can detect one or more operational characteristics of the UE 910, such as power level (e.g., battery power), processor load, memory, applications executing on the UE 910, existing operation as a virtual network element, MIMO capabilities, traffic state, a channel condition associated with one or more other UEs in proximity, a link quality indicator associated with one or more other UEs in proximity, or one or more other detectable operational metrics for the UE 910. As one example, the UE 910 can detect its battery power and a channel condition associated with another UE in proximity. In event 942, the UE 910 can provide feedback to the network system 920 regarding capabilities of the UE 910 operating as a network repeater. The feedback can include any suitable information collected in event 940. The UE 910 can send information regarding desired incentives for operating as a repeater in event 942.

The network system 920 can determine to request that the UE 910 operate as a network repeater in event 944. The determination in event 944 can include accessing information associated with the user equipment 910 from a data store. Such information can include information stored in event 934, for example. The network system 920 can verify that the UE 910 includes circuitry capable of performing repeater functionality. The determination to request that the UE 910 operate as a network repeater in event 944 can be based on the verifying of the capability of the UE 910. The determination in event 944 can be based on any suitable information from the feedback provided by the UE 910 in event 942.

The network system 920 can send a command to the UE 910 to initiate a repeater mode in event 946. Then the UE 910 can enter the repeater mode in event 948. The UE 910 can verify that it will receive a sufficient amount of incentives for operating as a repeater prior to entering repeater mode in certain instances. A transceiver of the UE 910 can change mode to enter the repeater mode. In some instances, this can involve changing the state of a switch of the transceiver. The UE 910 can activate one or more RF signal chains to operate in the TRP mode. Such RF signal chains can include a dedicated signal chain and/or a signal chain that includes at least a portion of an RF signal path that is also used in a traffic mode of the UE 910. In response to entering the repeater mode, the UE 910 can send a TRP ready information to the network system 920 to indicate that the UE 910 is ready to operate as a network TRP in event 950. The network system 920 can schedule traffic to the UE 910 in event 952 for the UE 910 to repeat as a network repeater.

In event 954, the network system 920 can route network traffic to the UE 910. Incentives desired by a UE 890 for operating as a repeater can be one variable used by the network system 920 to determine traffic routing. Accordingly, the network system 920 can account for an amount of incentives desired by the UE 910 in determining how to route traffic. The traffic can be downlink traffic as illustrated in FIG. 9. The UE 910 can operate as a network repeater in event 956. As a network repeater, the UE 910 can transmit downlink data to another UE. This can provide strategic scattering in a communication environment. While FIG. 9 illustrates downlink traffic being transmitted from the network system 920 to the UE 910, the network system 920 can alternatively or additionally route uplink traffic from another UE to the network system 920 via the UE 910.

Terminating Virtual Network Element Mode

UEs disclosed herein can operate in a virtual network element mode, such as a repeater mode or a virtual TRP mode. The UEs can operate in the virtual network element mode of a certain period of time. A UE can initiate termination of operation in the virtual network element mode. Alternatively or additionally, a network system can initiate termination of a UE operating in the virtual network element mode.

Figure 10A:
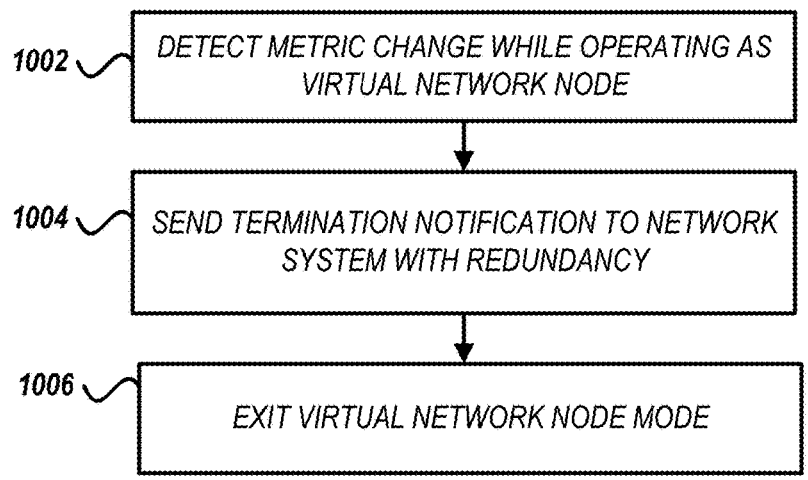
FIG. 10A is a flow diagram of an example UE initiated process of terminating operation of a UE in a virtual network element mode.

FIG. 10A is a flow diagram of an example UE initiated process 1000 of terminating operation of a UE in a virtual network element mode. The process 1000 can be performed by any suitable UE disclosed herein. The UE can detect a metric change while operating as a virtual network element at block 1002. The UE can detect the metric change dynamically and/or at defined intervals. The metric change can be significant enough to terminate the virtual network element mode. The metric change can be, for example, one or more of a change in a channel condition, a change in device power (e.g., batter power), or a desired to enter a traffic mode for one or more applications. The metric change can have a magnitude that satisfies a threshold for virtual network element mode termination. The UE can send a termination notification to the network system with redundancy at block 1004. This can reliably notify the network system that the UE will now terminate operation in the virtual network element mode. At block 1006, the UE can exit the virtual network element mode. The termination notification can be an in-band control signal in certain instances. The termination notification can be sent via a virtual front-haul in some instances. The UE can terminate the virtual network element mode in response to receiving acknowledgement from the network system in respond to the termination notification sent at block 1004. The acknowledgement can be an in-band control signal or sent via a virtual front-haul. Alternatively or additionally, the UE can terminate the virtual network element mode in response to a timer expiring.

Figure 10B:
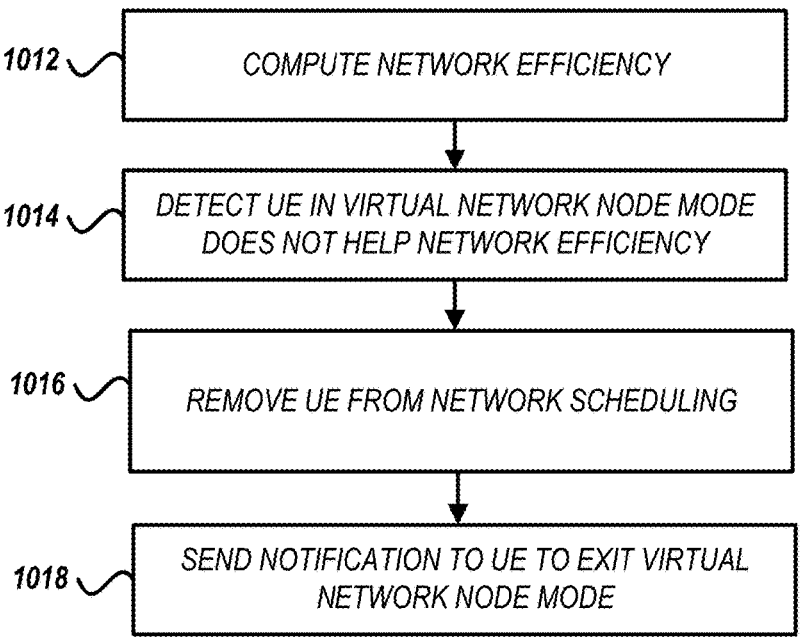
FIG. 10B is a flow diagram of an example network initiated process of terminating operation of a UE in a virtual network element mode.

FIG. 10B is a flow diagram of an example network initiated process 1010 of terminating operation of a UE in a virtual network element mode. The process 1010 can be performed by any suitable network system disclosed herein. The network system 1012 can compute network efficiency with the UE operating in the virtual network element mode. This computation can be performed dynamically and/or at defined intervals. The network system can detect that the UE operating as a virtual network element does sufficiently not help with network efficiency at block 1014. In some instances, the network system can determine that the UE operating in the virtual network mode does not increase network efficiency by a threshold amount. The threshold amount can be zero in certain instances. The threshold amount can be greater than zero in other instances. The network system can then remove the UE from network scheduling at block 1016 in response to determining that the UE does not sufficiently increase network efficiency. In response to detecting that the UE operating as a virtual network element does not sufficiently help with network efficiency, the network system can send a notification to the UE to exit the virtual network element mode at block 1018.

Figure 11A:
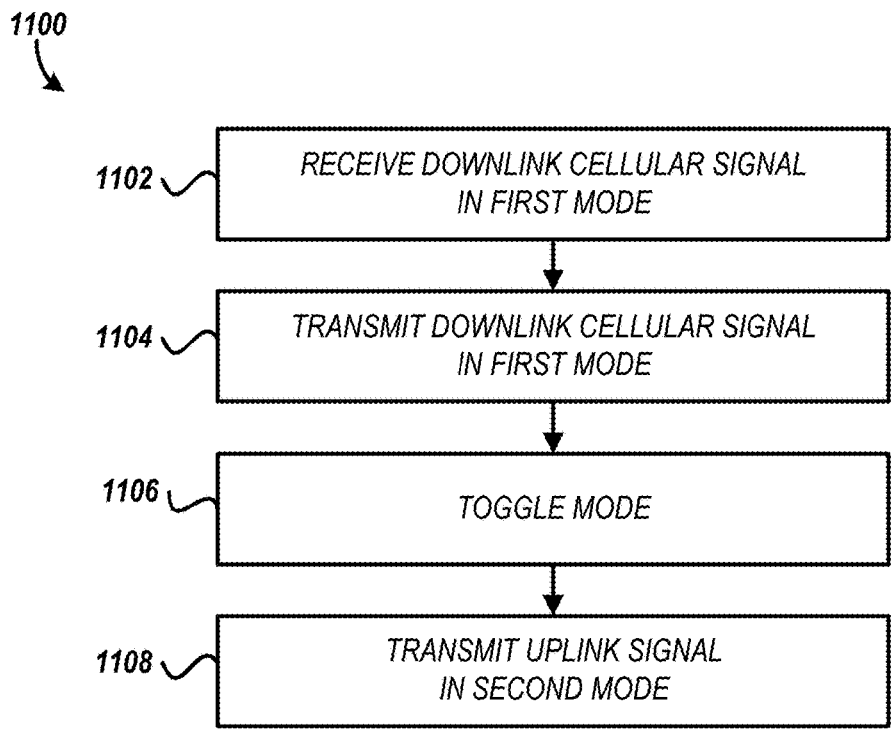
FIG. 11A is a flow diagram of an example method of data transmission for a UE according to an embodiment.

Methods of Wireless Communication Involving Network System and UE Operating as Virtual Network Element FIG. 11A is a flow diagram illustrating an example method 1100 of data transmission for a user equipment according to an embodiment. The method 1100 can be performed by any suitable UE disclosed herein. Any suitable principles and advantages associated with the message flow diagrams of FIGS. 8 and 9 can be implemented in the method 1100. The method 1100 relates to a UE operating in traffic mode and operating in a virtual network element mode to provide downlink data to another UE.

At block 1102, a UE can receive a downlink cellular signal in a first mode. The first mode can be a virtual network element mode, such as a repeater mode or a TRP mode. The downlink cellular signal can be received by a receive path of the UE that is coupled to a transmit path of the UE in an analog domain. Accordingly, the downlink cellular signal can be processed without demodulation to baseband. The UE can transmit a downlink cellular signal to another UE in the first mode at block 1104. The transmission can be via the transmit path.

The mode of the UE can be toggled from the first mode to a second mode at block 1106. The second mode can be a traffic mode. The UE can generate an uplink cellular signal based on an output of a baseband processor of the UE in the second mode. The UE can transmit the uplink cellular signal to a network system at block 1108. The UE can also receive and process a downlink signal received from the network system in the second mode.

Figure 11B:
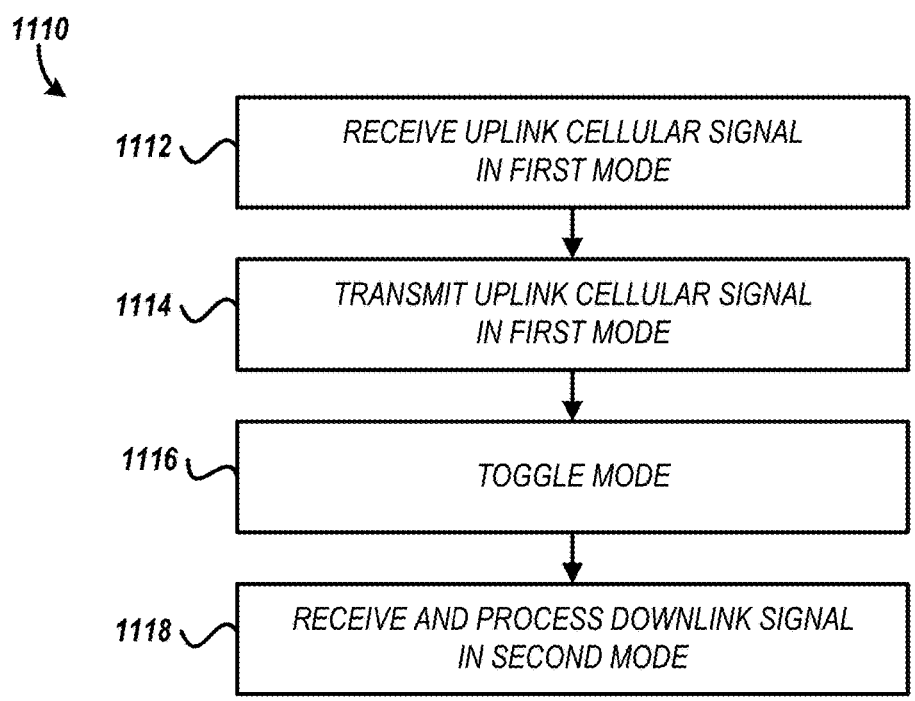
FIG. 11B is a flow diagram of an example method of data processing for a UE according to an embodiment.

FIG. 11B is a flow diagram illustrating an example method 1110 of data processing for a user equipment according to an embodiment. The method 1110 can be performed by any suitable UE disclosed herein. Any suitable principles and advantages associated with the message flow diagrams of FIGS. 8 and 9 can be implemented in the method 1110. The method 1110 relates to a UE operating in traffic mode and operating in a virtual network element mode to provide uplink data from another UE to a network system.

At block 1112, a UE can receive an uplink cellular signal in a first mode. The first mode can be a virtual network element mode, such as a repeater mode or a TRP mode. The uplink cellular signal can be received by a receive path of the UE that is coupled to a transmit path of the UE in an analog domain. Accordingly, the uplink cellular signal can be processed without demodulation to baseband. The UE can transmit an uplink cellular signal to a network system in the first mode at block 1114. The transmission can be via the transmit path.

The mode of the UE can be toggled from the first mode to a second mode at block 1116. The second mode can be a traffic mode. At block 1118, the UE can receive and process a downlink signal received from the network system in the second mode. The processed signal can be demodulated to baseband and provided to a baseband processor in the second mode. The UE can also transmit an uplink signal to the network system in the second mode.

Figures 12A, 12B:
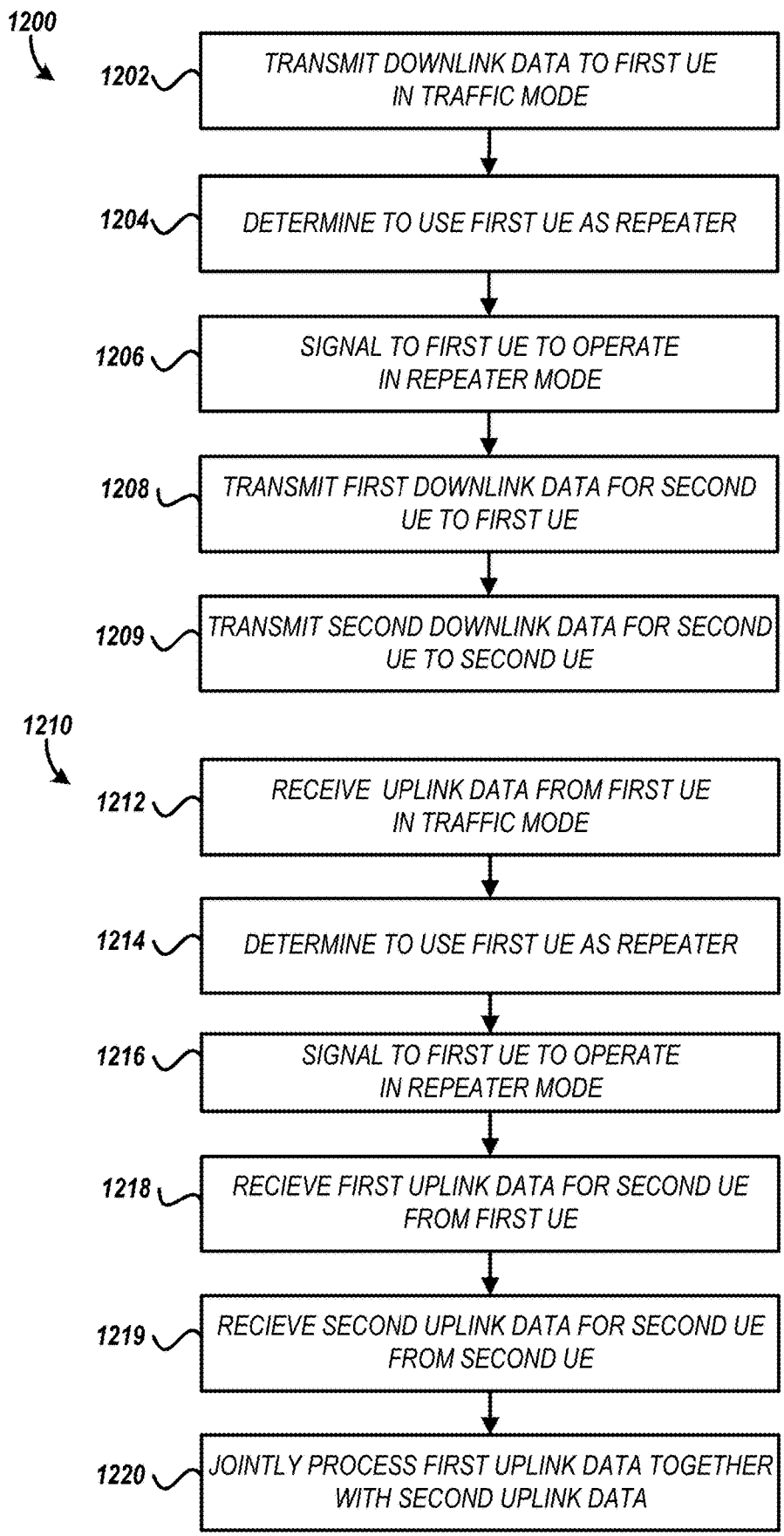
FIG. 12A is a flow diagram of an example method of downlink data transmission according to an embodiment.
FIG. 12B is a flow diagram of an example method of processing uplink data according to an embodiment.

FIG. 12A is a flow diagram illustrating an example method 1200 of downlink data transmission according to an embodiment. The method 1200 can be performed by any suitable network system disclosed herein. Any suitable principles and advantages associated with the message flow diagram of FIG. 9 can be implemented in the method 1200. The method 1200 relates to a network system transmitting downlink data to a UE operating in traffic mode and operating in a repeater mode.

At block 1202, a network system can transmit downlink data for a first UE to the first UE in a traffic mode of the first UE. The network system can determine to use the first UE as a repeater for wirelessly communicating with a second UE at block 1204. The network system can signal to the first UE to operate in a repeater mode at block 1206. While the first UE is in the repeater mode, the network system can transmit first downlink data for the second UE to the first UE at block 1208. Then the first UE can function as a repeater to provide the first downlink data to the second UE. At block 1209, the network system can transmit second downlink data to the second UE while the first UE is in the repeater mode. Accordingly, the second UE can receive the first and second downlink data from the network system while the first UE is in the repeater mode. The second UE can jointly process the first downlink data together with the second downlink data.

FIG. 12B is a flow diagram illustrating an example method 1210 of processing uplink data according to an embodiment. The method 1210 can be performed by any suitable network system disclosed herein. Any suitable principles and advantages associated with the message flow diagram of FIG. 9 can be implemented in the method 1210. The method 1210 relates to a network system receiving uplink data from a UE operating in traffic mode and operating in a repeater mode. The method 1210 can be performed with any suitable wireless downlink communication, such as any suitable features of the method 1200 of FIG. 12A.

At block 1212, a network system can receive uplink data for a first UE from the first UE in a traffic mode of the first UE. The network system can determine to use the first UE as a repeater for wirelessly communicating with a second UE at block 1214. The network system can signal to the first UE to operate in a repeater mode at block 1216. In the repeater mode, the first UE can repeat uplink data from the second UE and transmit the uplink data to the network system. While the first UE is in the repeater mode, the network system can receive first uplink data for the second UE from the first UE at block 1218. At block 1219, the network system can receive second uplink data for the second UE from the second UE while the first UE is in the repeater mode. The network system can jointly process the first uplink data together with the second uplink data at block 1220.

Figure 13A:
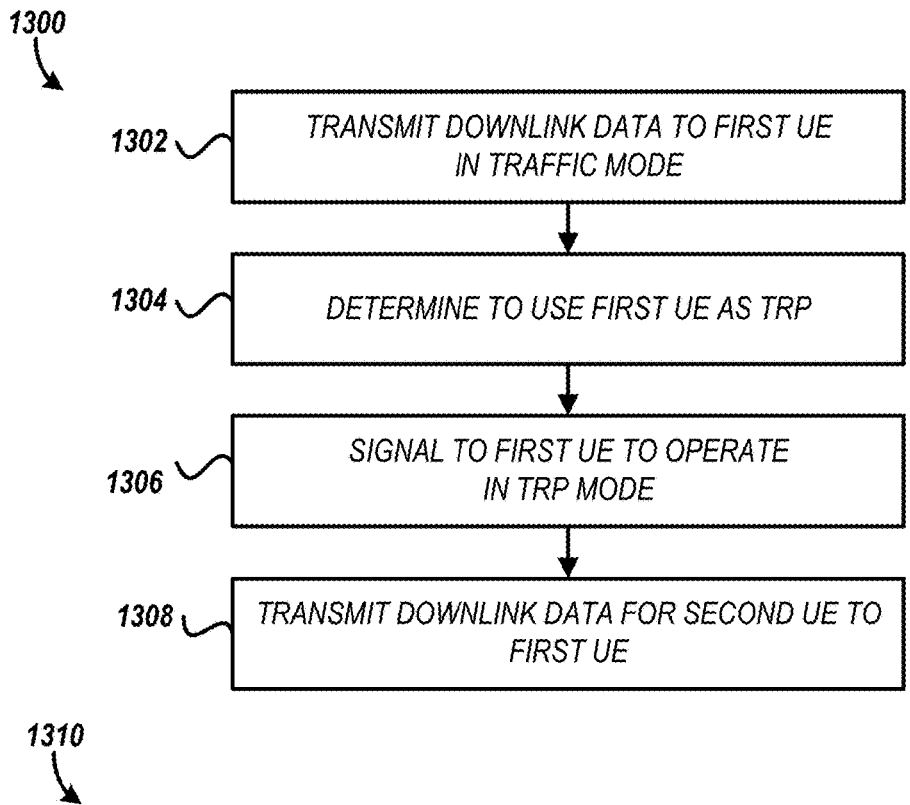
FIG. 13A is a flow diagram of an example method of downlink data transmission according to an embodiment.

FIG. 13A is a flow diagram illustrating an example method 1300 of downlink data transmission according to an embodiment. The method 1300 can be performed by any suitable network system disclosed herein. Any suitable principles and advantages associated with the message flow diagram of FIG. 8 can be implemented in the method 1300. The method 1300 relates to a network system communicating with a UE operating in traffic mode and operating in a virtual TRP mode.

At block 1302, a network system can transmit downlink data for a first UE to the first UE in a traffic mode of the first UE. The network system can determine to use the first UE as a virtual TRP for wirelessly communicating with a second UE at block 1304. The network system can signal to the first UE to operate in a virtual TRP mode at block 1306. While the first UE is in the virtual TRP mode, the network system can transmit first downlink data for the second UE to the first UE at block 1308. Then the first UE can function as a virtual TRP for wirelessly transmitting a downlink cellular signal to the second UE. The first UE can perform any suitable processing of an RRU in the virtual TRP mode. For example, the first UE can perform any suitable uplink processing identified in FIG. 4D.

Figure 13B:
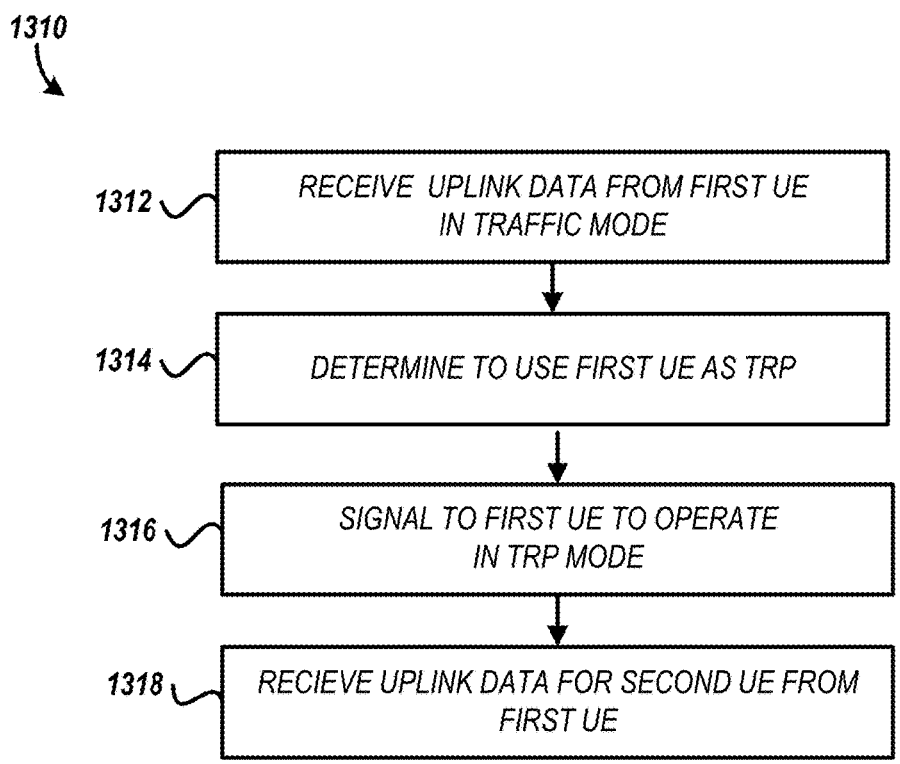
FIG. 13B is a flow diagram of an example method of processing uplink data according to an embodiment.

FIG. 13B is a flow diagram illustrating an example method 1310 of processing uplink data according to an embodiment. The method 1310 can be performed by any suitable network system disclosed herein. Any suitable principles and advantages associated with the message flow diagram of FIG. 8 can be implemented in the method 1310. The method 1310 relates to a network system receiving uplink data from a UE operating in traffic mode and operating in a virtual TRP mode. The method 1310 can be performed with any suitable wireless downlink communication, such as any suitable features of the method 1300 of FIG. 13A.

At block 1312, a network system can receive uplink data for a first UE from the first UE in a traffic mode of the first UE. The network system can determine to use the first UE as a virtual TRP for wirelessly communicating with a second UE at block 1314. The network system can signal to the first UE to operate in a virtual TRP mode at block 1316. In the virtual TRP mode, the first UE can function as a virtual TRP of the network for wirelessly communicating with the second UE. The first UE can perform any suitable processing of an RRU in the virtual TRP mode. For example, the first UE can perform any suitable uplink processing identified in FIG. 4D. While the first UE is in the virtual TRP mode, the network system can receive uplink data for the second UE from the first UE at block 1318.

Terminology, Applications, and Conclusion

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations, or events can be performed concurrently, e.g., through multi-threaded processing, interrupt processing, or multiple processors or processor cores or on other parallel architectures, rather than sequentially.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), Flash, Java, .net, web services, and rich site summary (RSS). In some implementations, a UI may be included in a stand-alone client (for example, thick client, fat client) configured to communicate (e.g., send or receive data) in accordance with one or more of the aspects described.

As used herein a "transmit-receive point" (TRP) (which can alternatively be referred to as a transmission reception point) may refer to a transceiver device or one transceiver element included in a device. When included as a transceiver element, the device may include multiple TRPs. The TRP may include one or more antennas which are coupled to signal processing circuitry. The signal processing circuitry may be included in the device. The TRP may include additional elements to facilitate transmission or receipt of wireless signals for one or more UEs. Example of such elements may include a power source, amplifier, digital-to-analog converter, analog-to-digital converter, or the like. When a TRP is allocated, such as by a BBU, to provide service to a UE, the TRP may be said to be a "serving node" for the UE.

As used herein a "remote radio unit" (RRU) may refer to a device for controlling and coordinating transmission and receipt of wireless signals for one or more UEs. An RRU may include or be coupled with one or more TRPs. The RRU may receive signals from the TRP and include the signal processing circuitry. The signal processing circuitry may be selectively operated to facilitate processing of signals associated with different TRPs.

Aspects of this disclosure can be implemented in any suitable wireless communication environment, network system, and/or UE. Any suitable communication standard can be used in association with the principles and advantages disclosed herein.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, circuit blocks and/or method blocks described herein may be deleted, moved, added, subdivided, combined, arranged in a different order, and/or modified. Each of these blocks may be implemented in a variety of different ways. Any suitable combination of the elements and acts of the various embodiments described above can be combined to provide further embodiments. Any portion of any of the methods disclosed herein can be performed in association with specific instructions stored on a non-transitory computer readable storage medium being executed by one or more processors. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A user equipment comprising:
   a baseband processor; and
   a transceiver in communication with the baseband processor, the transceiver comprising a receive path and a transmit path, and the transceiver configurable into at least a first mode and a second mode;
   wherein the receive path is coupled to the transmit path in an analog domain in the first mode, the receive path is configured to receive a receive downlink cellular signal in the first mode, and the transmit path is configured to output a transmit downlink cellular signal in the first mode;
   wherein, in the first mode, the transceiver is further configured to receive a receive uplink cellular signal and to output a transmit uplink cellular signal; and
   wherein, in the second mode, the transceiver is configured to generate an uplink radio frequency signal based on an output signal from the baseband processor, to process a received downlink radio frequency signal, and to downconvert the processed downlink radio frequency signal to baseband.

2. The user equipment of claim 1, wherein the receive downlink cellular signal and the transmit downlink cellular signal are at substantially the same carrier frequency.

3. The user equipment of claim 1, wherein the receive downlink cellular signal and the transmit downlink cellular signal are at different carrier frequencies.

4. The user equipment of claim 3, wherein the transceiver comprises analog circuitry configured to frequency translate a radio frequency signal in the first mode, and wherein the receive downlink cellular signal and the transmit downlink cellular signal are within different frequency bands.

5. The user equipment of claim 1, further comprising an antenna configured to transmit the transmit downlink cellular signal when the transceiver is in the first mode and to transmit the uplink radio frequency signal when the transceiver is in the second mode.

6. The user equipment of claim 5, further comprising a switch configured to provide the transmit downlink cellular signal to the antenna when the transceiver is in the first mode, the switch configured to provide the uplink radio frequency signal to the antenna when the transceiver is in the second mode, and the switch configured change state corresponding to the transceiver toggling between the first mode and the second mode.

7. The user equipment of claim 6, wherein the switch is configured to receive a control signal to control the switch to be in a state corresponding to the first mode during selected time slots in a traffic mode of the user equipment.

8. The user equipment of claim 6, wherein the switch is configured to pass the received downlink radio frequency signal in the second mode.

9. The user equipment of claim 6, wherein, in the first mode, the switch is configured to pass the receive uplink cellular signal.

10. The user equipment of claim 1, wherein the transceiver is configured to cause the user equipment to function as a repeater in the first mode and to function as a transmit-receive point of a network system in a third mode.

11. The user equipment of claim 1, wherein, in the first mode, the transceiver is configured to perform front haul processing.

12. A method of data transmission, the method comprising:
    receiving, by a receive path of a first user equipment, a receive downlink cellular signal in a first mode, wherein the receive path of the first user equipment is coupled to a transmit path of the first user equipment in an analog domain in the first mode;
    transmitting, via the transmit path of the first user equipment, a transmit downlink cellular signal to a second user equipment in the first mode;

receiving, by the first user equipment, a receive uplink cellular signal in the first mode; and transmitting, by the first user equipment, a transmit uplink cellular signal to the second user equipment in the first mode;

toggling a mode of the first user equipment from the first mode to a second mode;

generating a transmit uplink cellular signal based on an output of a baseband processor of the first user equipment in the second mode; and transmitting, by the first user equipment, the transmit uplink cellular signal in the second mode.

13. The method of claim 12, wherein the first user equipment operates as a network repeater in the first mode.

14. The method of claim 12, further comprising frequency translating the receive downlink cellular signal in the first mode such that the receive downlink cellular signal and the transmit downlink cellular signal have different carrier frequencies.

15. The method of claim 12, wherein toggling the mode of the first user equipment comprises toggling a state of a switch.

16. The method of claim 12, wherein the same antenna is configured to transmit the transmit downlink cellular signal and to transmit the transmit uplink cellular signal.

17. A user equipment comprising:
a baseband processor; and
a transceiver in communication with the baseband processor, the transceiver configurable into at least a virtual transmit-receive point mode and a traffic mode;
wherein, in the virtual transmit-receive point mode, the transceiver is configured to receive a downlink cellular signal, process the downlink cellular signal without demodulation to baseband and by at least frequency translating the downlink cellular signal, and output the processed received downlink cellular signal for wireless transmission by the user equipment; and
wherein, in the virtual transmit-receive point mode, the transceiver is further configured to receive an uplink cellular signal, process the uplink cellular signal without demodulation to baseband and by at least frequency translating the uplink cellular signal, and output the processed uplink cellular signal for wireless transmission by the user equipment; and
wherein, in the traffic mode, the transceiver is configured to generate an uplink radio frequency signal based on an output signal from the baseband processor, to process a received downlink radio frequency signal, and to downconvert the processed downlink radio frequency signal to baseband.

18. The user equipment of claim 17, wherein the transceiver comprises a radio frequency protocol processing circuit configured to perform front haul processing on the downlink cellular signal.

19. The user equipment of claim 17, wherein the transceiver comprises a radio frequency protocol processing circuit configured to perform front haul processing on the uplink cellular signal.

20. The user equipment of claim 17, further comprising an antenna configured to transmit the processed uplink cellular signal when the transceiver is in the virtual transmit-receive point mode and to transmit the uplink radio frequency signal when the transceiver is in the traffic mode.

21. The user equipment of claim 20, further comprising a switch configured to provide the processed uplink cellular signal to the antenna when the transceiver is in the virtual transmit-receive point mode, the switch configured to provide the uplink radio frequency signal to the antenna when the transceiver is in the traffic mode, and the switch configured change state corresponding to the transceiver toggling between the virtual transmit-receive point mode and the traffic mode.

* * * * *